(12) United States Patent
Aminaka et al.

(10) Patent No.: US 7,777,845 B2
(45) Date of Patent: Aug. 17, 2010

(54) LIQUID CRYSTAL DISPLAY

(75) Inventors: Eiichiro Aminaka, Minami-Ashigara (JP); Yukito Saitoh, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 317 days.

(21) Appl. No.: 12/083,376

(22) PCT Filed: Oct. 18, 2006

(86) PCT No.: PCT/JP2006/321189

§ 371 (c)(1),
(2), (4) Date: Apr. 10, 2008

(87) PCT Pub. No.: WO2007/046530

PCT Pub. Date: Apr. 26, 2007

(65) Prior Publication Data

US 2009/0122235 A1    May 14, 2009

(30) Foreign Application Priority Data

Oct. 18, 2005    (JP) .............................. 2005-302992

(51) Int. Cl.
G02F 1/1335    (2006.01)
(52) U.S. Cl. .......................... 349/118; 349/96; 349/117
(58) Field of Classification Search .................. None
See application file for complete search history.

(56) References Cited

U.S. PATENT DOCUMENTS 7,589,811 B2 * 9/2009 Joten ........................... 349/119

| | | | |
|---|---|---|---|
| 2003/0053011 A1* | 3/2003 | Mori | 349/96 |
| 2003/0147030 A1* | 8/2003 | Sone | 349/113 |
| 2004/0233362 A1* | 11/2004 | Kashima | 349/117 |
| 2007/0121033 A1* | 5/2007 | Ishitani et al. | 349/96 |

FOREIGN PATENT DOCUMENTS

| JP | 2587398 B2 | 12/1996 |
|---|---|---|
| JP | 2001-249223 A | 9/2001 |
| JP | 2001-255520 A | 9/2001 |
| JP | 2003-240955 A | 8/2003 |
| JP | 2005-99191 A | 4/2005 |
| JP | 2005-241794 A | 9/2005 |
| WO | WO 03/032060 A1 | 4/2003 |

OTHER PUBLICATIONS

PCT/ISA/210.
PCT/ISA/237.

* cited by examiner

*Primary Examiner*—Tina M Wong
(74) *Attorney, Agent, or Firm*—Buchanan Ingersoll & Rooney PC

(57) ABSTRACT

A liquid crystal display is provided and includes: a liquid crystal cell; a pair of polarizing plates disposed in cross-Nicol arrangement and sandwiching the liquid crystal cell. One of the pair of the polarizing plates has a protective film A for polarizer, disposed on the liquid crystal cell side, and the other of the pair has a protective film B for polarizer, disposed on a liquid crystal cell side. $Re_A(\lambda)$ and $Rth_A(\lambda)$ of the protective film A, $Rth_B(\lambda)$ of the protective film B and $\Delta nd(\lambda)$ of the liquid crystal cell satisfy expressions (I) and (II) at a wavelength of 400 nm to 700 nm:

$$0.74 \times (\Delta nd(\lambda) - Rth_B(\lambda)) \leq Rth_A(\lambda) \leq 0.97 \times (\Delta nd(\lambda) - Rth_B(\lambda)) \quad (I)$$

$$0.018 \times \lambda^2 / (\Delta nd(\lambda) - Rth_B(\lambda)) + 0.032 \times \lambda \leq Re_A(\lambda) \leq 0.036 \times \lambda^2 / (\Delta nd(\lambda) - Rth_B(\lambda)) + 0.032 \times \lambda \quad (II).$$

16 Claims, 6 Drawing Sheets

FIG. 7
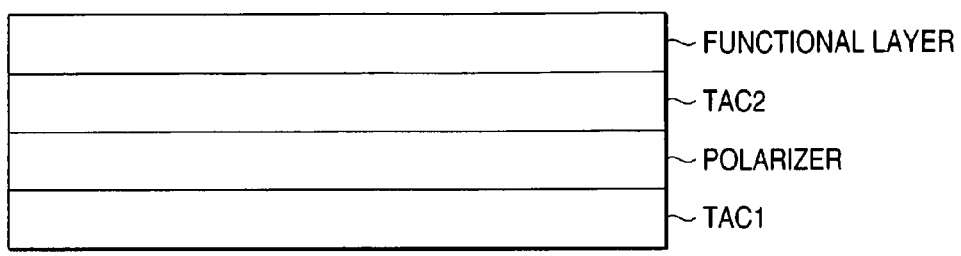
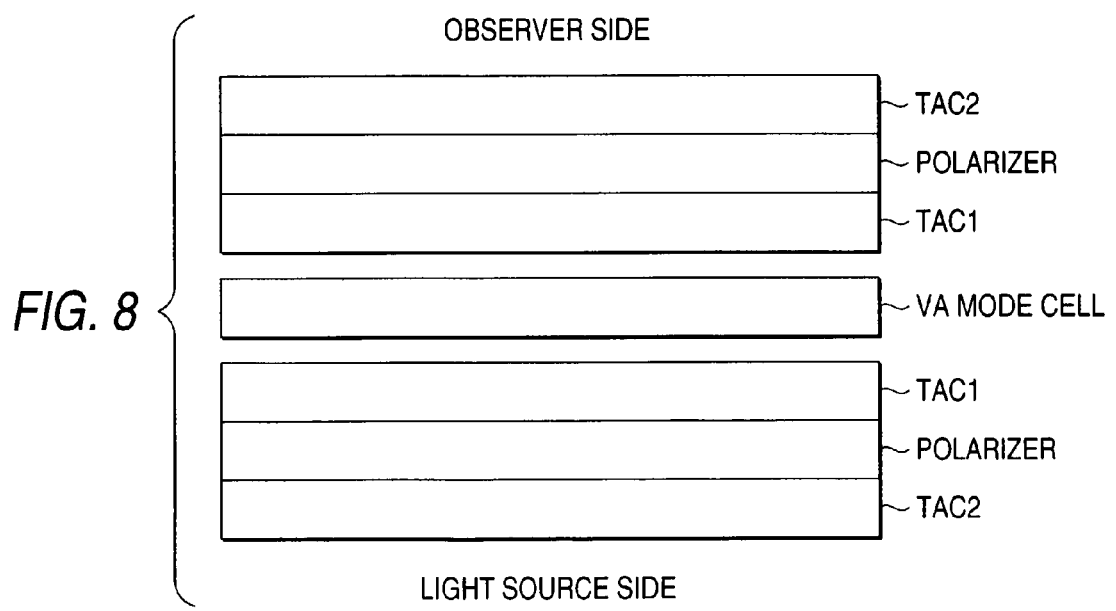
FIG. 8

LIQUID CRYSTAL DISPLAY

TECHNICAL FIELD

The present invention relates to a liquid crystal display and more particularly to a liquid crystal display having a wide viewing angle and a small color shift at the black state.

BACKGROUND ART

Liquid crystal displays have been widely used for monitor for personal computer and cellular phone, television, etc. because they are advantageous in that they can operate at low voltage with low power consumption and are available in small size and thickness. These liquid crystal displays have been proposed in various modes depending on the alignment of liquid crystal molecules in the liquid crystal cell. To date, TN mode, in which liquid crystal molecules are aligned twisted at about 90 degrees from the lower substrate to the upper substrate of the liquid crystal cell, has been a mainstream.

A liquid crystal display normally comprises a liquid crystal cell, an optical compensation sheet and a polarizer. The optical compensation sheet is used to eliminate undesirable coloring of image or expand the viewing angle. As such an optical compensation sheet there is used a stretched birefringent film or a transparent film coated with a liquid crystal. For example, Japanese Patent No. 2587398 discloses a technique for the expansion of the viewing angle involving the application to a TN mode liquid crystal cell of an optical compensation sheet obtained by spreading a discotic liquid crystal over a triacetyl cellulose film, and then orienting and fixing the coat layer. However, liquid crystal displays for TV use which are supposed to give a wide screen image that can be viewed at various angles have severe requirements for dependence on viewing angle. These requirements cannot be met even by the aforementioned approach. To this end, liquid crystal displays of modes different from TN mode, including IPS (In-Plane Switching) mode, OCB (Optically Compensatory Bend) mode, VA (Vertically Aligned) mode, have been under study. In particular, VA mode has been noted as liquid crystal display for TV use because it gives a high contrast image and can be produced in a relatively high yield.

A cellulose acylate film is normally characterized by a higher optical isotropy (lower retardation value) than other polymer films. Accordingly, it is normally practiced to use a cellulose acetate film in uses requiring optical isotropy such as polarizing plate.

On the contrary, the optical compensation sheet (retardation film) for liquid crystal display is required to have optical anisotropy (high retardation value). In particular, the optical compensation sheet for VA mode is required to have an in-plane retardation (Re) of from 30 to 200 nm and a thickness direction retardation (Rth) of from 70 to 400 nm. Accordingly, it has been usually practiced to use, as an optical compensation sheet, a synthetic polymer film having a high retardation value such as polycarbonate film and polysulfone film. As mentioned above, it was an ordinary principle in the art of optical materials that when the polymer film is required to have optical anisotropy (high retardation value), a synthetic polymer film is used, while the polymer film is required to have optical isotropy (low retardation value), a cellulose acetate film is used.

JP-A-2001-249223 overthrows this conventional general principle and proposes a cellulose acylate film having a high retardation value that can be used also for purposes requiring optical anisotropy. In accordance with this proposal, an aromatic compound having at least two aromatic rings, particularly a compound having 1,3,5-triazine ring, is added to cellulose triacetate to be stretched in order to realize a cellulose triacetate film having a high retardation value. It is generally known that a cellulose triacetate is a polymer material that can be difficulty stretched and provided with a high birefringence. However, JP-A-2001-249223 proposes that when additives are oriented at the same time with stretching, making it possible to raise birefringence and realize a high retardation value. This film is advantageous in that it can act also as a protective layer for polarizing plate and thus can provide an inexpensive thin liquid crystal display.

It is disclosed that the use of an optically compensatory film composed of only a cellulose acetate film having an Re value and an Rth value falling within the defined in JP-A-2001-249223 (20 nm to 70 nm and 70 nm to 400 nm, respectively) makes it possible to obtain a wide viewing angle. However, no reference is made to means of reducing the difference in tint (color shift) between in the direction normal to the liquid crystal cell and in other oblique directions at the black state.

In recent years, in the art of liquid crystal displays, there has been a growing demand for the improvement of not only the viewing angle defined by contrast ratio but also the display color.

DISCLOSURE OF THE INVENTION

An object of an illustrative, non-limiting embodiment of the invention is to provide a liquid crystal display having a wide viewing angle and a small color shift at the black state.

The inventors made extensive studies of solution to the aforementioned problems. As a result, it was found that a specific relationship between Re value and Rth value of the protective film on the liquid crystal cell side of the polarizing plate and $\Delta$nd of the liquid crystal cell to an optimum range and more preferably the tint of the liquid crystal cell having polarizers disposed in cross-Nicol arrangement and the color temperature of the backlight of the liquid crystal display to an optimum range make it possible to provide a liquid crystal display having a wide viewing angle and a small color shift at the black state.

The invention concerns the following constitutions.

(1) A liquid crystal display comprising:

a liquid crystal cell;

a pair of polarizing plates disposed in cross-Nicol arrangement and sandwiching the liquid crystal cell, one of the pair of the polarizing plates having a polarizer and a protective film A disposed on a liquid crystal cell side thereof, the other of the pair of the polarizing plates having a polarizer and a protective film B disposed on a liquid crystal cell side thereof, wherein $Re_A(\lambda)$ and $Rth_A(\lambda)$ of the protective film A, $Rth_B(\lambda)$ of the protective film B and $\Delta nd(\lambda)$ of the liquid crystal cell satisfy expressions (I) and (II) at a wavelength of 400 nm to 700 nm:

$$0.74 \times (\Delta nd(\lambda) - Rth_B(\lambda)) \leq Rth_A(\lambda) \leq 0.97 \times (\Delta nd(\lambda) - Rth_B(\lambda))  \quad (I)$$

$$0.018 \times \lambda^2/(\Delta nd(\lambda) - Rth_B(\lambda)) + 0.032 \times \lambda \leq Re_A(\lambda)$$
$$\leq 0.036 \times \lambda^2/(\Delta nd(\lambda) - Rth_B(\lambda)) + 0.032 \times \lambda \quad (II)$$

wherein Re represents an in-plane retardation; Rth represents a thickness-direction retardation; ($\lambda$) means that the measurement wavelength is $\lambda$ mm; $\Delta$n is the difference ($n_e - n_o$) between an extraordinary index $n_e$ and an ordinary index $n_o$ of a liquid crystal in the liquid crystal cell; and d represents a cell gap by nm of the liquid crystal cell.

(2) The liquid crystal display as defined in Clause (1), wherein the polarizing plates disposed in cross-Nicol arrangement have a hue a* and b* satisfying expressions (III) and (IV):

$$-1.0 \leq a^* \leq 2.0 \quad \text{(III)}$$

$$-1.0 \leq b^* \leq 2.0 \quad \text{(IV)}$$

(3) The liquid crystal display as defined in Clause (1) or (2), further comprising a backlight having a color temperature of 8,000 K to 10,000 K.

(4) The liquid crystal display as defined in any one of Clauses (1) to (3), wherein $Re_A(\lambda)$ and $Rth_A(\lambda)$ satisfy expressions (V) to (VIII):

$$1.0 \leq Re_{A(480)}/Re_{A(550)} \leq 1.1 \quad \text{(V)}$$

$$0.9 \leq Re_{A(630)}/Re_{A(550)} \leq 1.0 \quad \text{(VI)}$$

$$1.0 \leq Rth_{A(480)}/Rth_{A(550)} \leq 1.1 \quad \text{(VII)}$$

$$0.9 \leq Rth_{A(630)}/Rth_{A(550)} \leq 1.0 \quad \text{(VIII)}$$

(5) The liquid crystal display as defined in any one of Clauses (1) to (4), wherein $Rth_{B(590)}$ is from 0 nm to 150 nm.

(6) The liquid crystal display as defined in Clause (5), wherein $Re_{B(590)}$ of the protective film B is from 0 nm to 20 nm.

(7) The liquid crystal display as defined in any one of Clauses (1) to (6), wherein $Rth_{B(\lambda)}$ satisfies expressions (IX) to (X):

$$0 \leq Rth_{B(480)}/Rth_{B(550)} \leq 1.0 \quad \text{(IX)}$$

$$1.0 \leq Rth_{B(630)}/Rth_{B(550)} \leq 1.5 \quad \text{(X)}$$

(8) The liquid crystal display as defined in any one of Clauses (1) to (7), wherein at least one of the protective films A and B is a cellulose acylate film substantially made of a cellulose acylate having a glucose unit of cellulose, wherein a hydroxyl group in the glucose unit of is substituted by an acyl group having two or more carbon atoms, and the cellulose acylate film satisfies expressions (XI) and (XII):

$$2.0 \leq DS2+DS3+DS6 \leq 3.0 \quad \text{(XI)}$$

$$DS6/(DS2+DS3+DS6) \geq 0.315 \quad \text{(XII)}$$

wherein DS2, DS3 and DS6 represent substitution degrees of hydroxyl groups at 2-position, 3-position and 6-position in the glucose unit by the acyl group, respectively (9) The liquid crystal display as defined in Clause (8), wherein the acyl group is an acetyl group.

(10) The liquid crystal display as defined in any one of Clauses (1) to (7), wherein at least one of the protective films A and B is a cellulose acylate film substantially made of a cellulose acylate which is a mixed aliphatic acid ester of cellulose, wherein a hydroxyl group of the cellulose is substituted by an acetyl group and another hydroxyl group of the cellulose is substituted by an acyl group having three or more carbon atoms, and the cellulose acylate film satisfies expressions (XIII) and (XIV):

$$2.0 \leq A+B \leq 3.0 \quad \text{(XIII)}$$

$$0 < B \quad \text{(XIV)}$$

wherein A represents a substitution degree of the hydroxyl group by the acetyl group, and B represents a substitution degree of the hydroxyl group by the acyl group.

(11) The liquid crystal display as defined in Clause (10), wherein the acyl group is a butanoyl group.

(12) The liquid crystal display as defined in Clause (10), wherein the acyl group is a propionyl group.

(13) The liquid crystal display as defined in any one of Clauses (10) to (12), wherein the cellulose acylate film has a substitution degree of the hydroxyl group at 6-position of the cellulose, the substitution degree being of 0.75 or more.

(14) The liquid crystal display as defined in any one of Clauses (1) to (13), wherein at least one of the protective films A and B comprises at least one selected from the group consisting of a plasticizer, an ultraviolet absorber, a release accelerator, a dye and a matting agent.

(15) The liquid crystal display as defined in any one of Clauses (1) to (14), wherein at least one of the protective films A and B comprises at least one retardation increasing agent of a rod-shaped compound or discotic compound.

(16) The liquid crystal display as defined in any one of Clauses (1) to (15), wherein the liquid crystal cell is of vertically-aligned mode.

In accordance with the invention, a liquid crystal display having a wide viewing angle and a small color shift at the black state can be provided.

BRIEF DESCRIPTION OF THE DRAWINGS

FIG. 7 is a sectional view diagrammatically illustrating the sectional structure of a polarizing plate of the invention.

FIG. 8 is a sectional view diagrammatically illustrating the sectional structure of another polarizing plate of the invention.

DETAILED DESCRIPTION OF THE INVENTION

An exemplary invention will be further described hereinafter. In the case where the numerical value indicates physical property value, characteristic value or the like, the term "(numerical value 1) to (numerical value 2)" as used herein is meant to indicate "not smaller than (numerical value 1) to not greater than (numerical value 2)". Further, the term "(meth) acrylate" as used herein is meant to indicate "at least any of acrylate and methacrylate". This can apply to "(meth)acrylate", "(meth)acrylic acid", etc.

(Relationship Between Re, Rth of Protective Film and Δnd Value of Liquid Crystal Cell)

In the invention, it was found that a liquid crystal having a wide viewing angle and a small color shift at the black state can be provided by a liquid crystal display comprising a pair of polarizing plates having a protective film for polarizer, the pair of polarizing plates being disposed in cross-Nicol arrangement, one of the pair being disposed on one side of a liquid crystal cell and the other of the pair being disposed on the other side of the liquid crystal cell, wherein $Re_A(\lambda)$ and $Rth_A(\lambda)$ of the protective film A disposed on the liquid crystal cell side of one of the pair of polarizing plates, $Rth_B(\lambda)$ of the protective film B disposed on the liquid crystal cell side of the other of the pair of polarizing plates and $\Delta nd(\lambda)$ of the liquid crystal cell satisfy the following expressions (I) and (II) at any wavelength within the range of from 400 nm to 700 mm:

$$0.74 \times (\Delta nd(\lambda) - Rth_B(\lambda)) \leq Rth_A(\lambda) \leq 0.97 \times (\Delta nd(\lambda) - Rth_B(\lambda)) \quad (I)$$

$$0.018 \times \lambda^2/(\Delta nd(\lambda) - Rth_B(\lambda)) + 0.032 \times \lambda \leq Re_A(\lambda) \leq 0.036 \times \lambda^2/(\Delta nd(\lambda) - Rth_B(\lambda)) + 0.032 \times \lambda \quad (II)$$

wherein Re represents an in-plane retardation; Rth represents a thickness-direction retardation; ($\lambda$) means that the measurement wavelength is $\lambda$ nm; $\Delta n$ is the difference $(n_e - n_o)$ between an extraordinary index $n_e$ and an ordinary index $n_o$ of a liquid crystal in the liquid crystal cell; and d represents a cell gap by nm of the liquid crystal cell.

An effect of the invention will be described hereinafter in connection with the attached drawings.

Figure 1:
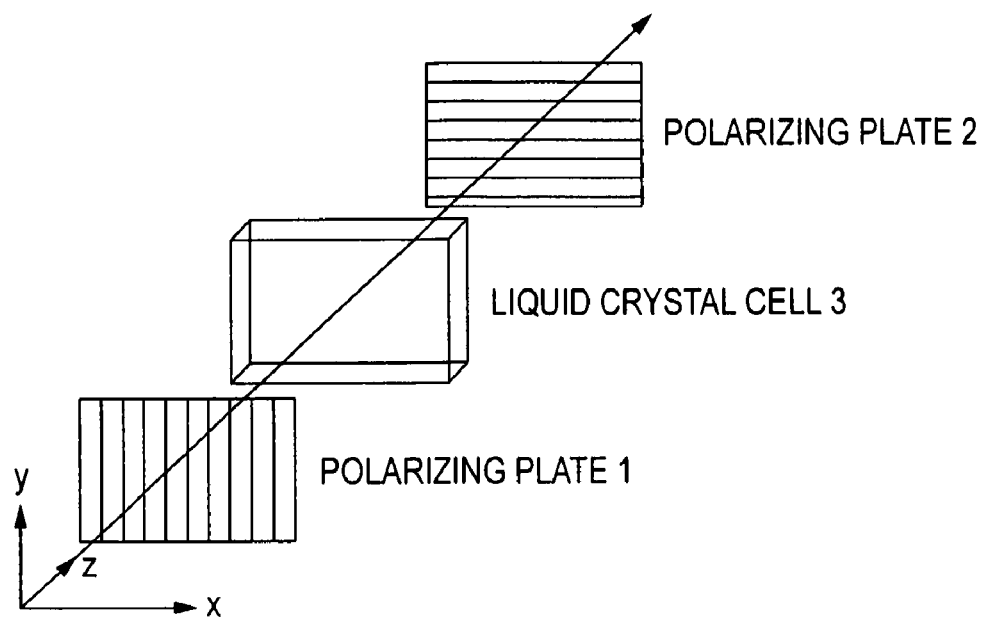
FIG. 1 is a schematic diagram illustrating an example of the configuration of a VA mode liquid crystal display and the case where light is incident on the panel in the direction normal to the panel.

FIG. 1 is a diagrammatic view illustrating the configuration of an ordinary VA mode liquid crystal display. A VA mode liquid crystal display comprises a liquid crystal cell 3 having a liquid crystal layer which causes liquid crystal molecules to align vertically with respect to the surface of the substrate when no voltage is applied thereto, i.e., at the black state and polarizing plates 1 and 2 aligned with the liquid crystal cell 3 interposed therebetween and their transmission axes (shown by the stripes in FIG. 1) disposed perpendicular to each other. In FIG. 1, light is incident on the liquid crystal display on the polarizing plate 1 side thereof. When light propagating in the direction normal to the surface of the polarizing plate 1, i.e., z axis direction is incident on the liquid crystal display, the light transmitted by the polarizing plate 1 passes through the liquid crystal cell 3 while being linearly polarized, and then is fully blocked by the polarizing plate 2. As a result, an image having a high contrast ratio can be displayed.

Figure 2:
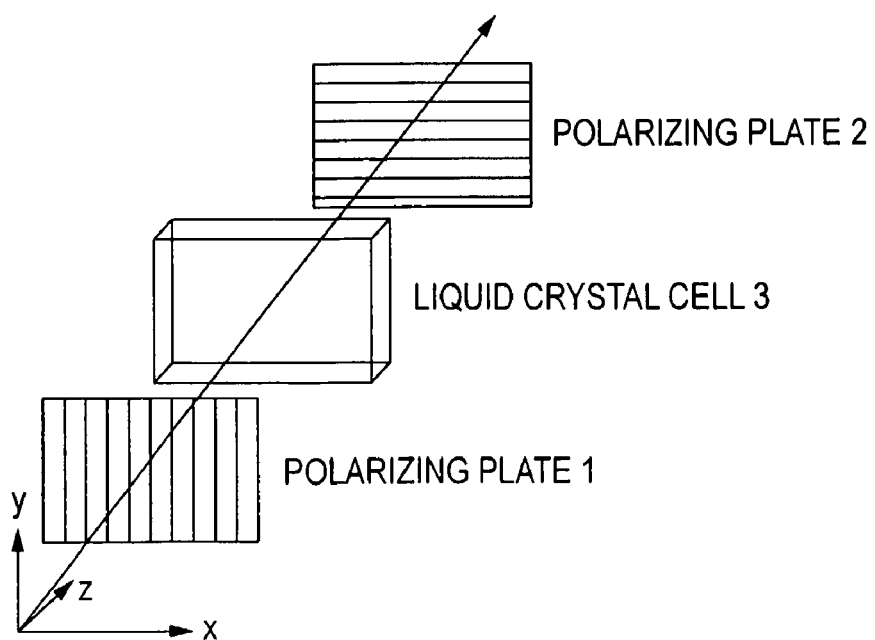
FIG. 2 is a schematic diagram illustrating another example of the configuration of a VA mode liquid crystal display and the case where light is incident on the panel in the direction oblique to the panel.

As shown in FIG. 2, however, oblique incidence of light behaves unlike the normal incidence. Light which is incident on the liquid crystal display in an oblique direction which is not z axis direction, i.e., direction oblique to the polarizing direction of the polarizing plates 1 and 2 (so-called OFF AXIS), is affected by an oblique retardation to show a change of polarization when it is transmitted by the vertically aligned liquid crystal layer of the liquid crystal cell 3. Further, the apparent transmission axis of the polarizing plates 1 and 2 are deviated from perpendicular alignment. Due to the two causes, light incident in the oblique direction in OFF AXIS cannot be fully blocked by the polarizing plate 2, causing light leakage at the black state and hence contrast ratio drop.

The polar angle and the azimuthal angle will be defined as follows. The polar angle is the angle of tilt from the direction normal to the surface of the film, i.e., z axis in FIGS. 1 and 2. For example, the direction normal to the surface of the film has a polar angle of 0°. The azimuthal angle indicates the direction of the line rotated clockwise from the positive direction of x axis. For example, the positive direction of x axis has an azimuthal angle of 0°. The positive direction of y axis has an azimuthal direction of 90°. The aforementioned oblique directions in OFF AXIS mainly include those having a polar angle which is not 0° and an azimuthal angle of 45°, 135°, 225° and 315°.

Figure 3:
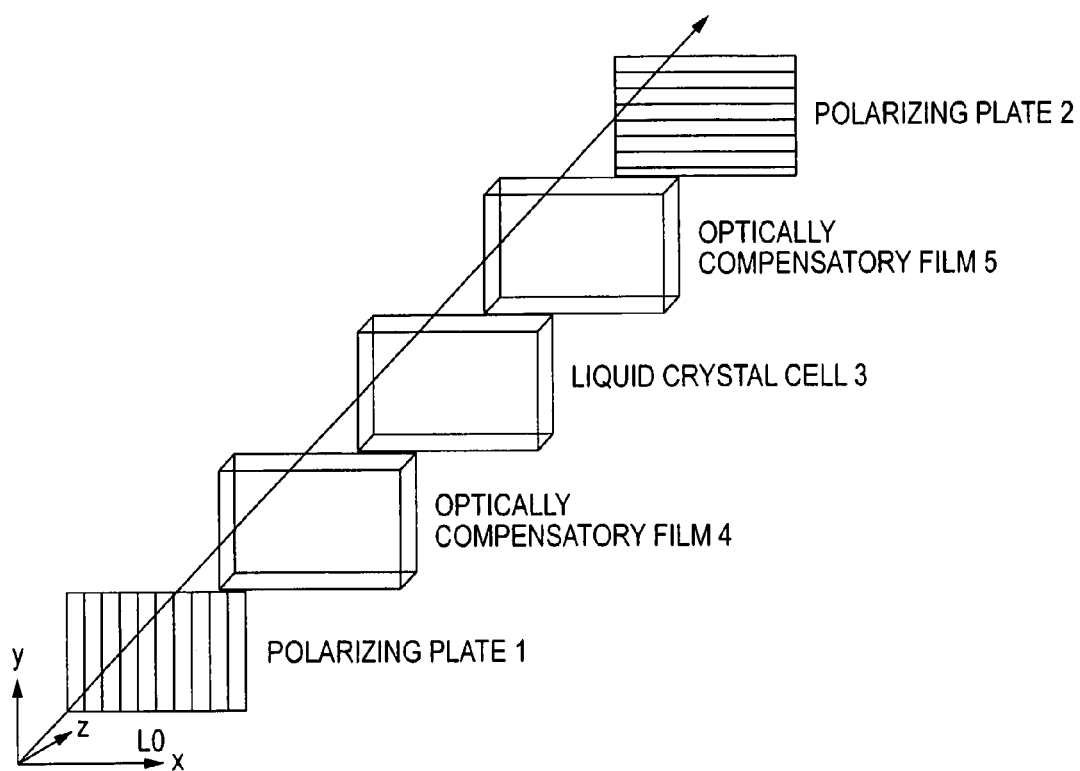
FIG. 3 is a schematic diagram illustrating an example of the configuration of an exemplary embodiment of the liquid crystal display of the invention.

FIG. 3 depicts a diagrammatic view of an example of configuration for illustrating the effect of the invention. The liquid crystal display shown in FIG. 3 is the same as that of FIG. 1 except that an optically compensatory film 4 is provided interposed between the liquid crystal cell 3 and the polarizing plate 1 and an optically compensatory film 5 is provided interposed between the liquid crystal cell 3 and the polarizing plate 2 (The protective films A, B in the invention are shown as optically compensatory film). In this arrangement, $Re_A(\lambda)$ and $Rth_A(\lambda)$ of the protective film A, $Rth_B(\lambda)$ of the protective film B disposed on the liquid crystal cell side of the other polarizing plate and $\Delta nd(\lambda)$ of the liquid crystal cell satisfy the following expressions (I) and (II) at any wavelength within the range of from 400 nm to 700 nm:

$$0.74 \times (\Delta nd(\lambda) - Rth_B(\lambda)) \leq Rth_A(\lambda) \leq 0.97 \times (\Delta nd(\lambda) - Rth_B(\lambda)) \quad (I)$$

$$0.018 \times \lambda^2/(\Delta nd(\lambda) - Rth_B(\lambda)) + 0.032 \times \lambda \leq Re_A(\lambda) \leq 0.036 \times \lambda^2/(\Delta nd(\lambda) - Rth_B(\lambda)) + 0.032 \times \lambda \quad (II)$$

More preferably, the aforementioned factors satisfy the following expressions (I') and (II')

$$0.72 \times (\Delta nd(\lambda) - Rth_B(\lambda)) \leq Rth_A(\lambda) \leq 0.95 \times (\Delta nd(\lambda) - Rth_B(\lambda)) \quad (I')$$

$$0.016 \times \lambda^2/(\Delta nd(\lambda) - Rth_B(\lambda)) + 0.032 \times \lambda \leq Re_A(\lambda) \leq 0.034 \times \lambda^2/(\Delta nd(\lambda) - Rth_B(\lambda)) + 0.032 \times \lambda \quad (II')$$

The protective film A is preferably provided on the backlight side.

In the invention, the combination of a liquid crystal layer and an optically compensatory film satisfying both the aforementioned expressions (I) and (II) makes it possible to make optical compensation with the slow axis and retardation suitable for a wavelength in the visible light range even if light having the wavelength is incident in oblique directions. The resulting liquid crystal display exhibits a drastically enhanced contrast ratio in oblique directions at the black state and drastically eliminated coloration in the viewing direction at the black state as compared with related art liquid crystal displays. The liquid crystal display of the invention preferably satisfies both the aforementioned expressions (I) and (II) at least at two different wavelengths. More preferably, the liquid crystal display of the invention satisfies both the two expressions (I) and (II) at two wavelengths which are different from each other by 50 nm or more. The wavelengths at which the aforementioned conditions can be satisfied depend on the usage of the liquid crystal display and the wavelength and wavelength range at which the display properties can be mostly affected may be selected. In general, the liquid crystal display preferably satisfies the aforementioned expressions (I) and (II) at a wavelength of 650 nm, 550 nm and 450 nm, which correspond to red (R), green (G) and blue (B), respectively, which are three primaries. The wavelength of R, G and B are not necessarily represented by the aforementioned values, but the aforementioned values are thought appropriate for the definition of the optical properties by which the effect of the invention can be exerted.

Figure 4:
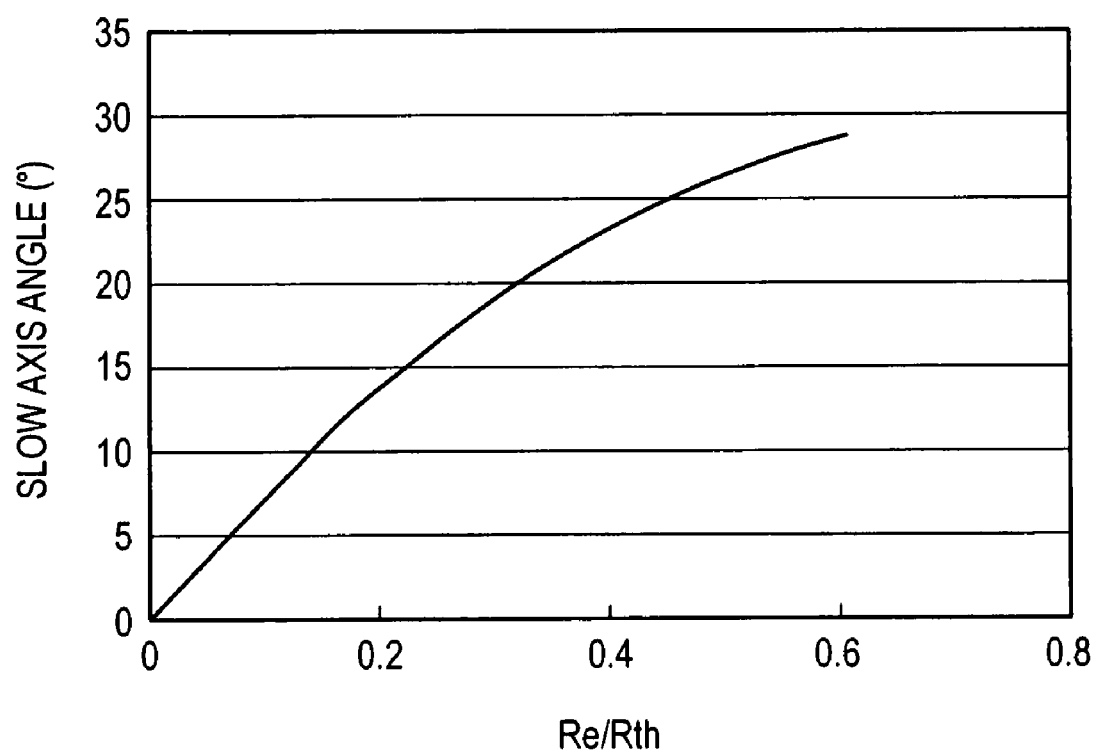
FIG. 4 is a graph illustrating the optical properties of an example of the optically compensatory film to be used in the invention.

The principle of compensation of the invention will be further described hereinafter. In the invention, $Re/\lambda$ and $Rth/\lambda$, which each are a ratio of retardation to wavelength, are particularly noted. This is because $Re/\lambda$ and $Rth/\lambda$ each are an amount representing birefringence and the most important parameter that determines the phase in the case where polarization transition is made. Re/Rth, which is the ratio of Re/λ to Rth/λ, determines the two axes of intrinsic polarization in the propagation of light in the direction oblique to the biaxial birefringent medium. FIG. 4 depicts an example of the result of calculation of relationship between the direction of one of the two axes of intrinsic polarization and Re/Rth in the case where light is incident on the biaxial birefringent medium in oblique directions. The direction of propagation of light is assumed to be at an azimuthal angle of 45° and a polar angle of 80°. As can be seen in the results shown in FIG. 4, once Re/Rth is determined, one of the axes of intrinsic polarization can be determined. Further, Re/λ and Rth/λ have an action of changing the two intrinsic polarization phases.

In the related art technique, the wavelength dispersion of a film for compensating VA mode has been defined by Re, Rth or Re/Rth. In the invention, a principle has been found that, noting Re/λ and Rth/λ rather than Re, Rth or Re/Rth, when the parameter is rendered dimensionless, VA mode can be compensated at a wavelength λ. Further, paying their attention also to the fact that the birefringence Δnd of the liquid crystal layer to be compensated has a wavelength dispersion, the inventors made extensive studies of the relationship between the wavelength dispersion of Re and Rth of the optically compensatory film and the wavelength dispersion of the birefringence Δnd of the liquid crystal layer to be optically compensated and then found that when the aforementioned expressions (I) and (II) are satisfied, the viewing angle properties of the liquid crystal display are drastically improved. The liquid crystal display of the invention satisfies the aforementioned expressions (I) and (II) to make accurate optical compensation of liquid crystal cell and eliminate the contrast ratio drop even when light is incident thereon in oblique directions to cause two factors, i.e., effect of retardation of liquid crystal layer in oblique directions and deviation of apparent transmission axis of a pair of upper and lower polarizing plates.

A VA mode liquid crystal display has its liquid crystal molecules vertically aligned when no voltage is applied thereto, i.e., at the black state. Accordingly, it is preferred that the in-plane slow axis of the optically compensatory film be disposed perpendicular or parallel to the polarizing plate or the polarizing plate so that the polarization of light incident in the direction along the normal line cannot be affected by the retardation of the optically compensatory film during black display.

Figure 5:
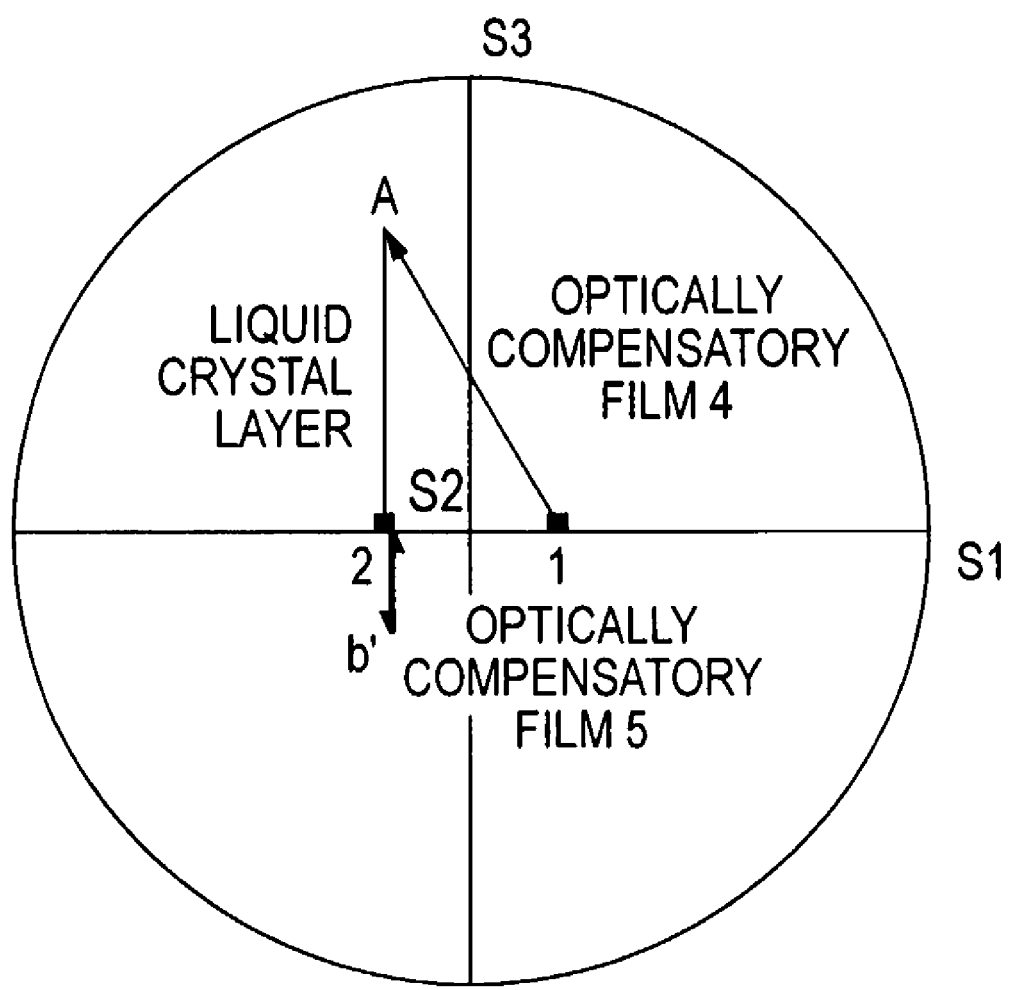
FIG. 5 is a schematic diagram of Poincaré sphere used to explain the change of polarization of light incident on a liquid crystal display of the invention.

FIG. 5 depicts a diagram illustrating the compensating mechanism of the invention in the liquid crystal display having the configuration of FIG. 3 using a Poincaré sphere. In this diagram, the propagation of light is at an azimuthal angle of 45° and a polar angle of 34°. In FIG. 5, S2 axis is an axis extending in the direction perpendicular to paper as viewed on the drawing. FIG. 5 is a diagram of Poincaré sphere as viewed from the positive side of S2 axis. Since FIG. 5 is shown two-dimensionally, the displacement of points due to the change of polarization is represented by the straight line arrow in the drawing. Actually, the change of polarization developed when light passes through the liquid crystal layer or optically compensatory film is represented by the rotation around a specific axis determined according to respective optical properties at a specific angle on Poincaré sphere.

Figure 6:
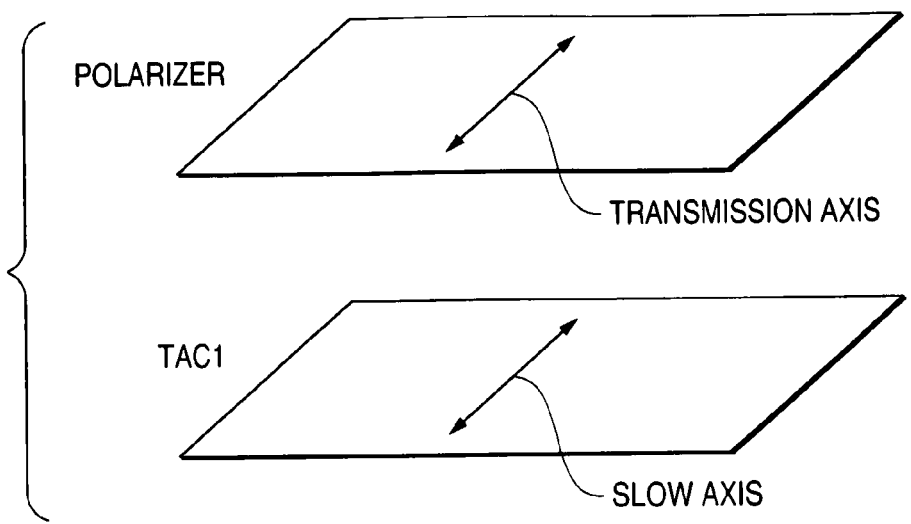
FIG. 6 is a diagram illustrating a method for stacking a cellulose acylate film during the production of the polarizing plate of the invention.

The polarization of incident light passing through the polarizing plate 1 in FIG. 3 corresponds to the point 1 in FIG. 6. The polarization of light blocked by the absorption axis of the polarizing plate 2 in FIG. 3 corresponds to the point 2 in FIG. 5. In a related art VA mode liquid crystal display, OFF AXIS light leakage in oblique direction is attributed to the deviation of these points 1 and 2. An optically compensatory film is normally used to cause the polarization of incident light to change from the point 1 to the point 2, including the change of polarization in the liquid crystal layer. The liquid crystal layer of the liquid crystal cell 3 exhibits a positive refractive anisotropy and is vertically aligned. Accordingly, the change of polarization of incident light developed when light passes through the liquid crystal layer is shown by the arrow extending downward in FIG. 5 and is represented by the rotation around S1 axis (rotation from the point A to the point B in the figure). The angle of rotation is proportional to the value $\Delta n'd'/\lambda$ obtained by dividing the effective retardation $\Delta n'd'$ of the liquid crystal layer in oblique direction by wavelength $\lambda$. In order to compensate this liquid crystal layer, the present embodiment employs optically compensatory films 4 and 5. The length of the obliquely upward arrow of the optically compensatory films 4 and 5 (length of the arrow from point 1 to point A and length of the arrow from point B to point 2 in the drawing), i.e., rotational angles are substantially proportional to Rth/λ of the optically compensatory films 4 and 5, respectively, and rotational axes of the arrows are determined by Re/Rth as described above. As can be seen in FIG. 5, in order to optically compensate a VA mode liquid crystal cell with the optically compensatory films 4 and 5, it is necessary that when a liquid crystal layer having a great $\Delta n'd'/\lambda$ value is used, Rth/λ of the optically compensatory films 4 and 5 be raised to increase the length of the arrow from point 1 to point A and the length of the arrow from point B to point 2. Further, in order to make the obliquely upward arrow from point 1 to point A and the obliquely upward arrow from point B to point 2 more upward, it is necessary that Re/Rth of the optically compensatory films 4 and 5 be reduced, that is, Re/λ of the optically compensatory films 4 and 5 be reduced. In the present embodiment, with the proviso that the aforementioned expressions (I) and (II) are satisfied, Re/λ and Rth/λ of the optically compensatory films are determined according to $\Delta n'd'$ of the liquid crystal layer to make accurate optical compensation. In the present embodiment, once Δnd and wavelength λ of the liquid crystal layer at a wavelength λ to be optically compensated are determined, $\Delta n'd'/\lambda$ is determined. An optically compensatory film showing Re/λ and Rth/λ that satisfy the aforementioned relationships according to $\Delta n'd'/\lambda$ thus determined may be used. In the embodiment shown in FIG. 3, upper and lower, totaling two sheets of, optically compensatory films are used. In particular, when the upper and lower optical films have the same properties, the downward arrow in the liquid crystal layer makes transition on S1=0 on Poincaré sphere and the starting point and the end point of the downward arrow in the liquid crystal layer are present in the upper hemisphere and the lower hemisphere of Poincaré sphere, respectively, symmetrically with the equator interposed therebetween from the symmetrical standpoint of view.

In addition to the requirement that the aforementioned expressions (I) and (II) be satisfied at any wavelength within the range of from 400 nm to 700 nm, the hue a* and b* of the polarizing plates disposed in cross-Nicol arrangement preferably satisfy the following expressions (III) and (IV) to further prevent coloration of black display in front direction and oblique directions.

$$-1.0 \leq a^* \leq 2.0 \quad \text{(III)}$$

$$-1.0 \leq b^* \leq 2.0 \quad \text{(IV)}$$

More preferably, the relationships $-0.5 \leq a^* \leq 1.5$ and $-0.5 \leq b^* \leq 1.5$ are satisfied.

In order to further prevent coloration of black display in front direction and oblique directions, the color temperature of the backlight is preferably set to be from 8,000 K to 10,000 K, more preferably from 8,500 K to 9,900 K.

The expressions (I) and (II) are preferably satisfied at least at two wavelengths within the range of from 400 nm to 700 nm. However, in the case where the two numerical expressions are satisfied at only one wavelength, when $Re_A(\lambda)$ and $Rth_A(\lambda)$ of the protective film A disposed on the liquid crystal cell side satisfy the following expressions (V) to (VIII), the inhibition of fluctuation of brightness and the inhibition of coloration at the black state in oblique directions can be realized.

$$1.0 \leq Re_{A(480)}/Re_{A(550)} \leq 1.1 \quad (V)$$

$$0.9 \leq Re_{A(630)}/Re_{A(550)} \leq 1.0 \quad (VI)$$

$$1.0 \leq Rth_{A(480)}/Rth_{A(550)} \leq 1.1 \quad (VII)$$

$$0.9 \leq Rth_{A(630)}/Rth_{A(550)} \leq 1.0 \quad (VIII)$$

$Rth_B(590)$ of the protective film B disposed on the liquid crystal cell side is preferably from 0 nm to 150 nm. In this arrangement, an effect can be exerted of providing a wide viewing angle and eliminating color shift at the black state developed when the viewing direction is tilted.

Further, $Re_B(590)$ of the protective film B disposed on the liquid crystal cell side is preferably from 0 nm to 20 nm. In this arrangement, an effect can be exerted of enlarging the viewing angle. Moreover, the horizontal asymmetry of viewing angle or tint developed when the angle of slow axis of the protective film B is dispersed can be suppressed.

More preferably, $Rth_B(590)$ and $Re_B(590)$ are from 60 nm to 150 nm and from 0 nm to 10 nm, respectively.

Moreover, $Rth_B(\lambda)$ of the protective film B disposed on the liquid crystal cell side preferably satisfies the following numerical expressions (IX) to (X). In this arrangement, an effect can be exerted of eliminating color shift at the black state developed when the viewing direction is tilted.

$$0 \leq RthB(480)/RthB(550) \leq 1.0 \quad (IX)$$

$$1.0 \leq RthB(630)/RthB(550) \leq 1.5 \quad (X)$$

More preferably, $Rth_B(\lambda)$ of the protective film B disposed on the liquid crystal cell side satisfies the relationships $0.5 \leq Rth_B(480)/Rth_B(550) \leq 1.0$ and $1.0 \leq Rth_B(630)/Rth_B(550) \leq 1.3$.

Re value and Rth value of the protective film can be adjusted by adjusting the substitution degree of cellulose acylate, the kind and amount of retardation increasing agent to be incorporated in the cellulose acylate film, the drying temperature and time of the cellulose acylate film, the draw ratio and stretching temperature of the cellulose acylate film and the residual solvent content of the cellulose acylate film during stretching if the cellulose acylate film is used as protective film. The preferred range and controlling method of these factors to be controlled will be described hereinafter.

The cellulose acylate film to be used in the invention will be further described hereinafter. In the invention, two or more different cellulose acylates may be used in admixture. In the case where the cellulose acylate film is a protective film disposed on the liquid crystal cell side of the polarizing plate, the following expressions (XI) and (XII) are preferably satisfied supposing that the substitution degrees of hydroxyl groups at 2-position, 3-position and 6-position in the glucose units constituting cellulose by acyl groups are DS2, DS3 and DS6, respectively:

$$2.0 \leq DS2+DS3+DS6 \leq 3.0 \quad (XI)$$

$$DS6/(DS2+DS3+DS6) \geq 0.315 \quad (XII)$$

By satisfying the aforementioned expressions (XI) and (XII), the solubility of the cellulose acylate can be enhanced, making it possible to reduce the humidity dependence of optical anisotropy.

The smaller the sum of DS2, DS3 and DS6 is, the greater is the developability of optical anisotropy, but the greater is the change of optical anisotropy with humidity to disadvantage from the practical standpoint of view. On the contrary, the greater the sum of DS2, DS3 and DS6 is, the smaller is the change of optical anisotropy with humidity, but the smaller is the developability of optical anisotropy. Accordingly, in order to realize both the enhancement of the developability of optical anisotropy and the reduction of the change of optical anisotropy with humidity, the sum of DS2, DS3 and DS6 is more preferably from 2.2 to 2.9, still more preferably from 2.4 to 2.85.

In order to suppress the change of optical anisotropy with humidity without impairing the developability of optical anisotropy, DS6/(DS2+DS3+DS6) is preferably 0.315 or more, more preferably 0.318 or more.

The aforementioned specific cellulose acylate may be a mixed aliphatic acid ester of cellulose having its hydroxyl groups substituted by an acetyl group and an acyl group having three or more carbon atoms wherein the substitution degrees of the hydroxyl groups in the cellulose satisfies the following expressions (XIII) and (XIV):

$$2.0 \leq A+B \leq 3.0 \quad (XIII)$$

$$0 < B \quad (XIV)$$

wherein A and B each represent the substitution degrees of hydroxyl groups in the cellulose by acyl groups in which A is the substitution degree by acetyl group and B is the substitution degree by acyl group having three and more carbon atoms.

The β-1,4-bonded glucose unit constituting the cellulose has a free hydroxyl group at 2-position, 3-position and 6-position. The cellulose acylate is a polymer obtained by esterifying some or whole of these hydroxyl groups by acyl group. The acyl substitution degree represents the proportion of esterification at each of 2-position, 3-position and 6-position (100% esterification means a substitution degree of 1).

In the invention, the sum (A+B) of the substitution degrees of hydroxyl groups by A and B is from 2.0 to 3.0, preferably from 2.2 to 2.9, particularly preferably from 2.40 to 2.85 as represented by the aforementioned numerical expression (XIII). The substitution degree B is preferably more than 0, more preferably 0.6 or more as represented by the aforementioned numerical expression (XIV).

When the sum of A and B is less than 2.0, the resulting cellulose acylate exhibits a high hydrophilicity and thus is subject to the effect of environmental humidity.

Further, B is preferably a substituent 28% or more, more preferably 30% or more, even more preferably 31% or more, particularly preferably 32% or more of which substitutes on hydroxyl group at 6-position.

Moreover, the sum of A and B at 6-position of cellulose acylate is preferably 0.75 or more, more preferably 0.80 or more, particularly preferably 0.85 or more. The aforementioned cellulose acylate can provide a film-forming solution having a desired solubility and filterability and can provide a good solution even when dissolved in a non-chlorine-based organic solvent. Further, a solution having a low viscosity and a good filterability can be prepared.

The acyl group (B) having three or more carbon atoms may be an aliphatic group or aromatic hydrocarbon group and is not specifically limited. Examples of the aliphatic group or aromatic hydrocarbon group include alkylcarbonyl ester, alkenylcarbonyl ester, aromatic carbonyl ester and aromatic alkylcarbonyl ester of cellulose. These acyl groups may further have substituted groups. Preferred examples of the group B include propionyl, butanoyl, keptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl. Preferred among these groups are propionyl, butanoyl, dodecanoyl, octadecanoyl, t-butanoyl, oleoyl, benzoyl, naphthylcarbonyl, and cinnamoyl. Particularly preferred among these groups B are propionyl and butanoyl. In the case where the group B is propionyl, the substitution degree B is preferably 1.3 or more.

Specific examples of the aforementioned mixed aliphatic acid cellulose acylate include cellulose acetate propionate, and cellulose acetate butyrate.

(Method of Synthesizing Cellulose Acylate)

A basic principle of the method of synthesizing cellulose acylate is described in Migita et al, "Mokuzai Kagaku (Wood Chemistry)", pp. 180-190, Kyoritsu Shuppan, 1968. A typical synthesis method involves liquid phase acetylation in the presence of a carboxylic anhydride-acetic acid-sulfuric acid catalyst.

In order to obtain the aforementioned cellulose acylate, a cellulose material such as cotton linter and wood pulp is pretreated with a proper amount of acetic acid, and then put in a carboxylated mixture which has been previously cooled to undergo esterification to synthesize a complete cellulose acylate (the sum of substitution degrees by acyl groups at the 2-, 3- and 6-positions is almost 3.00). The aforementioned carboxylated mixture normally comprises acetic acid as a solvent, carboxylic anhydride as an esterifying agent and sulfuric acid as a catalyst. The carboxylic anhydride is normally used stoichiometrically in excess of the sum of the amount of cellulose reacting with the carboxylic anhydride and water content present in the system. The termination of the esterification reaction is followed by the addition of an aqueous solution of a neutralizing agent (e.g., carbonate, acetate or oxide of calcium, magnesium, iron, aluminum or zinc) for the purpose of hydrolyzing excessive carboxylic anhydride left in the system and neutralizing part of the esterification catalyst. Subsequently, the complete cellulose acylate thus obtained is kept at a temperature of from 50° C. to 90° C. in the presence of a small amount of an acetylation reaction catalyst (normally remaining sulfuric acid) to undergo saponification ripening that causes the conversion to cellulose acylate having a desired acyl substitution degree and polymerization degree. At the time when such a desired cellulose acylate is obtained, the catalyst remaining in the system is completely neutralized with a neutralizing agent mentioned above or the cellulose acylate solution is put in water or diluted sulfuric acid without being neutralized (alternatively, water or diluted sulfuric acid is put in the cellulose acylate solution) to separate the cellulose acylate which is then washed and stabilized or otherwise processed to obtain the aforementioned specific cellulose acylate.

In the aforementioned cellulose acylate film, the polymer component constituting the film is preferably made substantially of the aforementioned specific cellulose acylate. The "substantially" as used herein is meant to indicate 55% or more (preferably 70% or more, more preferably 80% or more) of the polymer component.

The aforementioned cellulose acylate is preferably used in particulate form 90% by mass (weight) or more of the particles used preferably have a particle diameter of from 0.5 mm to 5 mm. Further, 50% by mass or more of the particles used preferably have a particle diameter of from 1 mm to 4 mm. The particulate cellulose acylate preferably is in a form as much as close to sphere.

The polymerization degree of cellulose acylate which is preferably used in the invention is preferably from 200 to 700, more preferably from 250 to 550, even more preferably from 250 to 400, particularly from 250 to 350 as calculated in terms of viscosity-average polymerization degree. The average polymerization degree can be measured by an intrinsic viscosity method proposed by Uda et al (Kazuo Uda, Hideo Saito, "Seni Gakkaishi (JOURNAL OF THE SOCIETY OF FIBER SCIENCE AND TECHNOLOGY, JAPAN)", No. 1, Vol. 18, pp. 105-120, 1962). For more details, reference can be made to JP-A-9-95538.

When low molecular components are removed, the resulting cellulose acylate has a raised average molecular weight (polymerization degree). However, the viscosity of the cellulose acylate is lower than that of ordinary acylates. Thus, as the aforementioned cellulose acylate, those freed of low molecular components are useful. Cellulose acylates having a small content of low molecular components can be obtained by removing low molecular components from cellulose acylates which have been synthesized by an ordinary method. The removal of the low molecular components can be carried out by washing the cellulose acylate with a proper organic solvent. In order to produce the cellulose acylate having a small content of low molecular components, the amount of the sulfuric acid catalyst in the acetylation reaction is preferably adjusted to a range of from 0.5 to 25 parts by mass based on 100 parts by mass of cellulose acylate. When the amount of the sulfuric acid catalyst falls within the above defined range, a cellulose acylate which is desirable also in the light of molecular weight distribution (uniform molecular weight distribution) can be synthesized. When used in the production of the cellulose acylate, the cellulose acylate preferably has a water content of 2% by mass or less, more preferably 1% by mass or less, particularly 0.7% by mass or less. A cellulose acylate normally contains water and is known to have a water content of from 2.5% to 5% by mass. In order to provide the cellulose acylate with a water content falling within this range in the invention, the cellulose acylate needs to be dried. The drying method is not specifically limited so far as the desired water content is attained.

For the details of cotton as starting material of the aforementioned cellulose acylate and its synthesis method, reference can be made to Kokai Giho No. 2001-1745, Mar. 15, 2001, Japan Institute of Invention and Innovation, pp. 7-12.

The cellulose acylate film according to the invention can be obtained by filming a solution of the aforementioned specific cellulose acylate and optionally additives in an organic solvent.

(Additives)

Examples of the additives which can be incorporated in the aforementioned cellulose acylate solution in the invention include plasticizer, ultraviolet absorber, deterioration inhibitor, retardation (optical anisotropy) increasing agent (developer), retardation (optical anisotropy) decreasing agent (reducer), particulate material, release accelerator, and infrared absorber. In the invention, a retardation increasing agent is preferably used. Further, at least one of plasticizer, ultraviolet absorber, release accelerator, dye and matting agent is preferably used.

These additives may be in the form of solid material or oil-based material. In other words, these additives are not specifically limited in their melting point or boiling point. For example, ultraviolet absorbers having a melting point of 20°

C. or less and 20° C. or more may be used in admixture with each other or a plasticizer. For details, reference can be made to JP-A-2001-151901.

As the ultraviolet absorber there may be used an arbitrary kind of ultraviolet absorber depending on the purpose. Examples of the ultraviolet absorber employable herein include salicylic acid ester-based absorbers, benzophenone-based absorbers, benzotriazole-based absorbers, benzoate-based absorbers, cyano acrylate-based absorbers, and nickel complex salt-based absorbers. Preferred among these ultraviolet absorbers are benzophenone-based absorbers, benzotriazole-based absorbers, and salicylic acid ester-based absorbers. Examples of the benzophenone-based ultraviolet absorbers include 2,4-dihydroxybenzophenone, 2-hydroxy-4-acetoxybenzopheone, 2-hydroxy-4-methoxy benzophenone, 2,2'-di-hydroxy-4-metoxybenzopheone, 2,2'-di-hydroxy-4,4'-metoxybenzophenone, 2-hydroxy-4-n-octoxybenzophenone, 2-hydroxy-4-dodecyloxy benzophenone, and 2-hydroxy-4-(2-hydroxy-3-methacryloxy)propoxybenzophenone. Examples of the benzotriazole-based ultraviolet absorbers include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amylphenyl)benzotriazole, 2(2'-hydroxy-3',5'-di-tert-butylphenyl)-5-chlorobenzotriazole, and 2(2'-hydroxy-5'-tert-octylphenyl)benzotriazole. Examples of the salicylic acid ester-based absorbers include phenyl salicylate, p-octylphenyl salicylate, and p-tert-butyl phenyl salicylate. Particularly preferred among these exemplified ultraviolet absorbers are 2-hydroxy-4-methoxybenzophenone, 2,2'-dihydroxy-4,4'-methoxy benzophenone, 2(2'-hydroxy-3'-tert-butyl-5'-methyl phenyl)-5-chlorobenzotriazole, 2(2'-hydroxy-5'-tert-butylphenyl)benzotriazole, 2(2'-hydroxy-3',5'-di-tert-amylphenyl)benzotriazole, and 2(2'-hydroxy-3',5'-di-tert-butyphenyl)-5-chlorobenzotriazole.

A plurality of ultraviolet absorbers having different absorption wavelengths are preferably used to obtain a high barrier effect within a wide wavelength range. As the ultraviolet absorber for liquid crystal there is preferably used one having an excellent absorption of ultraviolet rays having a wavelength of 370 nm or less from the standpoint of prevention of deterioration of liquid crystal or one having little absorption of visible light having a wavelength of 400 nm or more. Particularly preferred examples of the ultraviolet absorbers include benzotriazole-based compounds and salicylic acid ester-based compounds previously exemplified. Preferred among these ultraviolet absorbers are benzotriazole-based compounds because they cause little unnecessary coloration of cellulose ester.

As the ultraviolet absorbers there may be used also compounds disclosed in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509, and JP-A-2000-204173.

The amount of the ultraviolet absorbers to be incorporated is preferably from 0.001% to 5% by mass, more preferably from 0.01% to 1% by mass based on the cellulose acylate. When the amount of the ultraviolet absorbers to be incorporated falls below 0.001% by mass, the desired effect of these ultraviolet absorbers cannot be sufficiently exerted. On the contrary, when the amount of the ultraviolet absorbers to be incorporated exceeds 5% by mass, the ultraviolet absorbers can bleed out to the surface of the film.

Further, the ultraviolet absorber may be added at the same time as the dissolution of cellulose acylate or may be added to the dope prepared by dissolution. It is particularly preferred that using a static mixer, an ultraviolet absorber be added to the dope which is ready to be flow-casted because the spectral absorption characteristics can be easily adjusted.

The aforementioned deterioration inhibitor can be used to prevent the deterioration or decomposition of cellulose triacetate, etc. Examples of the deterioration inhibitor include compounds such as butylamine, hindered amine compound (JP-A-8-325537), guanidine compound (JP-A-5-271471), benzotriazole-based ultraviolet absorber (JP-A-6-235819) and benzophenone-based ultraviolet absorber (JP-A-6-118233).

As the plasticizer there is preferably used phosphoric acid ester or carboxylic acid ester. The aforementioned plasticizer is more preferably selected from the group consisting of triphenyl phosphate (TPP), tricresyl phosphate (TCP), cresyl diphenyl phosphate, octyl diphenyl phosphate, biphenyl diphenyl phosphate (BDP), trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), triethyl O-acetylcitrate (OACTE), tributyl O-acetylcitrate (OACTB), acetyltriethyl citrate, acetyltributyl citrate, butyl oleate, methylacetyl ricinoleate, dibutyl sebacate, triacetin, tributylin, butylphthalyl glycolate, ethylphthalylethyl glycolate, methylphthalylethyl glycolate, and butylphthalylbutyl glycolate. Further, the aforementioned plasticizer is preferably selected from the group consisting of (di)pentaerythritolesters, glycerolesters and diglycerolesters.

Examples of the release accelerator include citric acid ethylesters. For the details of the infrared absorbers, reference can be made to JP-A-2001-194522.

Further, in the invention, a dye may be added to adjust hue. The content of the dye is preferably from 10 ppm to 1,000 ppm, more preferably from 50 ppm to 500 ppm based on the weight of the cellulose acylate. The incorporation of dye makes it possible to reduce light piping of the cellulose acylate film and improve yellowish tint. These compounds may be added together with the cellulose acylate or solvent during the preparation of the cellulose acylate solution or singly during or after the preparation of the cellulose acylate solution. Alternatively, these compounds may be added to the ultraviolet absorber solution to be inline added. A condensed quinone ring compound such as anthraquinone derivative disclosed in JP-A-5-34858 may be used as a dye.

These additives may be added at any time during the process of preparing the dope. The step of adding these additives may be conducted at the final step in the process of preparing the dope. Further, the amount of these materials to be added is not specifically limited so far as their functions can be exhibited. In the case where the cellulose acylate film is formed in a multi-layer form, the kind and added amount of additives in the various layers may be different. As disclosed in JP-A-2001-151902 for example, these techniques have heretofore been known. The glass transition point Tg of the cellulose acylate film measured by a tensile testing machine (Vibron: DVA-225, produced by IT Keisoku Seigyo K.K.) and the elastic modulus of the cellulose acylate film measured by a tensile testing machine (Strograph R2 (produced by Toyo Seiki Seisaku-Sho, Ltd.) are preferably predetermined to a range of from 70° C. to 150° C. and from 1,500 to 4,000 MPa, more preferably from 80° C. to 135° C. and from 1,500 to 3,000 MPa, respectively, by properly selecting the kind and added amount of these additives. In other words, the glass transition point Tg and the elastic modulus of the cellulose acylate film according to the invention preferably fall within the above defined range from the standpoint of process adaptability such as working of polarizing plate and assembly of liquid crystal display.

As these additives there may be preferably used those disclosed in detail in Kokai Giho No. 2001-1745, Mar. 15, 2001, pp. 16 and after, Japan Institute of Invention and Innovation.

(Retardation Increasing Agent)

In the invention, a retardation increasing agent is preferably used to realize a desired retardation value.

The retardation increasing agent to be used in the invention may be one made of a rod-shaped or discotic compound.

As the aforementioned rod-shaped or discotic compound there may be used a compound having at least two aromatic rings.

The amount of the retardation increasing agent made of a rod-shaped compound to be incorporated is preferably from 0.1 to 30 parts by mass, more preferably from 0.5 to 20 parts by mass, particularly preferably from 3 to 10 parts by mass, based on 100 parts by mass of the polymer component containing cellulose acylate.

The retardation increasing agent composed of a discotic compound is preferably used in an amount of from 0.1 to 30 parts by mass, more preferably from 0.5 to 20 parts by mass, particularly preferably from 3 to 10 parts by mass based on 100 parts by mass of the polymer component containing cellulose acylate.

The discotic compound is superior to the rod-shaped compound in Rth retardation developability and thus is preferably used in the case where a remarkably great Rth retardation is required.

Two or more retardation increasing agents may be used in combination.

The aforementioned retardation increasing agent made of rod-shaped compound or discotic compound preferably has a maximum absorption at a wavelength of from 250 to 400 nm and substantially no absorption in the visible light range.

The discotic compound will be further described hereinafter. As the discotic compound there may be used a compound having at least two aromatic rings.

The term "aromatic ring" as used herein is meant to include aromatic heterocyclic groups in addition to aromatic hydrocarbon rings.

The aromatic hydrocarbon ring is preferably a 6-membered ring (i.e., benzene ring) in particular.

The aromatic heterocyclic group is normally an unsaturated heterocyclic group. The aromatic heterocyclic group is preferably a 5-membered ring, 6-membered ring or 7-membered ring, more preferably a 5-membered ring or 6-membered ring. The aromatic heterocyclic group normally has the most numerous double bonds. As hetero atoms there are preferably used nitrogen atom, oxygen atom and sulfur atom, particularly nitrogen atom. Examples of the aromatic heterocyclic group include furane ring, thiophene ring, pyrrole ring, oxazole ring, isooxazole ring, thiazole ring, isothiazole ring, imidazole ring, pyrazole ring, furazane ring, triazole ring, pyrane ring, pyridine ring, pyridazine ring, pyrimidine ring, pyrazine ring, and 1,3,5-triazine ring.

Preferred examples of the aromatic ring include benzene ring, furane ring, thiophene ring, pyrrole ring, oxazole ring, thiazole ring, imidazole ring, triazole ring, pyridine ring, pyrimidine ring, pyrazine ring, and 1,3,5-triazine ring. Particularly preferred among these aromatic rings is 1,3,5-triazine ring. In some detail, as the discotic compound there is preferably used one disclosed in JP-A-2001-166144.

The number of aromatic rings contained in the aforementioned discotic compound is preferably from 2 to 20, more preferably from 2 to 12, even more preferably from 2 to 8, most preferably from 2 to 6.

Referring to the connection of two aromatic rings, (a) they may form a condensed ring, (b) they may be connected directly to each other by a single bond or (c) they may be connected to each other via a connecting group (No spiro bond cannot be formed due to aromatic ring). Any of the connections (a) to (c) may be established.

Preferred examples of the condensed ring (a) (formed by the condensation of two or more aromatic rings) include indene ring, naphthalene ring, azlene ring, fluorene ring, phenathrene ring, anthracene ring, acenaphthylene ring, biphenylene ring, naphthacene ring, pyrene ring, indole ring, isoindole ring, benzofurane ring, benzothiophene ring, benzotriazole ring, purine ring, indazole ring, chromene ring, quinoline ring, isoquinoline ring, quinolidine ring, quinazoline ring, cinnoline ring, quinoxaline ring, phthaladine ring, puteridine ring, carbazole ring, acridine ring, phenathridine, xanthene ring, phenazine ring, phenothiazine ring, phenoxathine ring, phenoxazine ring, and thianthrene ring. Preferred among these condensed rings are naphthalene ring, azlene ring, indole ring, benzooxazole ring, benzothiazole ring, benzoimidazole ring, benzotriazole ring, and quinoline ring.

The single bond (b) is preferably a bond between the carbon atom of two aromatic rings. Two or more aromatic rings may be connected via two or more single bonds to form an aliphatic ring or nonaromatic heterocyclic group between the two aromatic rings.

The connecting group (c), too, is preferably connected to the carbon atom of two aromatic rings. The connecting group is preferably an alkylene group, alkenylene group, alkynylene group, —CO—, —O—, —NH—, —S— or combination thereof. Examples of the connecting group comprising these groups in combination will be given below. The order of the arrangement of components in the following connecting groups may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and connecting group may have substituents.

Examples of the substituents include halogen atoms (F, Cl, Br, I), hydroxyl groups, carboxyl groups, cyano groups, amino groups, sulfo groups, carbamoyl groups, sulfamoyl groups, ureido groups, alkyl groups, alkenyl groups, alkynyl groups, aliphatic acyl groups, aliphatic acyloxy groups, alkoxy groups, alkoxycarbonyl groups, alkoxycarbonylamino groups, alkylthio groups, alkylsulfonyl groups, aliphatic amide groups, aliphatic sulfonamide groups, aliphatic substituted amino groups, aliphatic substituted carbamoyl groups, aliphatic substituted sulfamoyl groups, aliphatic substituted ureido groups, and nonaromatic heterocyclic groups.

The number of carbon atoms in the alkyl group is preferably from 1 to 8. A chain-like alkyl group is preferred to cyclic alkyl group. A straight-chain alkyl group is particularly preferred. The alkyl group preferably further has substituents (e.g., hydroxy group, carboxy group, alkoxy group, alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group, and 2-diethylaminoethyl group.

The number of carbon atoms in the alkenyl group is preferably from 2 to 8. A chain-like alkynyl group is preferred to cyclic alkenyl group. A straight-chain alkenyl group is particularly preferred. The alkenyl group may further have substituents. Examples of the alkenyl group include vinyl group, allyl group, and 1-hexenyl group.

The number of carbon atoms in the alkynyl group is preferably from 2 to 8. A chain-like alkynyl group is preferred to cyclic alkynyl group. A straight-chain alkynyl group is particularly preferred. The alkynyl group may further have substituents. Examples of the alkynyl group include ethinyl group, 1-butinyl group, and 1-hexinyl group.

The number of carbon atoms in the aliphatic acyl group is preferably from 1 to 10. Examples of the aliphatic acyl group include acetyl group, propanoyl group, and butanoyl group.

The number of carbon atoms in the aliphatic acyloxy group is preferably from 1 to 10. Examples of the aliphatic acyloxy group include acetoxy group.

The number of carbon atoms in the alkoxy group is preferably from 1 to 8. The alkoxy group may further have substituents (e.g., alkoxy group). Examples of the alkoxy group (including substituted alkoxy groups) include methoxy group, ethoxy group, butoxy group, and methoxyethoxy group.

The number of carbon atoms in the alkoxycarbonyl group is preferably from 2 to 10. Examples of the alkoxycarbonyl group include methoxycarbonyl group, and ethoxycarbonyl group.

The number of carbon atoms in the alkoxycarbonylamino group is preferably from 2 to 10. Examples of the alkoxycarbonylamino group include methoxycarbonylamino group, and ethoxycarbonylamino group.

The number of carbon atoms in the alkylthio group is preferably from 1 to 12. Examples of the alkylthio group include methylthio group, ethylthio group, and octylthio group.

The number of carbon atoms in the alkylsulfonyl group is preferably from 1 to 8. Examples of the alkylsulfonyl group include methanesulfonyl group, and ethanesulfonyl group.

The number of carbon atoms in the aliphatic amide group is preferably from 1 to 10. Examples of the aliphatic amide group include acetamide group.

The number of carbon atoms in the aliphatic sulfonamide group is preferably from 1 to 8. Examples of the aliphatic sulfonamide group include methanesulfonamide group, butanesulfonamide group, and n-octanesulfonamide group.

The number of carbon atoms in the substituted aliphatic amino group is preferably from 1 to 10. Examples of the aliphatic substituted amino group include dimethylamino group, diethylamino group, and 2-carboxyethylamino group.

The number of carbon atoms in the substituted aliphatic carbamoyl group is preferably from 2 to 10. Examples of the aliphatic substituted carbamoyl group include methylcarbamoyl group, and diethylcarbamoyl group.

The number of carbon atoms in the substituted aliphatic sulfamoyl group is preferably from 1 to 8. Examples of the aliphatic substituted sulfamoyl group include methylsulfamoyl group, and diethylsulfamoyl group.

The number of carbon atoms in the substituted aliphatic ureido group is preferably from 2 to 10. Examples of the aliphatic substituted ureido group include methylureido group.

Examples of the nonaromatic heterocyclic group include piperidino group, and morpholino group.

The molecular weight of the retardation increasing agent made of discotic compound is preferably from 300 to 800.

In the invention, a rod-shaped compound having a linear molecular structure may be preferably used besides the aforementioned discotic compounds. The term "linear molecular structure" as used herein is meant to indicate that the molecular structure of the rod-shaped compound which is most thermodynamically stable is linear. The most thermodynamically stable structure can be determined by crystallographic structure analysis or molecular orbital calculation. For example, a molecular orbital calculation software (e.g., WinMO-PAC2000, produced by Fujitsu Co., Ltd.) may be used to effect molecular orbital calculation, making it possible to determine a molecular structure allowing the minimization of heat formation of compound. The term "linear molecular structure" as used herein also means that the most thermodynamically stable molecular structure thus calculated forms a main chain at an angle of 140 degrees or more.

The rod-shaped compound is preferably one having at least two aromatic rings. As the rod-shaped compound having at least two aromatic rings there is preferably used a compound represented by the following formula (1):

$$Ar^1\text{-}L^1\text{-}Ar^2 \quad (1)$$

wherein $Ar^1$ and $Ar^2$ each independently represent an aromatic ring.

Examples of the aromatic ring employable herein include aryl groups (aromatic hydrocarbon group), substituted aryl groups, and substituted aromatic heterocyclic groups.

The aryl group and substituted aryl group are preferred to the aromatic heterocyclic group and substituted aromatic heterocyclic group. The heterocyclic group in the aromatic heterocyclic group is normally unsaturated. The aromatic heterocyclic group is preferably a 5-membered ring, 6-membered ring or 7-membered ring, more preferably a 5-membered ring or 6-membered ring. The aromatic heterocyclic group normally has the most numerous double bonds. The hetero atom is preferably nitrogen atom, oxygen atom or sulfur atom, more preferably nitrogen atom or sulfur atom.

Preferred examples of the aromatic ring in the aromatic group include benzene ring, furane ring, thiophene ring, pyrrole ring, oxazole ring, thiazole ring, imidazole ring, triazole ring, pyridine ring, pyrimidine ring, and pyrazine ring. Particularly preferred among these aromatic rings is benzene ring.

Examples of the substituents on the substituted aryl group and substituted aromatic heterocyclic group include halogen atoms (F, Cl, Br, I), hydroxyl groups, carboxyl groups, cyano groups, amino groups, alkylamino groups (e.g., methylamino group, ethylamino group, butylamino group, dimethylamino group), nitro groups, sulfo groups, carbamoyl groups, alkylcarbamoyl groups (e.g., N-methylcarbamoyl group, N-ethylcarbamoyl group, N,N-dimethylcarbamoyl group), sulfamoyl groups, alkylsulfamoyl groups (e.g., N-methylsulfamoyl group, N-ethylsulfamoyl group, N,N-dimethylsulfamoyl group), ureido groups, alkylureido groups (e.g., N-methylureido group, N,N-dimethylureido group, N,N,N'-trimethyl ureido group), alkyl groups (e.g., methyl group, ethyl group, propyl group, butyl group, pentyl group, heptyl group, octyl group, isopropyl group, s-butyl group, t-amyl group, cyclohexyl group, cyclopentyl group), alkenyl groups (e.g., vinyl group, allyl group, hexenyl group), alkynyl groups (e.g., ethinyl group, butinyl group), acyl groups (e.g., formyl group, acetyl group, butyryl group, hexanoyl group, lauryl group), acyloxy groups (e.g., acetoxy group, butyryloxy group, hexanoyloxy group, lauryloxy group), alkoxy groups (e.g., methoxy group, ethoxy group, propoxy group, butoxy group, pentyloxy group, heptyloxy group, octyloxy group), aryloxy groups (e.g., phenoxy group), alkoxycarbonyl groups (e.g., methoxycarbonyl group, ethoxycarbonyl group, propoxycarbonyl group, butoxycarbonyl group, pentyloxycarbonyl group, heptyloxycarbonyl group), aryloxycarbonyl groups (e.g., phenoxycarbonyl group), alkoxycarbonylamino groups (e.g., butoxycarbonylamino group, hexyloxycarbonylamino group), alkylthio groups (e.g., methylthio group, ethylthio group, propylthio group, butylthio group, pentylthio group, heptylthio group, octylthio group), arylthio groups (e.g., phenylthio group), alkylsulfonyl groups (e.g., methyl sulfonyl group, ethylsulfonyl group, propylsulfonyl group, butylsulfonyl group, pentylsulfonyl group, heptylsulfonyl group, octylsulfonyl group), amide groups (e.g., acetamide group, butylamide group, hexylamide group, laurylamide group), and nonaromatic heterocyclic groups (e.g., morpholyl group, pyradinyl group).

Examples of the substituents on the substituted aryl group and substituted aromatic heterocyclic group include halogen atoms, cyano groups, carboxyl groups, hydroxyl groups, amino groups, alkyl-substituted amino groups, acyl groups, acyloxy groups, amide groups, alkoxycarbonyl groups, alkoxy groups, alkylthio groups, and alkyl groups.

The alkyl moiety and alkyl group in the alkylamino group, alkoxycarbonyl group, alkoxy group and alkylthio group may further have substituents. Examples of the substituents on the alkyl moiety and alkyl group include halogen atoms, hydroxyl groups, carboxyl groups, cyano groups, amino groups, alkylamino groups, nitro groups, sulfo groups, carbamoyl groups, alkylcarbamoyl groups, sulfamoyl groups, alkylsulfamoyl groups, ureido groups, alkylureido groups, alkenyl groups, alkynyl groups, acyl groups, acyloxy groups, acylamino groups, alkoxy groups, aryloxy groups, alkoxycarbonyl groups, aryloxycarbonyl groups, alkylthio groups, arylthio groups, alkylsulfonyl groups, amide groups, and nonaromatic heterocyclic groups. Preferred among these substituents on the alkyl moiety and alkyl group are halogen atoms, hydroxyl groups, amino groups, alkylamino groups, acyl groups, acyloxy groups, acylamino groups, and alkoxy groups.

In the formula (1), $L^1$ represents a divalent connecting group selected from the group consisting of groups composed of alkylene group, alkenylene group, alkynylene group, —O—, —CO— and combination thereof.

The alkylene group may have a cyclic structure. The cyclic alkylene group is preferably cyclohexylene, particularly 1,4-cyclohexylene. As the chain-like alkylene group, a straight-chain alkylene is preferred to a branched alkylene.

The number of carbon atoms in the alkylene group is preferably from 1 to 20, more preferably from 1 to 15, even more preferably from 1 to 10, even more preferably from 1 to 8, most preferably from 1 to 6.

The alkenylene group and alkynylene group preferably has a chain-like structure rather than cyclic structure, more preferably a straight-chain structure than branched chain-like structure.

The number of carbon atoms in the alkenylene group and alkynylene group is preferably from 2 to 10, more preferably from 2 to 8, even more preferably from 2 to 6, even more preferably from 2 to 4, most preferably 2 (vinylene or ethinylene).

The number of carbon atoms in the arylene group is preferably from 6 to 20, more preferably from 6 to 16, even more preferably from 6 to 12.

In the molecular structure of the formula (1), the angle formed by $Ar^1$ and $Ar^2$ with $L^1$ interposed therebetween is preferably 140 degrees or more.

The rod-shaped compound is more preferably a compound represented by the following formula (2).

$$Ar^1\text{-}L^2\text{-}X\text{-}L^3\text{-}Ar^2 \qquad (2)$$

wherein $Ar^1$ and $Ar^2$ each independently represent an aromatic group. The aromatic group is defined and exemplified as in $Ar^1$ and $Ar^2$ in the formula (1).

In the formula (2), $L^2$ and $L^3$ each independently represent a divalent connecting group selected from the group consisting of alkylene group, —O—, —CO— and combination thereof.

The alkylene group preferably has a chain-like structure rather than cyclic structure and more preferably has a straight-chain structure rather than branched chain-like structure.

The number of carbon atoms in the alkylene group is preferably from 1 to 10, more preferably from 1 to 8, even more preferably from 1 to 6, still more preferably from 1 to 4, most preferably from 1 or 2 (methylene or ethylene).

$L^2$ and $L^3$ each are particularly preferably —O—CO— or —CO—O—.

In the formula (2), X represents 1,4-cyclohexylene, vinylene or ethynylene.

Specific examples of the compound represented by the formula (1) or (2) include compounds disclosed in paragraphs (0101) to (0112) of JP-A-2004-109657.

Other preferred examples of the compound will be given below.

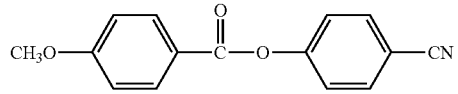

(46)

(47)

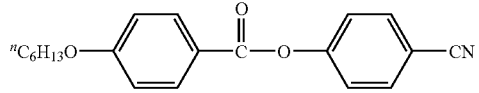

(48)

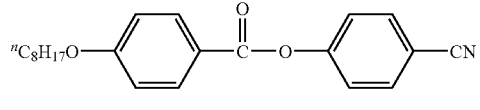

(49)

-continued

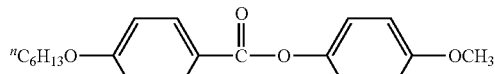 (50)
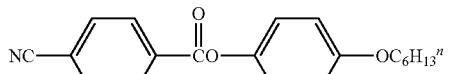 (51)

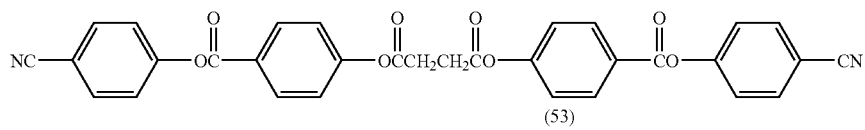 (52)

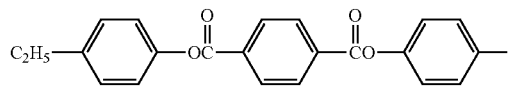 (53)
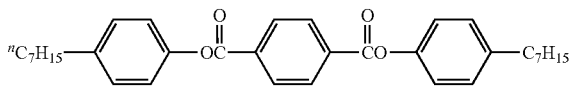 (54)

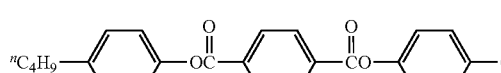 (55)
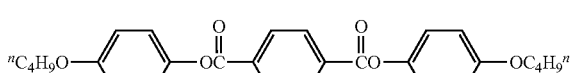 (56)

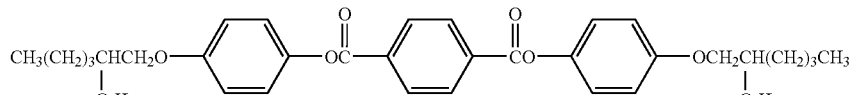 (57)

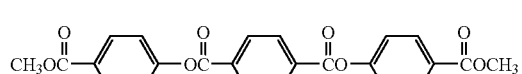 (58)
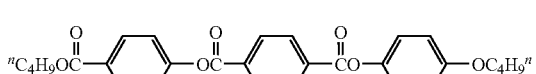 (59)

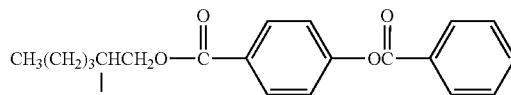 (60)

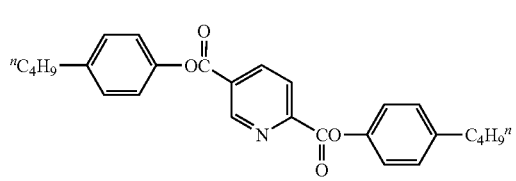 (61)
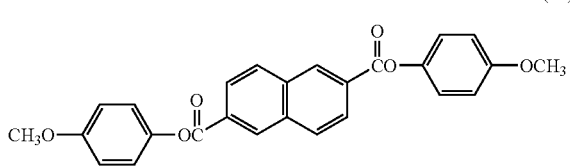 (62)

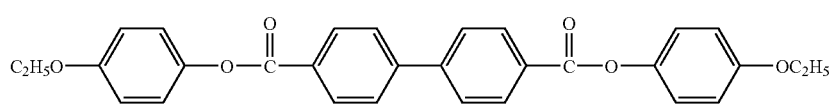 (63)

Two or more rod-shaped compounds having a maximum absorption wavelength ($\lambda$max) of shorter than 250 nm in the ultraviolet absorption spectrum of solution may be used in combination.

The rod-shaped compound can be synthesized by any method disclosed in literatures. Examples of these literatures include "Mol. Cryst. Liq. Cryst.", vol. 53, page 229, 1979, "Mol. Cryst. Liq. Cryst.", vol. 89, page 93, 1982, "Mol. Cryst. Liq. Cryst.", vol. 145, page 111, 1987, "Mol. Cryst. Liq. Cryst.", vol. 170, page 43, 1989, "J. Am. Chem. Soc.", vol. 113, page 1,349, 1991, "J. Am. Chem. Soc.", vol. 118, page 5,346, 1996, "J. Am. Chem. Soc.", vol. 92, page 1,582, 1970, "J. Org. Chem.", vol. 40, page 420, 1975, and "Tetrahedron", vol. 48, No. 16, page 3,437, 1992.

[Particulate Matting Agent]

The cellulose acylate film according of the invention preferably has a particulate material incorporated therein as a matting agent. Examples of the particulate material employable herein include silicon dioxide, titanium dioxide, aluminum oxide, zirconium oxide, calcium carbonate, talc, clay, calcined kaolin, calcined calcium silicate, hydrous calcium silicate, aluminum silicate, magnesium silicate, and calcium phosphate. The particulate material preferably contains silicon to reduce turbidity. In particular, silicon dioxide is preferred. The particulate silicon dioxide preferably has a primary average particle diameter of 20 nm or less and an apparent specific gravity of 70 g/l or more. The primary average particle diameter of the particulate silicon dioxide is more preferably as small as from 5 nm to 16 nm to reduce the haze of the film. The apparent specific gravity of the particulate silicon dioxide is preferably not smaller than from 90 to 200 g/l, more preferably not smaller than from 100 to 200 g/l. As the apparent specific gravity of the silicon dioxide rises, a high concentration dispersion can be prepared more easily to reduce haze and agglomeration.

The amount of the aforementioned particulate silicon dioxide, if used, is preferably from 0.01 to 0.3 parts by mass based on 100 parts by mass of the polymer component containing cellulose acylate.

These particles normally form secondary particles having an average particle diameter of from 0.1 µm to 3.0 µm. These particles are present in the film in the form of agglomerates of primary particles to form an unevenness having a height of from 0.1 µm to 3.0 µm on the surface of the film. The secondary average particle diameter is preferably from not smaller than 0.2 µm to not greater than 1.5 µm, more preferably from not smaller than 0.4 µm to not greater than 1.2 µm, most preferably from not smaller than 0.6 µm to not greater than 1.1 µm. When the secondary average particle diameter exceeds 1.5 µm, the resulting film exhibits a raised haze. On the contrary, when the secondary average particle diameter falls below 0.2 µm, the effect of preventing squeak is reduced.

For the determination of primary and secondary particle diameter, particles in the film are observed under scanning electron microphotograph. The particle diameter is defined by the diameter of the circle circumscribing the particle. 200 particles which are located in dispersed positions are observed. The measurements are averaged to determine the average particle diameter.

As the particulate silicon dioxide there may be used a commercially available product such as Aerosil R972, R972V, R974, R812, 200, 200V, 300, R202, OX50 and TT600 (produced by Nippon Aerosil Co., Ltd.). The particulate zirconium oxide is commercially available as Aerosil R976 and R811 (produced by Nippon Aerosil Co., Ltd.). These products can be used in the invention.

Particularly preferred among these products are Aerosil 200V and Aerosil R972 because they are a particulate silicon dioxide having a primary average particle diameter of 20 nm or less and an apparent specific gravity of 70 g/l or more that exerts a great effect of reducing friction coefficient while keeping the turbidity of the optical film low.

In the invention, in order to obtain a cellulose acylate film containing particles having a small secondary average particle diameter, various methods may be proposed to prepare a dispersion of particles. For example, a method may be employed which comprises previously preparing a particulate dispersion of particles in a solvent, stirring the particulate dispersion with a small amount of a cellulose acylate solution which has been separately prepared to make a solution, and then mixing the solution with a main cellulose acylate dope solution. This preparation method is desirable because the particulate silicon dioxide can be fairly dispersed and thus can be difficulty re-agglomerated. Besides this method, a method may be employed which comprises stirring a solution with a small amount of cellulose ester to make a solution, dispersing the solution with a particulate material using a dispersing machine to make a solution having particles incorporated therein, and then thoroughly mixing the solution having particles incorporated therein with a dope solution using an in-line mixer. The invention is not limited to these methods. The concentration of silicon dioxide during the mixing and dispersion of the particulate silicon dioxide with a solvent or the like is preferably from 5% to 30% by mass, more preferably from 10% to 25% by mass, most preferably from 15% to 20% by mass. As the concentration of dispersion rises, the turbidity of the solution with respect to the added amount decreases to further reduce haze and agglomeration to advantage. The content of the matting agent in the final cellulose acylate dope solution is preferably from 0.01 g to 1.0 g, more preferably from 0.03 g to 0.3 g, most preferably from 0.08 g to 0.16 g per m$^2$.

Preferred examples of the solvent which is a lower alcohol include methyl alcohol, ethyl alcohol, propyl alcohol, isopropyl alcohol, and butyl alcohol. The solvent other than lower alcohol is not specifically limited, but solvents which are used during the preparation of cellulose ester are preferably used.

The aforementioned organic solvent in which the cellulose acylate of the invention is dissolved will be further described hereinafter.

In the invention, as the organic solvent there may be used either a chlorine-based solvent mainly composed of chlorine-based organic solvent or a nonchlorine-based solvent free of chlorine-based organic solvent.

(Chlorine-Based Solvent)

In order to prepare the cellulose acylate solution of the invention, as the main solvent there is preferably used a chlorine-based organic solvent. In the invention, the kind of the chlorine-based organic solvent is not specifically limited so far as the cellulose acylate can be dissolved and flow-casted to form a film, thereby attaining its aim. The chlorine-based organic solvent is preferably dichloromethane or chloroform. In particular, dichloromethane is preferred. The chlorine-based organic solvent may be used in admixture with organic solvents other than chlorine-based organic solvent. In this case, it is necessary that dichloromethane be used in an amount of at least 50% by mass based on the total amount of the organic solvents. Other organic solvents to be used in combination with the chlorine-based organic solvent in the invention will be described hereinafter. In some detail, other organic solvents employable herein are preferably selected from the group consisting of ester, ketone, ether, alcohol and hydrocarbon having from 3 to 12 carbon atoms. The ester, ketone, ether and alcohol may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group at the same time. The number of carbon atoms in the solvent having two or more functional groups, if used, may fall within the range defined for the compound having any of these functional groups. Examples of $C_3$-$C_{12}$ esters include ethyl formate, propyl formate, pentyl formate, methyl acetate, ethyl acetate, and pentyl acetate. Examples of $C_3$-$C_{12}$ ketones include acetone, methyl ethyl ketone, diethyl ketone, diisobutyl ketone, cyclopentanone, cyclohexanone, and methyl cyclohexanone. Examples of $C_3$-$C_{12}$ ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The alcohol to be used in combination with the chlorine-based organic solvent may be preferably straight-chain, branched or cyclic. Preferred among these organic solvents is saturated aliphatic hydrocarbon. The hydroxyl group in the alcohol may be primary to tertiary. Examples of the alcohol employable herein include methanol, ethanol, 1-propanol, 2-propanol, 1-butanol, 2-butanol, t-butanol, 1-pentanol, 2-methyl-2-butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene.

Examples of the combination of chlorine-based organic solvent and other organic solvents include the following formulations, but the invention is not limited thereto.

Dichloromethane/methanol/ethanol/butanol (80/10/5/5, parts by mass)

Dichloromethane/acetone/methanol/propanol (80/10/5/5, parts by mass)

Dichloromethane/methanol/butanol/cyclohexane (80/10/5/5, parts by mass)

Dichloromethane/methyl ethyl ketone/methanol/butanol (80/10/5/5, parts by mass)

Dichloromethane/acetone/methyl ethyl ketone/ethanol/isopropanol (75/8/5/5/7, parts by mass)

Dichloromethane/cyclopentanone/methanol/isopropanol (80/7/5/8, parts by mass)

Dichloromethane/methyl acetate/butanol (80/10/10, parts by mass)

Dichloromethane/cyclohexanone/methanol/hexane (70/20/5/5, parts by mass)

Dichloromethane/methyl ethyl ketone/acetone/methanol/ethanol (50/20/20/5/5, parts by mass)

Dichloromethane/1,3-dioxolane/methanol/ethanol (70/20/5/5, parts by mass)

Dichloromethane/dioxane/acetone/methanol/ethanol (60/20/10/5/5, parts by mass)

Dichloromethane/acetone/cyclopentanone/ethanol/isobutanol/cyclohexane (65/10/10/5/5/5, parts by mass)

Dichloromethane/methyl ethyl ketone/acetone/methanol/ethanol (70/10/10/5/5, parts by mass)

Dichloromethane/acetone/ethyl acetate/ethanol/butanol/hexane (65/10/10/5/5/5, parts by mass)

Dichloromethane/methyl acetoacetate/methanol/ethanol (65/20/10/5, parts by mass)

Dichloromethane/cyclopentanone/ethanol/butanol (65/20/10/5, parts by mass)

(Nonchlorine-Based Solvent)

The nonchlorine-based solvent which can be preferably used to prepare the cellulose acylate solution of the invention will be described hereinafter. The nonchlorine-based organic solvent to be used in the invention is not specifically limited so far as the cellulose acylate can be dissolved and flow-casted to form a film, thereby attaining its aim. The nonchlorine-based organic solvent employable herein is preferably selected from the group consisting of ester, ketone, ether and having from 3 to 12 carbon atoms. The ester, ketone and ether may have a cyclic structure. A compound having two or more of functional groups (i.e., —O—, —CO—, and —COO—) of ester, ketone and ether, too, may be used as a solvent. The solvent may have other functional groups such as alcohol-based hydroxyl group. The number of carbon atoms in the solvent having two or more functional groups, if used, may fall within the range defined for the compound having any of these functional groups. Examples of $C_3$-$C_{12}$ esters include ethyl formate, propyl formate, pentyl formate, methyl acetate, ethyl acetate, and pentyl acetate. Examples of $C_3$-$C_{12}$ ketones include acetone, methyl ethyl ketone, diethyl ketone, diisobutyl ketone, cyclopentanone, cyclohexanone, and methyl cyclohexanone. Examples of $C_3$-$C_{12}$ ethers include diisopropyl ether, dimethoxymethane, dimethoxyethane, 1,4-dioxane, 1,3-dioxolane, tetrahydrofurane, anisole, and phenethol. Examples of the organic solvent having two or more functional groups include 2-ethoxyethyl acetate, 2-methoxyethanol, and 2-butoxyethanol.

The nonchlorine-based organic solvent to be used for cellulose acylate may be selected from the aforementioned various standpoints of view but is preferably as follows. In some detail, the nonchlorine-based solvent is preferably a mixed solvent mainly composed of the aforementioned nonchlorine-based organic solvent. This is a mixture of three or more different solvents wherein the first solvent is at least one or a mixture of methyl acetate, ethyl acetate, methyl formate, ethyl formate, acetone, dioxolane and dioxane, the second solvent is selected from the group consisting of ketones or acetoacetic acid esters having from 4 to 7 carbon atoms and the third solvent is selected from the group consisting of alcohols or hydrocarbons having from 1 to 10 carbon atoms, preferably alcohols having from 1 to 8 carbon atoms. In the case where the first solvent is a mixture of two or more solvents, the second solvent may be omitted. The first solvent is more preferably methyl acetate, acetone, methyl formate, ethyl formate or mixture thereof. The second solvent is preferably methyl ethyl ketone, cyclopentanone, cyclohexanone, methyl acetylacetate or mixture thereof.

The third solvent which is an alcohol may be straight-chain, branched or cyclic. Preferred among these alcohols are unsaturated aliphatic hydrocarbons. The hydroxyl group in the alcohol may be primary to tertiary. Examples of the alcohol include methanol, ethanol, 1-propanol, 2-propanol, 1-butanol, 2-butanol, t-butanol, 1-pentanol, 2-methyl-2-butanol, and cyclohexanol. As the alcohol there may be used also a fluorine-based alcohol. Examples of the fluorine-based alcohol include 2-fluoroethanol, 2,2,2-trifluoroethanol, and 2,2,3,3-tetrafluoro-1-propanol. Further, the hydrocarbon may be straight-chain, branched or cyclic. Either an aromatic hydrocarbon or aliphatic hydrocarbon may be used. The aliphatic hydrocarbon may be saturated or unsaturated. Examples of the hydrocarbon include cyclohexane, hexane, benzene, toluene, and xylene. The alcohols and hydrocarbons which are third solvents may be used singly or in admixture of two or more thereof without any limitation. Specific examples of the alcohol which is a third solvent include methanol, ethanol, 1-propanol, 2-propanol, 1-butanol, 2-butanol, cyclohexanol, cyclohexane, and hexane. Particularly preferred among these alcohols are methanol, ethanol, 1-propanol, 2-propanol, and 1-butanol.

Referring to the mixing ratio of the aforementioned three solvents, the mixing ratio of the first solvent, the second solvent and the third solvent are preferably from 20% to 95% by mass, from 2% to 60% by mass and from 2% to 30% by mass, more preferably from 30% to 90% by mass, from 3% to 50% by mass and from 3% to 25% by mass, particularly from 30% to 90% by mass, from 3% to 30% by mass and from 30% to 15% by mass, respectively, based on the total weight of the mixture. For the details of the nonchlorine-based organic solvents to be used in the invention, reference can be made to Kokai Giho No. 2001-1745, Mar. 15, 2001, pp. 12-16, Japan Institute of Invention and Innovation. Examples of the combination of nonchlorine-based organic solvents include the following formulations, but the invention is not limited thereto.

Methyl acetate/acetone/methanol/ethanol/butanol (75/10/5/5/5, parts by mass)

Methyl acetate/acetone/methanol/ethanol/propanol (75/10/5/5/5, parts by mass)

Methyl acetate/acetone/methanol/butanol/cyclohexane (75/10/5/5/5, parts by mass)

Methyl acetate/acetone/ethanol/butanol (81/8/7/4, parts by mass)

Methyl acetate/acetone/ethanol/butanol (82/10/4/4, parts by mass)

Methyl acetate/acetone/ethanol/butanol (80/10/4/6, parts by mass)

Methyl acetate/methyl ethyl ketone/methanol/butanol (80/10/5/5, parts by mass)

Methyl acetate/acetone/methyl ethyl ketone/ethanol/isopropanol (75/8/10/5/7, parts by mass)

Methyl acetate/cyclopentanone/methanol/isopropanol (80/7/5/8, parts by mass)

Methyl acetate/acetone/butanol (85/10/5, parts by mass)

Methyl acetate/cyclopentanone/acetone/methanol/butanol (60/15/14/5/6, parts by mass)

Methyl acetate/cyclohexanone/methanol/hexane (70/20/5/5, parts by mass)

Methyl acetate/methyl ethyl ketone/acetone/methanol/ethanol (50/20/5/5, parts by mass)

Methyl acetate/1,3-dioxolane/methanol/ethanol (70/20/5/5, parts by mass)

Methyl acetate/dioxane/acetone/methanol/ethanol (60/20/10/5/5, parts by mass)

Methyl acetate/acetone/cyclopentanone/ethanol/isobutanol/cyclohexane (65/10/10/5/5/5, parts by mass)

Methyl formate/methyl ethyl ketone/acetone/methanol/ethanol (50/20/20/5/5, parts by mass)

Methyl formate/acetone/ethyl acetate/ethanol/butanol/hexane (65/10/10/5/5/5, parts by mass)

Acetone/methyl acetoacetate/methanol/ethanol (65/20/10/5, parts by mass)

Acetone/cyclopentanone/methanol/butanol (65/20/10/5, parts by mass)

Acetone/1,3-dioxolane/ethanol/butanol (65/20/10/5, parts by mass)

1,3-Dioxolane/cyclohexanone/methyl ethyl ketone/methanol/butanol (55/20/10/5/5/5, parts by mass)

Further, cellulose acylate solutions prepared by the following methods may be used.

Method which comprises preparing a cellulose acylate solution with methyl acetate/acetone/ethanol/butanol (81/8/7/4, parts by mass), filtering and concentrating the solution, and then adding 2 parts by mass of butanol to the solution Method which comprises preparing a cellulose acylate solution with methyl acetate/acetone/ethanol/butanol (84/10/4/2, parts by mass), filtering and concentrating the solution, and then adding 4 parts by mass of butanol to the solution Method which comprises preparing a cellulose acylate solution with methyl acetate/acetone/ethanol (84/10/6, parts by mass), filtering and concentrating the solution, and then adding 5 parts by mass of butanol to the solution The dope to be used in the invention comprises dichloromethane incorporated therein in an amount of 10% by mass or less based on the total weight of the organic solvents of the invention besides the aforementioned nonchlorine-based organic solvent of the invention.

(Properties of Cellulose Acylate Solution)

The cellulose acylate solution of the invention preferably comprises cellulose acylate incorporated in the aforementioned organic solvent in an amount of from 10% to 30% by mass, more preferably from 13% to 27% by mass, particularly from 15% to 25% by mass from the standpoint of adaptability to film flow casting. The adjustment of the concentration of the cellulose acylate solution to the predetermined range may be effected at the dissolution step. Alternatively, a cellulose acylate solution which has been previously prepared in a low concentration (e.g., 9 to 14% by mass) may be adjusted to the predetermined concentration range at a concentrating step described later. Alternatively, a cellulose acylate solution which has been previously prepared in a high concentration may be adjusted to the predetermined lower concentration range by adding various additives thereto. Any of these methods may be used so far as the predetermined concentration range can be attained.

In the invention, the molecular weight of the associated cellulose acylate in the cellulose acylate solution which has been diluted with an organic solvent having the same formulation to a concentration of from 0.1% to 5% by mass is preferably from 150,000 to 15,000,000, more preferably from 180,000 to 9,000,000 from the standpoint of solubility in solvent. For the determination of the molecular weight of associated product, a static light scattering method may be used. The dissolution is preferably effected such that the concurrently determined square radius of inertia ranges from 10 nm to 200 nm, more preferably from 20 nm to 200 nm. Further, the dissolution is preferably effected such that the second virial coefficient ranges from $-2\times10^{-4}$ to $+4\times10^{-4}$, more preferably from $-2\times10^{-4}$ to $+2\times10^{-4}$.

The definition of the molecular weight of the associated product, the square radius of inertia and the second virial coefficient will be described hereinafter. These properties are measured by static light scattering method in the following manner. The measurement is made within a dilute range for the convenience of device, but these measurements reflect the behavior of the dope within the high concentration range of the invention.

Firstly, the cellulose acylate is dissolved in the same solvent as used for dope to prepare solutions having a concentration of 0.1% by mass, 0.2% by mass, 0.3% by mass and 0.4% by mass, respectively. The cellulose acylate to be weighed is dried at 120° C. for 2 hours before use to prevent moistening. The cellulose acylate thus dried is then weighed at 25° C. and 10% RH. The dissolution of the cellulose acylate is effected according to the same method as used in the dope dissolution (ordinary temperature dissolution method, cooled dissolution method, high temperature dissolution method). Subsequently, these solutions with solvent are filtered through a Teflon filter having a pore diameter of 0.2 μm. The solutions thus filtered are each then measured for static light scattering every 10 degrees from 30 degrees to 140 degrees at 25° C. using a Type DLS-700 light scattering device (produced by Otsuka Electronics Co., Ltd.). The data thus obtained are then analyzed by Berry plotting method. For the determination of refractive index required for this analysis, the refractive index of the solvent is measured by an Abbe refractometer. For the determination of concentration gradient of refractive index (dn/dc), the same solvent and solution as used in the measurement of light scattering are measured using a type DRM-1021 different refractometer (produced by Otsuka Electronics Co., Ltd.).

(Preparation of Dope)

The preparation of the cellulose acylate solution (dope) will be described hereinafter. The method of dissolving the cellulose acylate is not specifically limited. The dissolution of the cellulose acylate may be effected at room temperature. Alternatively, a cooled dissolution method or a high temperature dissolution method may be used. Alternatively, these dissolution methods may be in combination. For the details of the method of preparing a cellulose acylate solution, reference can be made to JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. The aforementioned method of dissolving cellulose acylate in an organic solvent may be applied also to the invention so far as it falls within the scope of the invention. For the details of these methods, reference can be made to Kokai Giho No. 2001-1745, Mar. 15, 2001, pp. 22-25, Japan Institute of Invention and Innovation. The cellulose acylate dope solution of the invention is then subjected to concentration and filtration. For the details of these methods, reference can be made similarly to Kokai Giho No. 2001-1745, Mar. 15, 2001, page 25, Japan Institute of Invention and Innovation. In the case where dissolution is effected at high temperatures, the temperature is higher than the boiling point of the organic solvent used in most cases. In this case, dissolution is effected under pressure.

The viscosity and dynamic storage elastic modulus of the cellulose acylate solution preferably fall within the following range from the standpoint of flow-castability. 1 mL of the sample solution is measured using a Type CLS 500 rheometer (produced by TA Instruments) with a steel cone having a diameter of 4 cm/2° (produced by TA Instruments). Referring to the measurement conditions, measurement is effected every 2° C. per minute within a range of from −10° C. to 40° C. at an oscillation step with temperature ramp to determine 40° C. static non-Newton viscosity n*(Pa·s) and −5° C. storage elastic modulus G'(Pa). The sample solution is previously kept at the measurement starting temperature before measurement. In the invention, the sample solution preferably has a 40° C. viscosity of from 1 to 400 Pa·s, more preferably from 10 to 200 Pa·s, and a 15° C. dynamic storage elastic modulus of 500 Pa or more, more preferably from 100 to 1,000,000 Pa. The low temperature dynamic storage elastic modulus of the sample solution is preferably as great as possible. For example, if the flow casting support has a temperature of −5° C., the dynamic storage elastic modulus of the sample solution is preferably from 10,000 to 1,000,000 Pa at −5° C. If the flow casting support has a temperature of −50° C., the dynamic storage elastic modulus of the sample solution is preferably from 10,000 to 5,000,000 Pa at −50° C.

In the invention, in the case where the aforementioned specific cellulose acylate is used, a high concentration dope is obtained. Thus, a high concentration cellulose acylate solution having an excellent stability can be obtained without relying on the concentrating method. In order to further facilitate dissolution, the cellulose acylate may be dissolved in a low concentration. The solution thus prepared is then concentrated by a concentrating method. The concentrating method is not specifically limited. For example, a method may be used which comprises introducing a low concentration solution into the gap between a case body and the rotary orbit of the periphery of a rotary blade that rotates circumferentially inside the case body while giving a temperature difference between the solution and the case body to vaporize the solution, thereby obtaining a high concentration solution (see, e.g., JP-A-4-259511). Alternatively, a method may be used which comprises blowing a heated low concentration solution into a vessel through a nozzle so that the solvent is flash-evaporated over the distance from the nozzle to the inner wall of the vessel while withdrawing the solvent thus evaporated from the vessel and the resulting high concentration solution from the bottom of the vessel (see, e.g., U.S. Pat. No. 2,541, 012, U.S. Pat. No. 2,858,229, U.S. Pat. No. 4,414,341, U.S. Pat. No. 4,504,355).

Prior to flow casting, the solution is preferably freed of foreign matters such as undissolved matter, dust and impurities by filtration through a proper filtering material such as metal gauze and flannel. For the filtration of the cellulose acylate solution, a filter having an absolute filtration precision of from 0.1 μm to 100 μm is preferably used. More preferably, a filter having an absolute filtration precision of from 0.5 μm to 25 μm is used. The thickness of the filter is preferably from 0.1 mm to 10 mm, more preferably from 0.2 mm to 2 mm. In this case, filtration is preferably effected under a pressure of 1.6 MPa or less, more preferably 1.2 MPa or less, even more preferably 1.0 MPa or less, particularly 0.2 MPa or less. As the filtering material there is preferably used any known material such as glass fiber, cellulose fiber, filter paper and fluororesin, e.g., ethylene tetrafluoride resin. In particular, ceramics, metal, etc. are preferably used. The viscosity of the cellulose acylate solution shortly before filming may be arbitrary so far as the cellulose acylate solution can be flow-casted during filming and normally is preferably from 10 Pa·s to 2,000 Pa·s, more preferably from 30 Pa·s to 1,000 Pa·s, even more preferably from 40 Pa·s to 500 Pa·s. The temperature of the cellulose acylate solution shortly before filming is not specifically limited so far as it is the flow casting temperature but is preferably from −5° C. to +70° C., more preferably from −5° C. to +55° C.

(Filming)

The cellulose acylate film of the invention can be obtained by filming the aforementioned cellulose acylate solution. As the filming method and the filming device there may be used any solution flow casting/filming method and solution flow casting/filming device for use in the related art method of producing cellulose acylate film, respectively. The dope (cellulose acylate solution) prepared in the dissolving machine (kiln) is stored in a storage kiln so that bubbles contained in the dope are removed to make final adjustment. The dope thus adjusted is then delivered from the dope discharge port to a pressure die through a pressure constant rate gear pump capable of delivering a liquid at a constant rate with a high precision depending on the rotary speed. The dope is then uniformly flow-casted through the slit of the pressure die over a metallic support in the flow casting portion which is being running endlessly. When the metallic support has made substantially one turn, the half-dried dope film (also referred to as "web") is then peeled off the metallic support. The web thus obtained is then dried while being conveyed by a tenter with the both ends thereof being clamped by a clip to keep its width. Subsequently, the web is conveyed by a group of rolls in the drying apparatus to finish drying. The web is then wound to a predetermined length by a winding machine. The combination of tenter and a group of rolls varies with the purpose. In a solution flow casting/filming method for use in functional protective layer for electronic display, a coating device is often added to the solution flow casting/filming device for the purpose of surface working of film such as subbing layer, antistatic layer, anti-halation layer and protective layer. The various producing steps will be briefly described hereinafter, but the invention is not limited thereto.

Firstly, in order to prepare a cellulose acylate film by a solvent flow casting method, the cellulose acylate solution (dope) thus prepared is flow-casted over a drum or band so that the solvent is evaporated to form a film. The dope to be flow-casted is preferably adjusted in its concentration such that the solid content is from 5% to 40% by mass. It is preferred that the surface of the drum or band be previously mirror-like finished. The dope is preferably flow-casted over a drum or band having a surface temperature of 30° C. or less, particularly over a metallic support having a temperature of from −10° C. to 20° C. Further, methods disclosed in JP-A-2000-301555, JP-A-2000-301558, JP-A-07-03239, JP-A-03-193316, JP-A-05-086212, JP-A-62-037113, JP-A-62-037113, JP-A-02-276607, JP-A-55-014201, JP-A-02-111511, and JP-A-02-208650 may be used in the invention.

(Multi-Layer Flow Casting)

The cellulose acylate solution may be flow-casted over a smooth band or drum as a metallic support in the form of a single layer. Alternatively, two or more cellulose acylate solutions may be flow-casted over the metallic support. In the case where a plurality of cellulose acylate solutions are flow-casted, a cellulose acylate-containing solution may be flow-casted over the metallic support through a plurality of flow casting ports disposed at an interval along the direction of running of the metallic support to make lamination. For example, any method as disclosed in JP-A-61-158414, JP-A-1-122419, and JP-A-11-198285 may be employed. Alternatively, a cellulose acylate solution may be flow-casted through two flow casting ports to make filming. For example, any method as disclosed in JP-B-60-27562, JP-A-61-94724, JP-A-61-947245, JP-A-61-104813, JP-A-61-158413, and JP-A-6-134933 may be employed. As disclosed in JP-A-56-162617, a cellulose acylate film flow casting method may be used which comprises simultaneously flow-casting a high viscosity cellulose acylate solution and a low viscosity cellulose acylate solution with a flow of the high viscosity cellulose acylate solution surrounded by the low viscosity cellulose acylate solution. Further, as disclosed in JP-A-61-94724 and JP-A-61-94725, it is a preferred embodiment that the outer solution contains a greater content of an alcohol component as a poor solvent than the inner solution. Alternatively, two flow casting ports may be used so that the film formed on the metallic support by the first flow casting port is peeled off the metallic support and the second flow casting is then made on the side of the film which has come in contact with the metallic support. For example, a method disclosed in JP-B-44-20235 may be used. The cellulose acylate solutions to be flow-casted may be the same or different and thus are not specifically limited. In order to render a plurality of cellulose acylate layers functional, cellulose acylate solutions having a formulation according to the function may be extruded through the respective flow casting port. The flow casting of the cellulose acylate solution may be accompanied by the flow casting of other functional layers (e.g., adhesive layer, dye layer, antistatic layer, anti-halation layer, ultraviolet-absorbing layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be flow-casted through flow casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film. In the case of co-casting method, the thickness of the inner solution and the outer solution are not specifically limited, but the thickness of the outer solution is preferably from 1% to 50%, more preferably from 2% to 30% of the total thickness. In the case of co-casting of three of more layers, the sum of the thickness of the layer in contact with the metallic support and the layer in contact with air is defined as the thickness of the outer layer. In the case of co-casting, cellulose acylate solutions having different concentrations of the aforementioned additives such as plasticizer, ultraviolet absorber and matting agent can be co-casted to a cellulose acylate film having a laminated structure. For example, a cellulose acylate film having a skin layer/core layer/skin layer structure can be prepared. For example, the matting agent can be incorporated much or only in the skin layer. The plasticizer and ultraviolet absorber may be incorporated more in the core layer than in the skin layer or only in the core layer. The kind of the plasticizer and the ultraviolet absorber may differ from the core layer to the skin layer. For example, at least either of low volatility plasticizer and ultraviolet absorber may be incorporated in the skin layer while a plasticizer having an excellent plasticity or an ultraviolet absorber having excellent ultraviolet absorbing properties may be incorporated in the core layer. In another preferred embodiment, a peel accelerator may be incorporated in only the skin layer on the metallic support side. It is also preferred that the skin layer contain an alcohol as a poor solvent more than the core layer in order that the solution might be gelled by cooling the metallic support by a cooled drum method. The skin layer and the core layer may have different Tg values. It is preferred that Tg of the core layer be lower than that of the skin layer. Further, the viscosity of the solution containing cellulose acylate may differ from the skin layer to the core layer during flow casting. It is preferred that the viscosity of the skin layer be lower than that of the core layer. However, the viscosity of the core layer may be lower than that of the skin layer.

(Flow Casting)

Examples of the solution flow casting method include a method which comprises uniformly extruding a dope prepared onto a metallic support through a pressure die, a doctor blade method which comprises adjusting the thickness of a dope flow-casted over a metallic support using a blade, and a reverse roll coater method which comprises adjusting the thickness of the dope flow-casted using a roll that rotates in the reverse direction. Preferred among these flow casting methods is the pressure die method. Examples of the pressure die include coat hunger type pressure die, and T-die type pressure die. Any of these pressure dies may be preferably used. Besides the aforementioned methods, various conventional methods for flow casting/filming a cellulose triacetate solution may be effected. By predetermining the various conditions taking into account the difference in boiling point between solvents used, the same effects as the contents disclosed in the above cited references can be exerted. As the endless running metallic support to be used in the production of the cellulose acylate film of the invention there may be used a drum which has been mirror-like finished by chromium plating or a stainless steel belt (also referred to as "band") which has been mirror-like finished by polishing. One or more pressure dies for producing the cellulose acylate film of the invention may be disposed above the metallic support. Preferably, the number of pressure dies is 1 or 2. In the case where two or more pressure dies are provided, the dope to be flow-casted may be allotted to these dies at various ratios. A plurality of precision constant rate gear pumps may be used to deliver the dope to these dies at the respect ratio. The temperature of the cellulose acylate solution to be flow-casted is preferably from $-10°$ C. to $55°$ C., more preferably from $25°$ C. to $50°$ C. In this case, the temperature of the cellulose acylate solution may be the same at all the steps or may differ from step to step. In the latter case, it suffices if the temperature of the cellulose acylate solution is the desired temperature shortly before being flow-casted.

(Drying)

General examples of the method of drying the dope on the metallic support in the production of the cellulose acylate film include a method which comprises blowing a hot air against the web on the front surface of the metallic support (drum or band), that is, the front surface of the web on the metallic support or on the back surface of the drum or band, and a liquid heat conduction method which comprises allowing a temperature-controlled liquid to come in contact with the back surface of the belt or drum, which is the side thereof opposite the dope flow-casting surface, so that heat is conducted to the drum or belt to control the surface temperature. Preferred among these drying methods is the back surface liquid heat conduction method. The surface temperature of the metallic support before flow casting may be arbitrary so far as it is not higher than the boiling point of the solvent used in the dope. However, in order to accelerate drying or eliminate fluidity on the metallic support, it is preferred that the surface temperature of the metallic support be predetermined to be from 1° C. to 10° C. lower than the boiling point of the solvent having the lowest boiling point among the solvents used. However, this limitation is not necessarily applied in the case where the flow-casted dope is cooled and peeled off the metallic support without being dried.

Re value and Rth value of the cellulose acylate film can be adjusted also by adjusting the temperature on the metallic support over which the dope has been flow-casted and the temperature and flow rate of drying air applied to the dope which has been flow-casted over the metallic support. In particular, Rth value of the cellulose acylate film is drastically affected by the effect of the drying condition on the metallic support. Rth value of the cellulose acylate film is reduced by raising the temperature of the metallic support or the temperature of drying air applied to the dope film or raising the flow rate of drying air, that is, raising the calorie given to the dope film. On the contrary, Rth value of the cellulose acylate film is raised by reducing the calorie given to the dope film. In particular, drying during the former half period between shortly after flow casting and peeling has a great effect on Rth value of the cellulose acylate film.

(Stretching)

The cellulose acylate film of the invention may be subjected to stretching to adjust the retardation thereof. Further, the cellulose acylate film may be positively subjected to crosswise stretching. For the details of these stretching methods, reference can be made to JP-A-62-115035, JP-A-4-152125, JP-A-4-284211, JP-A-4-298310, and JP-A-11-48271. In accordance with these methods, the cellulose acylate film produced is stretched to raise the in-plane retardation value thereof.

The stretching of the film is effected at ordinary temperature or under heating. The heating temperature is preferably from the apparent glass transition temperature Tg of the film during stretching to Tg+20° C. The stretching of the film may be effected monoaxially in only longitudinal or crosswise direction or biaxially at the same time or successively in the two directions. The longitudinal stretching is made by a factor of from 0.1% to 50%, preferably from 1% to 10%, particularly preferably from 2% to 5%. The crosswise stretching is made by a factor of from 3% to 100%, preferably from 10% to 50%, particularly preferably from 20% to 40%. Referring to the birefringence of the film, the crosswise refractive index of the film is preferably greater than the longitudinal refractive index of the film. Accordingly, the factor of crosswise stretching is preferably greater than the factor of longitudinal stretching. Further, stretching may be effected in the course of film-forming step. Alternatively, the raw film which has been prepared and wound may be stretched. In the former case, the film may be stretched with residual solvents contained therein. The film is preferably stretched when the residual solvent content is from 2% to 40%.

In order to reduce the crosswise dispersion of in-plane slow axis, the crosswise stretching step may be followed by a relaxing step. The relaxing step is preferably effected such that the width of the film thus relaxed is adjusted to a range of from 70% to 100% (percent relaxation: 0 to 30%) of that of the unrelaxed film. The temperature at the relaxing step is preferably from Tg (apparent glass transition temperature of film)−10° C. to Tg+20° C. The residual solvent content at the relaxing step is preferably from 2% to 20%.

For the determination of apparent Tg of the film at the stretching step, the film containing residual solvents enclosed in an aluminum pan is heated at a rate of 20° C./min from 25° C. to 150° C. by a differential scanning calorimeter (DSC). An endothermic curve is determined from the measurements whereby Tg is determined.

The thickness of the cellulose acylate film obtained after drying depends on the purpose but is normally from 5 µm to 500 µm, preferably from 20 µm to 300 µm, particularly preferably from 30 µm to 150 µm. The thickness of the cellulose acylate film is also preferably from 40 µm to 110 µm for optical display devices, particularly for VA mode liquid crystal displays. In order to adjust the thickness of the film to the desired value, the concentration of solid content in the dope, the gap of slit of the die, the extrusion pressure of die, the speed of metallic support, etc. may be properly adjusted. The width of the cellulose acylate film thus obtained is preferably from 0.5 m to 3 m, more preferably from 0.6 m to 2.5 m, even more preferably from 0.8 m to 2.2 m. The winding length of the film per roll is preferably from 100 m to 10,000 m, more preferably 500 m to 7,000 m, even more preferably from 1,000 m to 6,000 m. During winding, the film is preferably knurled at least at one edge thereof. The width of the knurl is preferably from 3 mm to 50 mm, more preferably from 5 mm to 30 mm. The height of the knurl is preferably from 0.5 µm to 500 µm, more preferably from 1 µm to 200 µm. The edge of the film may be knurled on one or both surfaces thereof.

The terms "Reλ" and "Rthλ" as used herein are meant to indicate in-plane retardation and thickness direction retardation at a wavelength λ, respectively. Reλ is measured by the incidence of light having a wavelength λ nm in the direction normal to the film in "KOBRA WR" (produced by Ouji Scientific Instruments Co. Ltd.). Rthλ is calculated by "KOBRA WR" on the basis of retardation values Re (λ) measured by the incidence of light having a wavelength λ nm in the direction inclined every 10° angle between −50° and 50° from the direction normal to the film with the direction normal to the film as incidence angle of 0° and the in-plane slow axis (judged by "KOBRA WR") as an inclined axis (rotary axis), hypothetical average refractive index and inputted film thickness. As the hypothetical average refractive index there may be used one disclosed in "Polymer Handbook", John Wiley & Sons, Inc. and various catalogues of optical films. For the cellulose acylate films having an unknown average refractive index, an Abbe refractometer may be used. The average refractive index of main optical films are exemplified below. Cellulose acylate (1.48), cycloolefin polymer (1.52), polycarbonate (1.59), polymethylene methacrylate (1.49), polystyrene (1.59). By inputting the hypothetic average refractive indexes and film thicknesses, KOBRA WR calculates $n_x$, $n_y$ and $n_z$. From $n_x$, $n_y$ and $n_z$ is then calculated $Nz=(nx-nz)/(nx-ny)$.

The dispersion of Re(590) value all over the width is preferably ±5 mm, more preferably ±3 nm. The dispersion of Rth(590) value is preferably ±10 nm, more preferably ±5 µm. The longitudinal dispersion of Re value and Rth value preferably fall within the crosswise dispersion of Re value and Rth value.

The dispersion of the angle of in-plane slow axis of the cellulose acylate film of the invention preferably falls within a range of from −2° to 2°, more preferably from −1° to 1°, most preferably from −0.5° to 0.5° with respect to the reference direction of the rolled film. The term "reference direction" as used herein is meant to indicate the longitudinal direction of the rolled film in the case where the cellulose acylate film is longitudinally stretched or the crosswise direction in the case where the cellulose acylate film is crosswise stretched.

The cellulose acylate film of the invention preferably has ΔRe of from 0 nm to 10 nm (wherein ΔRe is the difference between Re value at 25° C.-10% RH and Re value at 25° C.80% RH (=Re10% RH−Re80% RH)) and ΔRth of from 0 nm to 30 nm (wherein ΔRth is the difference between Rth value at 25° C.-10% RH and Rth value at 25° C.80% RH (=Rth10% RH−Rth80% RH)) to reduce the tint change with time of the liquid crystal display.

Further, the cellulose acylate film of the invention preferably exhibits an equilibrium water content of 3.2% or less at 25° C. and 80% RH to reduce the tint change with time of the liquid crystal display.

The water content is measured on a cellulose acylate film sample having a size of 7 mm×35 mm according to the invention by Karl Fischer method using a Type CA-03 water content meter and a type VA-05 sample dryer (produced by Mitsubishi Chemical Corporation). The water content is then determined by diving the amount of water (g) by the mass of the sample (g).

Further, the cellulose acylate film according to the invention preferably exhibits from not smaller than 400 g/m2·24 hr to 1,800 g/m2·24 hr (as calculated in terms of film thickness of 80 μm) after 24 hours of aging at 60° C. and 95% RH to reduce the tint change with time of the liquid crystal display.

The greater the thickness of the cellulose acylate film is, the smaller is the moisture permeability thereof. The smaller the thickness of the cellulose acylate film is, the greater is the moisture permeability thereof. Regardless of the thickness of the film sample, the moisture permeability of the film sample needs to be calculated in terms of film thickness of 80 μm. The conversion is made by the equation (Moisture permeability as calculated in terms of 80 μm=Measured moisture permeability×Measured thickness (μm)/80 μm).

For the details of the method for the measurement of moisture permeability employable herein, reference can be made to "Kobunshi no Bussei II (Physical Properties of Polymers II", Institute of Polymer Experiment 4, Kyoritsu Shuppan, pp. 285-294: Measurement of vapor permeability (mass method, thermometer method, vapor pressure method, adsorption method).

The measurement of glass transition temperature is effected as follows. In some detail, a cellulose acylate film sample having a size of 5 mm×30 mm according to the invention (unstretched) is moisture-conditioned at 25° C. and 60% RH for 2 hours. Using a Type DVA-225 dynamic viscoelasticity meter (Vibron) (produced by IT Keisoku K.K.), the film sample thus moisture-conditioned is then measured with a distance of 20 mm between grips at a temperature rising rate of 2° C./min, a measuring temperature of from 30° C. to 200° C. and a frequency of 1 Hz. The measurements are plotted with storage modulus as logarithmic axis and temperature (° C.) as linear axis. The sudden reduction of storage modulus developed when the state of the film sample moves from solid region to glass transition region is represented by the straight line 1. The movement of storage modulus in glass transition region is represented by the straight line 2. The temperature at which the two straight lines 1 and 2 cross each other is the temperature at which the film sample shows a sudden drop of storage modulus to begin to soften when heated, i.e., temperature at which the state of the film sample begins to move to glass transition region. Thus, the glass transition temperature Tg (dynamic viscoelasticity) is determined.

For the measurement of elastic modulus, the cellulose acylate film sample of the invention having a size of 10 mm×150 mm was moisture-conditioned at 25° C.-60% RH for 2 hours or more. Using a tensile testing machine (Strograph R2 (produced by Toyo Seiki Seisaku-Sho, Ltd.), the sample was then measured for elastic modulus at a distance of 100 mm between chucks, a temperature of 25° C. and a stretching rate of 10 mm/min.

For the determination of moisture expansion coefficient, the film which had been allowed to stand at 25° C.-80% RH for 2 hours or more was measured for dimension (L80) using a pin gauge. The Film which had been allowed to stand at 25° C.-10% RH for 2 hours or more was measured for dimension (L10) using a pin gauge. The moisture expansion coefficient of the film was then calculated from L80 and L10 by the following equation.

(L10−L80)/(80%RH−10%RH)×1,000,000

The cellulose acylate film of the invention preferably exhibits a haze of from 0.01% to 2%. The haze can be measured herein as follows.

The measurement of haze is made on a cellulose acylate film sample having a size of 40 mm×80 mm according to the invention at 25° C. and 60% RH according to JIS K-6714 using a Type HGM-2DP haze meter (produced by Suga Test Instruments Co., Ltd.).

Further, the cellulose acylate film of the invention preferably exhibits a mass change of from 0% to 5% after 48 hours of aging at 80° C. and 90% RH.

Moreover, the cellulose acylate film of the invention preferably exhibits a dimensional change of from 0% to 5% after 24 hours of aging at 60° C. and 95% RH or 90° C. and 5% RH.

The cellulose acylate film of the invention preferably exhibits a photoelasticity coefficient of 50×10-13 cm2/dyne or less to reduce the tint change with time of the liquid crystal display.

Referring further to the method for the measurement of photoelasticity coefficient, a cellulose acylate film sample having a size of 10 mm×100 mm is subjected to longitudinal tensile stress. Under these conditions, the film sample is measured for retardation using a Type M150 ellipsometer (produced by JASCO Corporation). From the change of retardation with stress is then calculated photoelasticity coefficient.

(Polarizing Plate)

The polarizing plate to be used in the invention will be described hereinafter.

The polarizing plate to be used in the invention is preferably one comprising at least one sheet of the aforementioned cellulose acylate film as a protective film for polarizer.

A polarizing plate normally comprises a polarizer and two sheets of transparent protective film disposed on the respective side of the polarizer. In the invention, as at least one of the protective films there is preferably used a cellulose acylate film of the invention. As the other protective film there is normally used an ordinary cellulose acetate film. The curling of the polarizing plate can be adjusted by adjusting the relationship of the thickness, elastic modulus and moisture expansion coefficient of the protective film on the liquid crystal cell side and the protective film on the side of the polarizer opposite the liquid crystal cell.

Examples of the polarizer to be incorporated in the polarizing plate include iodine-based polarizers, dye-based polarizers comprising a dichroic dye, and polyene-based polarizers. Iodine-based polarizers and dye-based polarizers are normally produced from a polyvinyl alcohol-based film. In the case where the optical resin film of the invention such as cellulose acylate film is used as a protective film for polarizing plate, the method for the preparation of the polarizing plate is not specifically limited. Any ordinary method may be employed. For example, the optical resin film of the invention may be subjected to alkaline treatment and then stuck with an aqueous solution of a fully-saponified polyvinyl alcohol to the both sides of a polarizer prepared by dipping a polyvinyl alcohol film in an iodine solution and then stretching the film. The aforementioned alkaline treatment may be replaced by an adhesion treatment as disclosed in JP-A-6-94915 and JP-A-6-118232. Examples of the adhesive with which the treated surface of the protective film and the polarizer are stuck to each other include polyvinyl alcohol-based adhesives such as polyvinyl alcohol and polyvinyl butyral, and vinyl-based latexes such as butyl acrylate. The polarizing plate comprises a polarizer and a protective film for protecting the both sides thereof. Further, a protect film may be stuck to one side of the polarizing plate while a separate film may be stuck to the other side thereof. The protective film and the separate film are used for the purpose of protecting the polarizing plate at the step of inspecting the product during the shipment of the polarizing plate. In this case, the protective film is stuck to the polarizing plate on the side thereof opposite the side at which the polarizing plate is stuck to the liquid crystal cell for the purpose of protecting the surface of the polarizing plate. The separate film is stuck to the polarizing plate on the side thereof at which the polarizing plate is stuck to the liquid crystal cell for the purpose of covering the adhesive layer stuck to the liquid crystal cell.

Referring to the sticking of the cellulose acylate film of the invention to the polarizer, arrangement is preferably made such that the transmission axis of the polarizer and the slow axis of the cellulose acylate film of the invention (TAC1 in the figure) coincide with each other as shown in FIG. 6.

When the accuracy of crossing of the slow axis of the cellulose acylate film of the invention with the absorption axis of the polarizer (axis that crosses the transmission axis) is greater than 1°, the polarizing plate prepared under cross-Nicol arrangement exhibits deteriorated polarization under cross-Nicol arrangement to undergo light leakage, making it impossible to provide a sufficient black level or contrast ratio when combined with a liquid crystal cell. Accordingly, the deviation of the direction of the slow axis of the cellulose acylate film of the invention and the direction of the transmission axis of the polarizing plate from each other is 1° or less, preferably 0.5° or less.

The hues a* and b* of the polarizing plate in cross-Nicol arrangement are preferably predetermined to be $-1.0 \leq a^* \leq 2.0$ and $-1.0 \leq b^* \leq 2.0$, more preferably $-0.5 \leq a^* \leq 1.5$ and $-0.5 \leq b^* \leq 1.5$, respectively, to predetermine the tint of the liquid crystal display in black display to a proper range.

The hues a* and b* of the polarizing plate are determined by measuring the spectral transmittance of the polarizing plate in the visible light range using a spectrophotometer, integrating the spectral transmittance thus measured with a color matching function to determine tristimulus values X, Y and Z which are then subjected to definition of CIE1976L*a*b* color space. Details thereof are described in "Irosaigenkougaku no Kiso (Basics of Color Reproduction Optics)", published by Corona Publishing Co., Ltd.

In some detail, spectral transmittance was measured using a Type UV-3100 spectrophotometer (produced by Shimadzu Corporation) of color measurement mode under the following conditions. Measurement wavelength range: 780 nm-380 nm; scan speed: middle speed; slit width: 2.0 nm; sampling pitch: 1.0 nm; light source: C light source; viewing field: 2°. In the measurement, the two sheets of polarizing plate were disposed in such an arrangement that the protective film on the cell side of the polarizing plates were opposed to each other, the transmission axis of the two polarizing plates were perpendicular to each other and the transmission axis of the polarizing plates were disposed at an angle of 45° with respect to the direction normal to the sample chamber of the spectrophotometer (direction of groove of grating).

(Surface Treatment)

The optical resin film according to the invention, e.g., cellulose acylate film of the invention may be optionally subjected to surface treatment to attain the enhancement of the adhesion of the cellulose acylate film to the various functional layers (e.g., undercoat layer and back layer). Examples of the surface treatment employable herein include glow discharge treatment, irradiation with ultraviolet rays, corona treatment, flame treatment, and acid or alkaline treatment. The glow discharge treatment employable herein may involve the use of low temperature plasma developed under a low gas pressure of from $10^{-3}$ to 20 Torr, even more preferably plasma under the atmospheric pressure. The plasma-excitable gas is a gas which can be excited by plasma under the aforementioned conditions. Examples of such a plasma-excitable gas include argon, helium, neon, krypton, xenon, nitrogen, carbon dioxide, fluorocarbon such as tetrafluoromethane, and mixture thereof. For the details of these plasma-excitable gases, reference can be made to Kokai Giho No. 2001-1745, Mar. 15, 2001, pp. 30-32, Japan Institute of Invention and Innovation. In the plasma treatment under the atmospheric pressure, which has been recently noted, a radiation energy of from 20 to 500 Kgy is used under an electric field of from 10 to 1,000 Kev. Preferably, a radiation energy of from 20 to 300 Kgy is used under an electric field of from 30 to 500 Kev. Particularly preferred among these surface treatments is alkaline saponification, which is extremely effective for the surface treatment of the cellulose acylate film.

The alkaline saponification is preferably carried out by dipping the cellulose acylate film directly in a saponifying solution tank or by spreading a saponifying solution over the cellulose acylate film. Examples of the coating method employable herein include dip coating method, curtain coating method, extrusion coating method, bar coating method, and E type coating method. As the solvent for the alkaline saponification coating solution there is preferably selected a solvent which exhibits good wetting properties and can keep the surface conditions of the cellulose acylate film good without roughening the surface thereof because the saponifying solution is spread over the cellulose acylate film. In some detail, an alcohol-based solvent is preferably used. An isopropyl alcohol is particularly preferred. Further, an aqueous solution of a surface active agent may be used as a solvent. The alkali of the alkaline saponification coating solution is preferably an alkali soluble in the aforementioned solvent, more preferably KOH or NaOH. The pH value of the saponification coating solution is preferably 10 or more, more preferably 12 or more. During the alkaline saponification, the reaction is preferably effected at room temperature for 1 second to 5 minutes, more preferably 5 seconds to 5 minutes, particularly 20 seconds to 3 minutes. The cellulose acylate film thus alkaline-saponified is preferably washed with water or an acid and then with water on the saponifying solution-coated surface thereof.

Further, the polarizing plate to be used in the invention preferably comprises at least one of hard coat layer, anti-glare layer and anti-reflection film provided on the surface of the protective film on the other side of the polarizing plate. In some detail, as shown in FIG. 7, during the use of the polarizing plate in the liquid crystal display, the protective film (TAC2) disposed on the side of the liquid crystal cell opposite the liquid crystal cell preferably comprises a functional film such as anti-reflection film provided thereon. It is preferred that at least one of the hard coat layer, the anti-glare layer and anti-reflection layer is provided as the functional film. It is not necessary that the various layers be provided as individual layer. For example, the anti-glare layer may be provided by providing the anti-reflection layer or hard coat layer with such a function so that the anti-reflection layer can act both as anti-reflection layer and anti-glare layer.

(Anti-Reflection Layer)

In the invention, an anti-reflection layer comprising a light-scattering layer and a low refractive index layer laminated on a protective layer in this order or an anti-reflection layer comprising a middle refractive index layer, a high refractive index layer and a low refractive index layer laminated on a protective layer in this order is preferably used. Preferred examples of such an anti-reflection layer will be given below. The former arrangement normally exhibits a specular reflectivity of 1% or more and thus is called low reflection (LR) film. The former arrangement can realize a specular reflectivity of 0.5% or less and thus is called anti-reflection (AR) film.

A preferred example of the anti-reflection layer (LR film) comprising a light-scattering layer and a low refractive index layer provided on a protective layer will be described below.

The light-scattering layer preferably has a particulate mat dispersed therein. The refractive index of the material of the light-scattering layer other than the particulate mat is preferably from 1.50 to 2.00. The refractive index of the low refractive index layer is preferably from 1.20 to 1.49. In the invention, the light-scattering layer has both anti-glare properties and hard coating properties. The light-scattering layer may be formed by a single layer or a plurality of layers such as two to four layers.

The anti-reflection layer is preferably designed in its surface roughness such that the central line average roughness Ra is from 0.08 μm to 0.40 μm, the ten point averaged roughness Rz is 10 times or less Ra, the average distance between mountain and valley Sm is from 1 μm to 100 μm, the standard deviation of the height of mountains from the deepest portion in roughness is 0.5 μm or less, the standard deviation of the average distance between mountain and valley Sm with central line as reference is 20 μm or less and the proportion of the surface having an inclination angle of from 0 to 5 degrees is 10% or less, making it possible to attain sufficient anti-glare properties and visually uniform matte finish. Further, when the tint of reflected light under C light source comprises a* value of −2 to 2 and b* value of −3 to 3 and the ratio of minimum reflectance to maximum reflectance at a wavelength of from 380 nm to 780 nm is from 0.5 to 0.99, the tint of reflected light is neutral to advantage. Moreover, when the b* value of transmitted light under C light source is predetermined to range from 0 to 3, the yellow tint of white display for use in display devices is reduced to advantage. Further, when a lattice of having a size of 120 μm×40 μm is disposed interposed between the planar light source and the anti-reflection film of the invention so that the standard deviation of brightness distribution measured over the film is 20 or less, glare developed when the film of the invention is applied to a high precision panel can be eliminated to advantage.

When the optical properties of the anti-reflection layer according to the invention are such that the specular reflectance is 2.5% or less, the transmission is 90% or more and the 60° gloss is 70% or less, the reflection of external light can be inhibited, making it possible to enhance the viewability to advantage. In particular, the specular reflectance is more preferably 1% or less, most preferably 0.5% or less. When the haze is from 20% to 50%, the ratio of inner haze to total haze is from 0.3 to 1, the reduction of haze from that up to the light-scattering layer to that developed after the formation of the low refractive index layer is 15% or less, the sharpness of transmitted image at an optical comb width of 0.5 mm is from 20% to 50% and the ratio of transmission of vertical transmitted light to transmission of transmitted light in the direction of 2 degrees from the vertical direction is from 1.5 to 5.0, the prevention of glare on a high precision LCD panel and the elimination of blurring of letters, etc. can be attained to advantage.

(Low Refractive Index Layer)

The refractive index of the low refractive index layer employable herein is preferably from 1.20 to 1.49, more preferably from 1.30 to 1.44. Further, the low refractive index layer preferably satisfies the following numerical formula (XVII) to advantage from the standpoint of reduction of reflectance.

$$(m/4)\times 0.7 < n1d1 < (m/4)\times 1.3 \qquad \text{(XVII)}$$

wherein m represents a positive odd number; n1 represents the refractive index of the low refractive index layer; and d1 represents the thickness (nm) of the low refractive index layer. λ is a wavelength ranging from 500 nm to 550 mm.

The materials constituting the low refractive index layer will be described hereinafter.

The low refractive index layer preferably comprises a fluorine-containing polymer incorporated therein as a low refractive binder. As such a fluorine-based polymer there is preferably used a thermally or ionized radiation-crosslinkable fluorine-containing polymer having a dynamic friction coefficient of from 0.03 to 0.20, a contact angle of from 90 to 120° with respect to water and a purified water slip angle of 70° or less. As the peel force of the polarizing plate of the invention with respect to a commercially available adhesive tape during the mounting on the image display device decreases, the polarizing plate can be more easily peeled after the sticking of seal or memo to advantage. The peel force of the polarizing plate is preferably 500 gf or less, more preferably 300 gf or less, most preferably 100 gf or less as measured by a tensile testing machine. The higher the surface hardness as measured by a microhardness meter is, the more difficulty can be damaged the low refractive index layer. The surface hardness of the low refractive index layer is preferably 0.3 GPa or more, more preferably 0.5 GPa or more.

Examples of the fluorine-containing polymer to be used in the low refractive index layer include hydrolyzates and dehydration condensates of perfluoroalkyl group-containing silane compounds (e.g., (heptadecafluoro-1,1,2,2-tetrahydrodecyl)triethoxysilane). Other examples of the fluorine-containing polymer include fluorine-containing copolymers comprising a fluorine-containing monomer unit and a constituent unit for providing crosslinking reactivity as constituent components.

Specific examples of the fluorine-containing monomers include fluoroolefins (e.g., fluoroethylene, vinylidene fluoride, tetrafluoroethylene, perfluorooctylethylene, hexafluoropropylene, perfluoro-2,2-dimethyl-1,3-dioxol), partly or fully fluorinated alkylester derivatives of (meth)acrylic acid (e.g., Biscoat 6FM (produced by OSAKA ORGANIC CHEMICAL INDUSTRY LTD.), M-2020 (produced by DAIKIN INDUSTRIES, Ltd.), and fully or partly fluorinated vinyl ethers. Preferred among these fluorine-containing monomers are perfluoroolefins. Particularly preferred among these fluorine-containing monomers is hexafluoropropylene from the standpoint of refractive index, solubility, transparency, availability, etc.

Examples of the constituent unit for providing crosslinking reactivity include constituent units obtained by the polymerization of monomers previously having a self-crosslinking functional group such as glycidyl (meth)acrylate and glycidyl vinyl ether, constituent units obtained by the polymerization of monomers having carboxyl group, hydroxyl group, amino group, sulfo group or the like (e.g., (meth)acrylic acid, methyl (meth)acrylate, hydroxylalkyl (meth)acrylate, allyl acrylate, hydroxyethyl vinyl ether, hydroxybutyl vinyl ether, maleic acid, crotonic acid), and constituent units obtained by introducing a crosslinking reactive group such as (meth)acryloyl group into these constituent units by a polymer reaction (e.g., by reacting acrylic acid chloride with hydroxyl group).

Besides the aforementioned fluorine-containing monomer units and constituent units for providing crosslinking reactivity, monomers free of fluorine atom may be properly copolymerized from the standpoint of solubility in the solvent, transparency of the film, etc. The monomer units which can be used in combination with the aforementioned monomer units are not specifically limited. Examples of these monomer units include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinyl ether, vinyl toluene, α-methyl styrene), vinylethers (e.g., methyl vinyl ether, ethyl vinyl ether, cyclohexyl vinyl ether), vinylesters (e.g., vinyl acetate, vinyl propionate, vinyl cinnamate), acrylamides (e.g., N-tert-butyl acrylamide, N-cyclohexyl acrylamide), methacrylamides, and acrylonitrile derivatives.

The aforementioned polymers may be used properly in combination with a hardener as disclosed in JP-A-10-25388 and JP-A-10-147739.

(Light-Scattering Layer)

The light-scattering layer is formed for the purpose of providing the film with light-scattering properties developed by at least one of surface scattering and inner scattering and hard coating properties for the enhancement of scratch resistance of the film. Accordingly, the light-scattering layer comprises a binder for providing hard coating properties, a particulate mat for providing light diffusibility and optionally an inorganic filler for the enhancement of refractive index, the prevention of crosslink shrinkage and the enhancement of strength incorporated therein. Further, the light-scattering layer thus provided acts also as an anti-glare layer to provide the polarizing plate with an anti-glare layer.

The thickness of the light-scattering layer is from 1 μm to 10 μm, more preferably from 1.2 μm to 6 μm for the purpose of providing hard coating properties. When the thickness of the light-scattering layer is too small, the resulting polarizing plate exhibits lacks hard coating properties. On the contrary, when the thickness of the light-scattering layer is too great, the resulting polarizing plate exhibits deteriorated curling resistance or worsened brittleness leading to insufficient workability.

The binder to be incorporated in the light-scattering layer is preferably a polymer having a saturated hydrocarbon chain or polyether chain as a main chain, more preferably a polymer having a saturated hydrocarbon chain as a main chain. The binder polymer preferably has a crosslinked structure. As the binder polymer having a saturated hydrocarbon chain as a main chain there is preferably used a (co)polymer of monomers having two or more ethylenically unsaturated groups. In order to provide the binder polymer with a higher refractive index, those containing an aromatic ring or at least one atom selected from the group consisting of halogen atoms other than fluorine, sulfur atom, phosphorus atom and nitrogen atom may be selected.

Examples of the monomer having two or more ethylenically unsaturated groups include esters of polyvalent alcohol with (meth)acrylic acid (e.g., ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol penta(meth)acrylate, dipentaerythritol tetra(meth)acrylate, dipentaerythritol penta(meth)acrylate, dipentaerithritol hexa(meth)acrylate, pentaerythritol hexa(meth)acrylate, 1,2,3-cyclohexane tetramethacrylate, polyurethane polyacrylate, polyester polyacrylate), modification products of the aforementioned ethylene oxides, vinylbenzene and derivatives thereof (e.g., 1,4-divinylbenzene, 4-vinyl benzoic acid-2-acryloylethylester, 1,4-divinyl cyclohexanone), vinylsulfones (e.g., divinylsulfone), acrylamides (e.g., methylenebisacrylamide), and methacrylamides. The aforementioned monomers may be used in combination of two or more thereof.

Specific examples of the high refractive monomer include bis(4-methacryloylthiophenyl)sulfide, vinyl naphthalene, vinyl phenyl sulfide, and 4-methacryloxy phenyl-4'-methoxyphenylthioether. These monomers, too, may be used in combination of two or more thereof.

The polymerization of the monomers having these ethylenically unsaturated groups can be effected by irradiation with ionized radiation or heating in the presence of a photoradical polymerization initiator or heat-radical polymerization initiator.

Accordingly, an anti-reflection layer can be formed by a process which comprises preparing a coating solution containing a monomer having an ethylenically unsaturated group, a photo-polymerization initiator or heat radical polymerization initiator, a particulate mat and an inorganic filler, spreading the coating solution over the protective layer, and then irradiating the coat with ionized radiation or applying heat to the coat to cause polymerization reaction and curing. As such a photo-polymerization initiator or the like there may be used any compound known as such.

As the polymer having a polyether as a main chain there is preferably used an open-ring polymerization product of polyfunctional epoxy compound. The open-ring polymerization of the polyfunctional epoxy compound can be carried out by the irradiation of the polyfunctional epoxy compound with ionized radiation or applying heat to the polyfunctional epoxy compound in the presence of a photo-acid generator or heat-acid generator.

Accordingly, the anti-reflection layer can be formed by a process which comprises preparing a coating solution containing a polyfunctional epoxy compound, a photo-acid generator or heat-acid generator, a particulate mat and an inorganic filler, spreading the coating solution over the protective layer, and then irradiating the coat layer with ionized radiation or applying heat to the coat layer to cause polymerization reaction and curing.

Instead of or in addition to the monomer having two or more ethylenically unsaturated groups, a monomer having a crosslinkable functional group may be used to incorporate a crosslinkable functional group in the polymer so that the crosslinkable functional group is reacted to incorporate a crosslinked structure in the binder polymer.

Examples of the crosslinkable functional group include isocyanate group, epoxy group, aziridin group, oxazoline group, aldehyde group, carbonyl group, hydrazine group, carboxyl group, methylol group, and active methylene group. Vinylsulfonic acids, acid anhydrides, cyanoacrylate derivatives, melamines, etherified methylol, esters, urethane, and metal alkoxides such as tetramethoxysilane, too, may be used as monomers for introducing crosslinked structure. Functional groups which exhibit crosslinkability as a result of decomposition reaction such as block isocyanate group may be used. In other words, in the invention, the crosslinkable functional group may not be reactive as they are but may become reactive as a result of decomposition reaction.

These binder polymers having a crosslinkable functional group may be spread and heated to form a crosslinked structure.

The light-scattering layer comprises a particulate mat incorporated therein having an average particle diameter which is greater than that of filler particles and ranges from 1 µm to 10 µm, preferably from 1.5 µm to 7.0 µm, such as inorganic particulate compound and particulate resin for the purpose of providing itself with anti-glare properties.

Specific examples of the aforementioned particulate mat include inorganic particulate compounds such as particulate silica and particulate $TiO_2$, and particulate resins such as particulate acryl, particulate crosslinked acryl, particulate polystyrene, particulate crosslinked styrene, particulate melamine resin and particulate benzoguanamine resin. Preferred among these particulate resins are particulate crosslinked styrene, particulate crosslinked acryl, particulate crosslinked acryl styrene, and particulate silica. The particulate mat may be either spherical or amorphous.

Two or more particulate mats having different particle diameters may be used in combination. A particulate mat having a greater particle diameter may be used to provide the light-scattering layer with anti-glare properties. A particulate mat having a greater particle diameter may be used to provide the light-scattering layer with other optical properties.

Further, the distribution of the particle diameter of the mat particles is most preferably monodisperse. The particle diameters of the various particles are preferably as close to each other as possible. For example, in the case where a particle having a diameter of 20% or more greater than the average particle diameter is defined as coarse particle, the proportion of these coarse particles is preferably 1% or less, more preferably 0.1% or less, even more preferably 0.01% or less of the total number of particles. A particulate mat having a particle diameter distribution falling within the above defined range can be obtained by properly classifying the mat particles obtained by an ordinary synthesis method. By raising the number of classifying steps or intensifying the degree of classification, a matting agent having a better distribution can be obtained.

The aforementioned particulate mat is incorporated in the light-scattering layer in such a manner that the proportion of the particulate mat in the light-scattering layer is from 10 to 1,000 mg/m$^2$, more preferably from 100 to 700 mg/m$^2$.

For the measurement of the distribution of particle size of mat particles, a coulter counter method. The particle size distribution thus measured is then converted to distribution of number of particles.

The light-scattering layer preferably comprises an inorganic filler made of an oxide of at least one metal selected from the group consisting of titanium, zirconium, aluminum, indium, zinc, tin and antimony having an average particle diameter of 0.2 µm or less, preferably 0.1 µm or less, more preferably 0.06 µm or less incorporated therein in addition to the aforementioned particulate mat to enhance the refractive index thereof. In order to enhance the difference of refractive index from the particulate mat, the light-scattering layer comprising a high refractive particulate mat incorporated therein preferably comprises a silicon oxide incorporated therein for keeping the refractive index thereof somewhat low. The preferred particle diameter of the particulate silicon oxide is the same as that of the aforementioned inorganic filler.

Specific examples of the inorganic filler to be incorporated in the light-scattering layer include $TiO_2$, $ZrO_2$, $Al_2O_3$, $In_2O_3$, $ZnO$, $SnO_2$, $Sb_2O_3$, ITO, and $SiO_2$. Particularly preferred among these inorganic fillers are $TiO_2$ and $ZrO_2$ from the standpoint of enhancement of refractive index. The inorganic filler is preferably subjected to silane coupling treatment or titanium coupling treatment on the surface thereof. To this end, a surface treatment having a functional group reactive with the binder seed on the surface thereof is preferably used.

The amount of the inorganic filler to be incorporated is preferably from 10% to 90%, more preferably from 20% to 80%, particularly from 30% to 75% based on the total mass of the light-scattering layer.

Such a filler has a particle diameter which is sufficiently smaller than the wavelength of light and thus causes no scattering. Thus, a dispersion having such a filler dispersed in a binder polymer behaves as an optically uniform material.

The bulk refractive index of the mixture of binder and inorganic filler in the light-scattering layer is preferably from 1.50 to 2.00, more preferably from 1.51 to 1.80. In order to predetermine the bulk refractive index of the mixture within the above defined range, the kind and proportion of the binder and the inorganic filler may be properly selected. How to select these factors can be previously easily known experimentally.

In order to keep the light-scattering layer uniform in surface conditions such as uniformity in coating and drying and prevention of point defects, the coating solution for forming the light-scattering layer comprises either or both of fluorine-based surface active agent and silicone-based surface active agent incorporated therein. In particular, a fluorine-based surface active agent is preferably used because it can be used in a smaller amount to exert an effect of eliminating surface defects such as unevenness in coating and drying and point defects of the anti-reflection film of the invention. Such a fluorine-based surface active agent is intended to render the coating solution adaptable to high speed coating while enhancing the uniformity in surface conditions, thereby raising the productivity.

The anti-reflection layer (AR film) comprising a middle refractive index layer, a high refractive index layer and a low refractive index layer laminated on a protective film in this order will be described hereinafter.

The anti-reflection layer comprising a layer structure having at least a middle refractive index layer, a high refractive index layer and a low refractive index layer (outermost layer)

laminated on a protective film in this order is designed so as to have a refractive index satisfying the following relationship.

Refractive index of high refractive index layer>refractive index of middle refractive index layer>refractive index of protective film>refractive index of low refractive index layer Further, a hard coat layer may be provided interposed between the protective film and the middle refractive index layer. Moreover, the anti-reflection layer may comprise a middle refractive hard coat layer, a high refractive index layer and a low refractive index layer laminated on each other. Examples of such an anti-reflection layer include those disclosed in JP-A-8-122504, JP-A-8-110401, JP-A-10-300902, JP-A-2002-243906, and JP-A-2000-111706. Further, the various layers may be provided with other functions. Examples of these layers include stain-proof low refractive index layer, and antistatic high refractive index layer (as disclosed in JP-A-10-206603, JP-A-2002-243906).

The haze of the anti-reflection layer is preferably 5% or less, more preferably 3% or less. The strength of the anti-reflection layer is preferably not lower than H, more preferably not lower than 2H, most preferably not lower than 3H as determined by pencil hardness test method according to JIS K5400.

(High Refractive Index Layer and Middle Refractive Index Layer)

The layer having a high refractive index in the anti-reflection layer is formed by a hardened layer containing at least a high refractive inorganic particulate compound having an average particle diameter of 100 nm or less and a matrix binder.

As the high refractive inorganic particulate compound there may be used an inorganic compound having a refractive index of 1.65 or more, preferably 1.9 or more. Examples of such a high refractive inorganic particulate compound include oxides of Ti, Zn, Sb, Sn, Zr, Ce, Ta, La and In, and composite oxides of these metal atoms.

In order to provide such a particulate material, the following requirements need to be satisfied. For example, the surface of the particles must be treated with a surface treatment (e.g., silane coupling agent as disclosed in JP-A-11-295503, JP-A-11-153703, and JP-A-2000-9908, anionic compound or organic metal coupling agent as disclosed in JP-A-2001-310432). Further, the particles must have a core-shell structure comprising a high refractive particle as a core (as disclosed in JP-A-2001-166104). A specific dispersant must be used at the same time (as disclosed in JP-A-11-153703, U.S. Pat. No. 6,210,858B1, JP-A-2002-2776069).

Examples of the matrix-forming materials include known thermoplastic resins, thermosetting resins, etc.

Preferred examples of the matrix-forming materials include polyfunctional compound-containing compositions having two or more of at least any of radically polymerizable group and cationically polymerizable group, compositions having an organic metal compound containing a hydrolyzable group, and at least one selected from the group consisting of compositions containing a partial condensate thereof.

Examples of these materials include compounds as disclosed in JP-A-2000-47004, JP-A-2001-315242, JP-A-2001-31871, and JP-A-2001-296401.

Further, a colloidal metal oxide obtained from a hydrolytic condensate of metal alkoxide and a curable layer obtained from a metal alkoxide composition are preferably used. For the details of these materials, reference can be made to JP-A-2001-293818.

The refractive index of the high refractive index layer is preferably from 1.70 to 2.20. The thickness of the high refractive index layer is preferably from 5 nm to 10 μm, more preferably from 10 nm to 1 μm.

The refractive index of the middle refractive index layer is adjusted so as to fall between the refractive index of the low refractive index layer and the high refractive index layer. The refractive index of the middle refractive index layer is preferably from 1.50 to 1.70. The thickness of the middle refractive index layer is preferably from 5 nm to 10 μm, more preferably from 10 nm to 1 μm.

(Low Refractive Index Layer)

The low refractive index layer is laminated on the high refractive index layer. The refractive index of the low refractive index layer is preferably from 1.20 to 1.55, more preferably from 1.30 to 1.50.

The low refractive index layer is preferably designed as an outermost layer having scratch resistance and stain resistance. In order to drastically raise the scratch resistance of the low refractive index layer, a thin layer which can effectively provide surface slipperiness may be formed on the low refractive index layer by introducing a known silicone or fluorine thereinto.

As the fluorine-containing compound there is preferably used a compound containing a crosslinkable or polymerizable functional group having fluorine atoms in an amount of from 35% to 80% by mass.

Examples of such a compound include those disclosed in JP-A-9-222503, paragraphs [0018]-[0026], JP-A-11-38202, paragraphs [0019]-[0030], JP-A-2001-40284, paragraphs [0027]-[0028], and JP-A-2000-284102.

The refractive index of the fluorine-containing compound is preferably from 1.35 to 1.50, more preferably from 1.36 to 1.47.

As the silicone compound there is preferably used a compound having a polysiloxane structure wherein a curable functional group or polymerizable functional group is incorporated in the polymer chain to form a bridged structure in the film. Examples of such a compound include reactive silicones (e.g., SILAPLANE, produced by CHISSO CORPORATION), and polysiloxanes having silanol group at both ends thereof (as disclosed in JP-A-11-258403).

In order to effect the crosslinking or polymerization reaction of at least any of fluorine-containing polymer and siloxane polymer having crosslinkable or polymerizable group, the coating composition for forming the outermost layer containing a polymerization initiator, a sensitizer, etc. is preferably irradiated with light or heated at the same time with or after spreading to form a low refractive index layer.

Further, a sol-gel cured film obtained by curing an organic metal compound such as silane coupling agent and a silane coupling agent containing a specific fluorine-containing hydrocarbon group in the presence of a catalyst is preferably used.

Examples of such a sol-gel cured film include polyfluoroalkyl group-containing silane compounds and partial hydrolytic condensates thereof (compounds as disclosed in JP-A-58-142958, JP-A-58-147483, JP-A-58-147484, JP-A-9-157582, and JP-A-11-106704), and silyl compounds having poly(perfluoroalkylether) group as a fluorine-containing long chain (compounds as disclosed in JP-A-2000-117902, JP-A-2001-48590, JP-A-2002-53804).

The low refractive index layer may comprise a filler (e.g., low refractive inorganic compound having a primary average particle diameter of from 1 to 150 nm such as particulate silicon dioxide (silica) and particulate fluorine-containing material (magnesium fluoride, calcium fluoride, barium fluoride), organic particulate material as disclosed in JP-A-11-3820, paragraphs [0020]-[0038]), a silane coupling agent, a lubricant, a surface active agent, etc. incorporated therein as additives other than the aforementioned additives.

In the case where the low refractive index layer is disposed under the outermost layer, the low refractive index layer may be formed by a gas phase method (vacuum metallizing method, sputtering method, ion plating method, plasma CVD method, etc.). A coating method is desirable because the low refractive index layer can be produced at reduced cost.

The thickness of the low refractive index layer is preferably from 30 nm to 200 nm, more preferably from 50 nm to 150 nm, most preferably from 60 nm to 120 nm.

(Hard Coat Layer)

The hard coat layer is normally provided on the surface of the protective film to give a physical strength to the protective film having an anti-reflection layer provided thereon. In particular, the hard coat layer is preferably provided interposed between the transparent support and the aforementioned high refractive index layer. The hard coat layer is preferably formed by the crosslinking reaction or polymerization reaction of a photosetting and/or thermosetting compound. The curable functional group in the curable compound is preferably a photopolymerizable functional group. Further, an organic metal compound or organic alkoxysilyl compound containing a hydrolyzable functional group is desirable.

Specific examples of these compounds include the same compounds as exemplified with reference to the high refractive index layer. Specific examples of the composition constituting the hard coat layer include those described in JP-A-2002-144913, JP-A-2000-9908, and pamphlet of WO00/46617.

The high refractive index layer may act also as a hard coat layer. In this case, particles may be finely dispersed in a hard coat layer in the same manner as described with reference to the high refractive index layer to form a high refractive index layer.

The hard coat layer may comprise particles having an average particle diameter of from 0.2 μm to 10 μm incorporated therein to act also as an anti-glare layer provided with anti-glare properties.

The thickness of the hard coat layer may be properly designed depending on the purpose. The thickness of the hard coat layer is preferably from 0.2 μm to 10 μm, more preferably from 0.5 μm to 7 μm.

The strength of the hard coat layer is preferably not lower than H, more preferably not lower than 2H, most preferably not lower than 3H as determined by pencil hardness test according to JIS K5400. The abrasion of the test specimen is preferably as little as possible when subjected to taper test according to JIS K5400.

(Other Layers in Anti-Reflection Layer)

Further, a forward scattering layer, a primer layer, an antistatic layer, an undercoating layer, a protective layer, etc, may be provided.

(Antistatic Layer)

The antistatic layer, if provided, is preferably given an electrical conductivity of $10^{-8}$ ($\Omega cm^{-3}$) or less as calculated in terms of volume resistivity. The use of a hygroscopic material, a water-soluble inorganic salt, a certain kind of a surface active agent, a cation polymer, an anion polymer, colloidal silica, etc. makes it possible to provide a volume resistivity of $10^{-8}$ ($\Omega cm^{-3}$). However, these materials have a great dependence on temperature and humidity and thus cannot provide a sufficient electrical conductivity at low humidity. Therefore, as the electrically conductive layer material there is preferably used a metal oxide. Some metal oxides have a color. The use of such a colored metal oxide as an electrically conductive layer material causes the entire film to be colored to disadvantage. Examples of metal that forms a colorless metal oxide include Zn, Ti, Al, In, Si, Mg, Ba, Mo, W, and V. Metal oxides mainly composed of these metals are preferably used. Specific examples of these metal oxides include ZnO, $TiO_2$, $SnO_2$, $Al_2O_3$, $In_2O_3$, $SiO_2$, MgO, BaO, $MoO_3$, $V_2O_5$, and composites thereof. Particularly preferred among these metal oxides are ZnO, $TiO_2$, and $SnO_2$. Referring to the incorporation of different kinds of atoms, Al, In, etc. are effectively added to ZnO. Sb, Nb, halogen atoms, etc. are effectively added to $SnO_2$. Nb, Ta, etc. are effectively added to $TiO_2$. Further, as disclosed in JP-B-59-6235, materials comprising the aforementioned metal oxide attached to other crystalline metal particles or fibrous materials (e.g., titanium oxide) may be used. Volume resistivity and surface resistivity are different physical values and thus cannot be simply compared with each other. However, in order to provide an electrical conductivity of $10^{-8}$ ($\Omega cm^{-3}$) or less as calculated in terms of volume resistivity, it suffices if the electrically conductive layer has an electrical conductivity of $10^{-10}$ ($\Omega/\square$) or less, preferably $10^{-8}$ ($\Omega/\square$) as calculated in terms of surface resistivity. It is necessary that the surface resistivity of the electrically conductive layer be measured when the antistatic layer is provided as an outermost layer. The measurement of surface resistivity can be effected at a step in the course of the formation of laminated film described herein.

(Liquid Crystal Display)

Examples of the liquid crystal display of the invention include a liquid crystal display comprising at least one sheet of the polarizing plate of the invention (first embodiment), a liquid crystal display of VA, OCB or TN mode comprising one sheet of the polarizing plate of the invention provided on the upper and lower sides of a cell (second embodiment) and a liquid crystal display of VA mode comprising one sheet of the polarizing plate of the invention provided only on the backlight side of a cell (third embodiment).

In some detail, the cellulose acylate film of the invention can be used as an optically compensatory film to advantage. Further, the polarizing plate comprising a cellulose acylate film of the invention can be used in liquid crystal displays to advantage. The cellulose acylate film of the invention can be used in liquid crystal cells of various display modes. Various display modes such as TN (Twisted Nematic), IPS (In-Plane Switching), FLC (Ferroelectric Liquid Crystal), AFLC (Antiferroelectric Liquid Crystal), OCB (Optically Compensatory Bend), STN (Super Twisted Nematic), VA (Vertically Aligned) and HAN (Hybrid Aligned Nematic) have been proposed. Preferred among these display modes are OCB mode and VA mode.

In a VA mode liquid crystal cell, rod-shaped liquid crystal molecules are vertically oriented when no voltage is applied.

VA mode liquid crystal cells include (1) liquid crystal cell in VA mode in a narrow sense in which rod-shaped liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multi-domained to expand the viewing angle (MVA mode) (as disclosed in SID97, Digest of Tech. Papers (preprint) 28 (1997), 845), (3) liquid crystal cell of mode in which rod-shaped molecules are oriented substantially vertically when no voltage is applied but oriented in twisted multidomained mode when a voltage is applied (n-ASM mode, CPA mode) (as disclosed in Preprints of Symposium on Japanese Liquid Crystal Society Nos. 58 to 59, 1988 and (4) liquid crystal cell of SURVALVAL mode (as reported in LCD International 98).

As a VA mode liquid crystal display there may be used one comprising a liquid crystal cell (VA mode cell) and two sheets of polarizing plates (polarizing plate comprising TAC1, a polarizer and TAC2) disposed on the respective side thereof as shown in FIG. 8. The liquid crystal cell has a liquid crystal provided interposed between the two sheets of electrode substrates, though not specifically shown.

In one embodiment of the transmission type liquid crystal display of the invention, a cellulose acylate film of the invention is used as an optically compensatory film. One sheet of the cellulose acylate film of the invention is disposed interposed between the liquid crystal cell and one of the polarizing plates. Alternatively, two sheets of the cellulose acylate film are disposed interposed between the liquid crystal cell and the two sheets of polarizing plate, respectively. In the case where one sheet of such an optically compensatory film is disposed, any of TAC1 sheets in FIG. 8 may be replaced by a commercially available cellulose acylate film.

In another embodiment of the transmission type liquid crystal display of the invention, as the protective film for the polarizing plate disposed between the liquid crystal cell and the polarizer there is used a cellulose acylate film of the invention. The aforementioned cellulose acylate film may be used only as the protective film for one of the polarizing plates (disposed between the liquid crystal cell and the polarizer). Alternatively, the aforementioned cellulose acylate film may be used as two protective film for the two polarizing plates (disposed between the liquid crystal cell and the polarizer). The lamination of the aforementioned cellulose acylate film on the liquid crystal cell is preferably made such that the cellulose acylate film (TAC1) of the invention is disposed on VA cell side. In the case where the aforementioned cellulose acylate film is used only as the protective film for one of the polarizing plates (disposed between the liquid crystal cell and the polarizer), the cellulose acylate film may be disposed either as the upper polarizing plate (observer side) or as the lower polarizing plate (backlight side) without any functional problems. However, when the cellulose acylate film is used as the upper polarizing plate, it is necessary that a functional film be provided on the observer side (upper side), making it likely that the production yield can be lowered. Therefore, it is thought more likely that the cellulose acylate film can be used as the lower polarizing plate. This arrangement is thought to be a preferred embodiment.

The arrangement of FIG. 8 that both the polarizing plate on the light source side and on the observer side are formed by a polarizing plate of the invention is a second embodiment of the liquid crystal display. The arrangement that only the polarizing plate on the light source side is formed by a polarizing plate of the invention is a third embodiment of the liquid crystal display.

The protective film (TAC2) shown in FIG. 8 may be a commercially available cellulose acylate film and is preferably thinner than the cellulose acylate film of the invention, e.g., 40 μm to 80 μm. Examples of such a cellulose acylate film include commercially available KC4UX2M (40 μm; produced by Konicaopto Co., Ltd.), KC5UX (60 μm; produced by Konicaopto Co., Ltd.), and TD80 (80 μm; produced by Fuji Photo Film Co., Ltd.).

EXAMPLE

The invention will be further described in the following examples, but the invention is not limited thereto.

Example 1

Preparation of Cellulose Acylate Films (Films 1 to 7) by Band Casting Machine (1) Cellulose Acylate Cellulose acylates having different kinds of acyl group and acyl group substitution degrees as set forth in Table 1 were prepared. In some detail, a carboxylic acid which is a raw material of acyl substituent was subjected to acylation reaction at 40° C. in the presence of sulfuric acid (7.8 parts by mass based on 100 parts by mass of cellulose) as a catalyst. During this reaction, the kind and amount of the carboxylic acid were adjusted to adjust the kind and substitution degree of acyl group. The carboxylic acid thus acylated was then ripened at 40° C. The cellulose acylate thus obtained was then washed with acetone to remove low molecular components therefrom. In Table 1, CAB is an abbreviation of cellulose acetate butyrate (cellulose ester derivative comprising acetyl group (Ac) and butyryl group (Bu) as acyl group), CAP is an abbreviation of cellulose acetate propionate (cellulose ester derivative comprising acetyl group and propionyl group (Pr) as acyl group), and CTA stands for cellulose triacetate (cellulose ester derivative comprising only acetyl group as acyl group).

(2) Dissolution

A cellulose acylate set forth in Table 1, a plasticizer (TPP: triphenyl phosphate; BDP: biphenyl diphenyl phosphate), an ultraviolet absorber (UV1: 2(2'-hydroxy-3',5'-di-tert-butylphenyl)benzotriazole); UV2:2(2'-hydroxy-3',5'-di-amylphenyl)-5-chlorobenzo triazole), the following retardation increasing agent (1) and the following retardation increasing agent (2) were added to a 87/13 (by mass) mixture of dichloromethane and methanol in such an amount that the mass concentration of cotton reached 15% by mass. The mixture was then heated with stirring to make a solution. At the same time, a particulate material as matting agent (AEROSIL R972, produced by NIPPON AEROSIL CO., LTD.) and the following dye (1) were added to the mixture in an amount of 0.05 parts by mass and 0.0009 parts by mass, respectively, based on 100 parts by mass of cellulose acylate under heating with stirring. The added amount of additives in Table 1 are based on 100 parts by mass of cotton.

Retardation increasing agent (1)

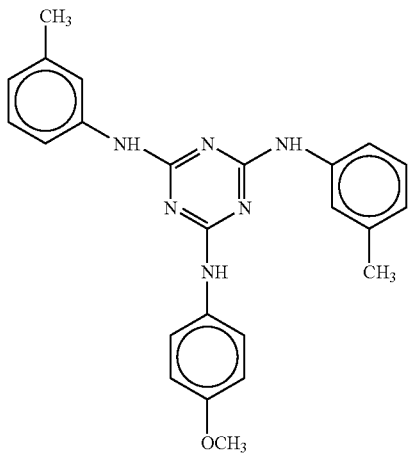

Retardation increasing agent (2)

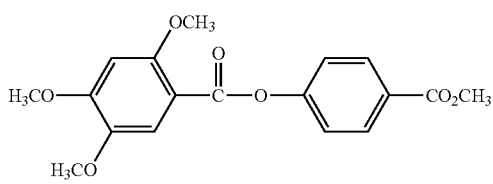

Dye (1)

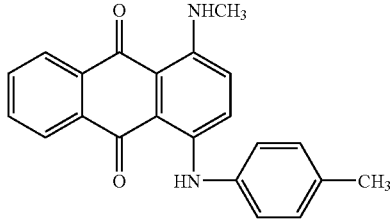

(Flow Casting)

The dope thus obtained was then flow-casted using a band casting machine. The film which had been peeled off the band while the residual solvent content was from 25% to 35% by mass was then longitudinally stretched by a factor of from 0.5% to 5% (see Table 1) at a stretching temperature of from about Tg−5° C. to Tg+5° C. over the region between peeling and reaching to tenter. Subsequently, the film was crosswise stretched by a factor of from 0% to 30% (see Table 1) using a tenter, immediately allowed to shrink crosswise by a factor of from 0% to 10%, and then released from the tenter to prepare a cellulose acylate film. Before reaching to the winding zone, the film was trimmed at the both edges thereof to obtain a film having a width of 2,000 mm which was then wound as roll film to a length of 4,000 m. The draw ratio is set forth in Table 1. The cellulose acylate film thus prepared (optically compensatory film) was then measured for Re retardation value and Rth retardation value at a wavelength of 480 nm, 550 nm, 590 nm and 630 nm at 25° C. and 60% RH. The results are set forth in Table 1. For the calculation of Rth(λ) of the film of the invention, the average refractive index was 1.48.

All the films obtained in the present example exhibited a haze of from 0.1 to 0.9. The secondary average particle diameter of the matting agent was 1.0 μm or less. These films showed a mass change of from 0% to 3% after 48 hours of aging at 80° C. and 90% RH. These films also showed a dimensional change of from 0% to 4.5% after 24 hours of aging at 60° C. and 95% RH or 90° C. and 5% RH. All these samples exhibited a photoelastic coefficient of $50 \times 10^{-13}$ cm2/dyne or less.

Example 2

Preparation of Cellulose Acylate Film (Film 8) by Drum Casting Machine

The following components were charged in a mixing tank wherein they were then heated to 30° C. with stirring so that they were dissolved to prepare a cellulose acetate solution.

| (Formulation of cellulose acetate solution) | | |
|---|---|---|
| | (parts by mass) | |
| | Inner layer | Outer layer |
| Cellulose acetate (acetylation degree: 60.9%) | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Particulate silica (AEROSIL R972, produced by NIPPON AEROSIL CO., LTD.) | 0 | 0.8 |
| Retardation increasing agent (3) | 1.4 | 0 |

The substitution degree of the aforementioned cellulose acetate was as follows.

Substitution degree A: 2.87; substitution degree B: 0; total substitution A+B: 2.87; 6-position substitution degree: 0.907; 6-position substitution degree/total substitution degree: 0.316

Retardation increasing agent (3)

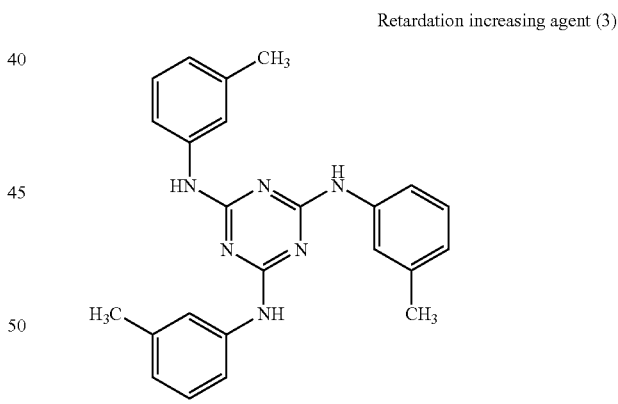

Using a three-layer cocasting die, the inner layer dope and outer layer dope thus obtained were each flow-casted over a drum which had been chilled to 0° C. The film having a residual solvent content of 70% by mass was then peeled off the drum, fixed to a pin tenter at the both edges thereof, dried at 80° C. while being conveyed at a draw ratio of 110% (stretch ratio: 10%) in the conveying direction, and then dried at 110° C. when the film showed a residual solvent content of 10% by mass. Thereafter, the film was dried at 140° C. for 30 minutes. Before reaching to the winding zone, the film was trimmed at the both edges thereof to obtain a film having a width of 2,000 mm which was then wound as a roll film to a length of 4,000 m. Thus, a film 8 having a residual solvent content of 0.3% by mass (outer layer: 3 µm; inner layer: 74 µm; outer layer: 3 µm) was prepared. The cellulose acylate film thus prepared (optically compensatory film) was then measured for Re retardation value and Rth retardation value at a wavelength of 480 nm, 550 nm, 590 nm and 630 nm at 25° C. and 60% RH. The results are set forth in Table 1. For the calculation of Rth(λ) of the film of the invention, the average refractive index was predetermined to be 1.48.

The film obtained in Example 2 exhibited a haze of 0.3. The secondary average particle diameter of the matting agent was 1.0 µm or less. The film showed a mass change of 0.5% after 48 hours of aging at 80° C. and 90% RH. The film also showed a dimensional change of 0.1% or less after 24 hours of aging at 60° C. and 95% RH or 90° C. and 5% RH. The sample exhibited a photoelastic coefficient of $13 \times 10^{-13}$ cm2/dyne.

Example 3

Preparation of Protective Film with Antireflection Capacity (Protective Film 1)

(Preparation of Light-Scattering Layer Coating Solution)

50 g of a mixture of pentaerythritol triacrylate and pentaerythritol tetraacrylate (PETA, produced by NIPPON KAYAKU CO., LTD.) was diluted with 38.5 g of toluene. Further, to the solution was added 2 g of a polymerization initiator (Irgacure 184, produced by Ciba Specialty Chemicals Co., Ltd.). The mixture was then stirred. The solution thus obtained was spread, and then ultraviolet-cured to obtain a coat layer having a refractive index of 1.51.

To the solution were then added 1.7 g of a 30% toluene dispersion of a particulate crosslinked polystyrene having an average particle diameter of 3.5 µm (refractive index: 1.60; SX-350, produced by Soken Chemical & Engineering Co., Ltd.) which had been dispersed at 10,000 rpm using a polytron dispersing machine for 20 minutes and 13.3 g of a 30% toluene dispersion of a particulate crosslinked acryl-styrene having an average particle diameter of 3.5 µm (refractive index: 1.55, produced by Soken Chemical. & Engineering Co., Ltd.) which had been dispersed at 10,000 rpm using a polytron dispersing machine for 20 minutes. Finally, to the mixture were added 0.75 g of a fluorine-based surface modifier (FP-1) and 10 g of a silane coupling agent (KBM-5103, produced by Shin-Etsu Chemical Co., Ltd.) to obtain a completed solution.

The aforementioned mixture was then filtered through a polypropylene filter having a pore diameter of 30 µm to prepare a light-scattering layer coating solution.

Fluorine-based surface modifier (FP-1)

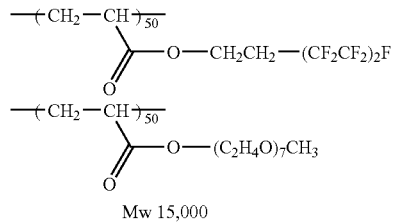

Mw 15,000

(Preparation of Low Refractive Index Layer Coating Solution)

Firstly, a sol a was prepared in the following manner. In some detail, 120 parts of methyl ethyl ketone, 100 parts of an acryloyloxypropyl trimethoxysilane (KBM5103, produced by Shin-Etsu Chemical Co., Ltd.) and 3 parts of diisopropoxyaluminum ethyl acetoacetate were charged in a reaction vessel equipped with an agitator and a reflux condenser to make mixture. To the mixture were then added 30 parts of deionized water. The mixture was reacted at 60° C. for 4 hours, and then allowed to cool to room temperature to obtain a sol a. The weight-average molecular weight of the sol was 1,600. The proportion of components having a molecular weight of from 1,000 to 20,000 in the oligomer components was 100%. The gas chromatography of the sol showed that no acryloyloxypropyl trimethoxysilane which is a raw material had been left.

13 g of a thermally-crosslinkable fluorine-containing polymer (JN-7228; solid concentration: 6%; produced by JSR Co., Ltd.) having a refractive index of 1.42, 1.3 g of silica sol (silica having a particle size different from that MEK-ST; average particle size: 45 nm; solid concentration: 30%; produced by NISSAN CHEMICAL INDUSTRIES, LTD.), 0.6 g of the sol a thus prepared, 5 g of methyl ethyl ketone and 0.6 g of cyclohexanone were mixed with stirring. The solution was then filtered through a polypropylene filter having a pore diameter of 1 µm to prepare a low refractive index layer coating solution.

(Preparation of Transparent Protective Film with Anti-Reflection Layer)

The aforementioned coating solution for functional layer (light-scattering layer) was spread over a triacetyl cellulose film having a thickness of 80 µm (Fujitac TDY80U, produced by Fuji Photo Film Co., Ltd.) which was being unwound from a roll at a gravure rotary speed of 30 rpm and a conveying speed of 30 nm/min using a microgravure roll with a diameter of 50 mm having 180 lines/inch and a depth of 40 µm and a doctor blade. The coated film was dried at 60° C. for 150 seconds, irradiated with ultraviolet rays at an illuminance of 400 mW/cm² and a dose of 250 mJ/cm² from an air-cooled metal halide lamp having an output of 160 W/cm (produced by EYE GRAPHICS CO., LTD.) in an atmosphere in which the air within had been purged with nitrogen so that the coat layer was cured to form a functional layer to a thickness of 6 µm. The film was then wound.

The coating solution for low refractive layer thus prepared was spread over the triacetyl cellulose film having the functional layer (light-scattering layer) provided thereon was being unwound at a gravure rotary speed of 30 rpm and a conveying speed of 15 m/min using a microgravure roll with a diameter of 50 mm having 180 lines/inch and a depth of 40 µm and a doctor blade. The coated film was dried at 120° C. for 150 seconds and then at 140° C. for 8 minutes. The film was irradiated with ultraviolet rays at an illuminance of 400 mW/cm² and a dose of 900 mJ/cm² from an air-cooled metal halide lamp having an output of 240 W/cm (produced by EYE GRAPHICS CO., LTD.) in an atmosphere in which the air within had been purged with nitrogen to form a low refractive layer to a thickness of 100 µm. The film was then wound to prepare a protective film with anti-reflection properties (protective film 1).

Example 4

Preparation of Polarizing Plate

A polyvinyl alcohol (PVA) film having a thickness of 80 µm was dipped in an aqueous solution of potassium iodide having a potassium iodide concentration of 2% by mass at 30° C. for 60 seconds so that it was dyed. Subsequently, the polyvinyl alcohol film was longitudinally stretched by a factor of 5 while being dipped in an aqueous solution of boric acid having a boric acid concentration of 4% by mass for 60 seconds, and then dried at 50° C. for 4 minutes to obtain a polarizer A having a thickness of 20 μm.

Separately, a polyvinyl alcohol (PVA) film having a thickness of 80 μm was dipped in an aqueous solution of potassium iodide having a potassium iodide concentration of 12% by mass at 30° C. for 60 seconds so that it was dyed. Subsequently, the polyvinyl alcohol film was longitudinally stretched by a factor of 5 while being dipped in an aqueous solution of boric acid having a boric acid concentration of 4% by mass for 60 seconds, and then dried at 50° C. for 4 minutes to obtain a polarizer B having a thickness of 20 μm.

The protective films prepared in Examples 1 and 2 set forth in Table 1, a commercially available cellulose acylate film TDY80UL (produced by Fuji Photo Film Co., Ltd.) and the protective film with anti-reflection layer prepared in Example 3 were dipped in a 1.5 mol/l aqueous solution of sodium hydroxide at 55° C., and then thoroughly washed with water to remove sodium hydroxide. These films were then dipped in a 0.005 mol/l diluted aqueous solution of sulfuric acid at 35° C. for 1 minute, and then dipped in water to thoroughly remove the diluted aqueous solution of sulfuric acid. Finally, these samples were thoroughly dried at 120° C.

The protective films of Examples 1 and 2, the commercially available cellulose Fujitac TDY80UL and the protective film with anti-reflection layer of Example 3 thus saponified were stuck with the aforementioned polarizer interposed therebetween with a polyvinyl alcohol-based adhesive according to the combination set forth in Table 2 to obtain laminated polarizing plates 1 to 12.

During this procedure, the polarizer and the protective film on the both sides thereof were continuously stuck because they had been prepared in roll form and were parallel to each other along their length. Further, as shown in FIG. 6, the slow axis of the protective film disposed on the cell side of the polarizer was parallel to the transmission axis of the polarizer.

An acrylic adhesive was spread over the cell side of the polarizer thus prepared. A separate film was then stuck to the adhesive. A protective film was stuck to the side of the polarizer opposite the cell.

Example 5

Using a spectrophotometer (produced by JASCO Corporation), these polarizing plates were each then measured for spectral reflectance on the functional layer side thereof at an incidence angle of 5° and a wavelength of from 380 nm to 780 nm to determine an integrating sphere average reflectance at 450 nm to 650 nm. As a result, the polarizing plates 9 to 12 comprising the protective film 1 as a transparent protective film with anti-reflection layer exhibited an integrating sphere average reflectance of 2.3%. For the measurement of reflectance, the protect film was peeled off the transparent protective film with anti-reflection layer.

TABLE 1

| | Optically compensatory film | Film 1 | Film 2 | Film 3 | Film 4 | Film 5 | Film 6 | Film 7 |
|---|---|---|---|---|---|---|---|---|
| Cotton | Kind of cotton | CTA | CTA | CTA | CAP | CAB | CTA | CTA |
| | Substituent A | Ac | Ac | Ac | Ac | Ac | Ac | Ac |
| | Substitution degree A | 2.81 | 2.81 | 2.87 | 1.9 | 1.1 | 2.81 | 2.81 |
| | Substituent B | — | — | — | Pr | Bu | — | — |
| | Substitution degree B | 0 | 0 | 0 | 0.8 | 1.6 | 0 | 0 |
| | Total substitution degree | 2.81 | 2.81 | 2.87 | 2.7 | 2.7 | 2.81 | 2.81 |
| | 6-position substitution degree | 0.9 | 0.9 | 0.907 | 0.897 | 0.881 | 0.9 | 0.9 |
| | 6-position substitution ratio | 0.320 | 0.320 | 0.316 | 0.332 | 0.326 | 0.320 | 0.320 |
| Additives | Kind of plasticizer | TPP/BDP | TPP/BDP | TPP/BDP | TPP/BDP | TPP/BDP | TPP/BDP | TPP/BDP |
| | Plasticizer [parts by mass based on 100 parts by mass of cotton] | 7.8/3.9 | 7.8/3.9 | 7.8/3.9 | 7.8/3.9 | 7.8/3.9 | 7.8/3.9 | 7.8/3.9 |
| | Kind of additives | Retardation increasing agent (1) | Retardation increasing agent (1)/ Retardation increasing agent (2) | Retardation increasing agent (1) | UV1/UV2 | Retardation increasing agent (1) | Retardation increasing agent (1) | Retardation increasing agent (1) |
| | Added amount [parts by mass based on 100 parts by mass of cotton] | 6.4 | 1.9/4.5 | 7.5 | 0.7/0.3 | 3 | 7 | 5 |
| Draw ratio | Longitudinal draw ratio (%) | 3 | 0.2 | 3 | 5 | 0.5 | 0.5 | 0.5 |
| | Crosswise draw ratio (%) | 32 | 34 | 34 | 32 | 32 | 32 | 27 |
| | Percent relaxation '%) | 7 | 7 | 6 | 7 | 7 | 7 | 7 |
| Thickness (μm) | | 85 | 85 | 92 | 110 | 80 | 92 | 88 |
| $Re(\lambda)$ | $Re(590)(nm)$ | 55 | 60 | 50 | 62 | 50 | 70 | 40 |
| $Rth(\lambda)$ | $Rth(590)(nm)$ | 200 | 180 | 190 | 190 | 200 | 220 | 190 |
| | $Re(480)/Re(550)$ | 1.03 | 1.03 | 1.08 | 0.95 | 1.03 | 1.05 | 1.03 |
| | $Re(630)/Re(550)$ | 0.98 | 0.98 | 0.95 | 1.02 | 0.98 | 0.97 | 1.00 |
| | $Rth(480)/Rth(550)$ | 1.02 | 1.02 | 1.06 | 0.95 | 1.02 | 1.04 | 1.02 |
| | $Rth(630)/Rth(550)$ | 0.99 | 0.99 | 0.96 | 1.02 | 0.99 | 0.98 | 1.00 |

TABLE 2

| Polarizing plate | Cell side | Polarizer | Opposite side to cell | Hue a* in cross-Nicol arrangement | Hue b* in cross-Nicol arrangement | Single transmission % | Parallel transmission % | Crossed transmission % | Polarization % |
|---|---|---|---|---|---|---|---|---|---|
| Polarizing plate 1 | Film 1 | A | TDY80UL | −0.05 | −0.35 | 42.8 | 36.6 | 0.004 | 99.98 |
| Polarizing plate 2 | Film 2 | A | TDY80UL | −0.05 | −0.35 | 42.8 | 36.6 | 0.004 | 99.98 |
| Polarizing plate 3 | Film 3 | A | TDY80UL | −0.05 | −0.35 | 42.8 | 36.6 | 0.004 | 99.98 |
| Polarizing plate 4 | Film 4 | A | TDY80UL | −0.05 | −0.35 | 42.8 | 36.6 | 0.004 | 99.98 |
| Polarizing plate 5 | Film 5 | A | TDY80UL | −0.05 | −0.35 | 42.8 | 36.6 | 0.004 | 99.98 |
| Polarizing plate 6 | Film 6 | A | TDY80UL | −0.05 | −0.35 | 42.8 | 36.6 | 0.004 | 99.98 |
| Polarizing plate 7 | Film 7 | A | TDY80UL | −0.05 | −0.35 | 42.8 | 36.6 | 0.004 | 99.98 |
| Polarizing plate 8 | Film 1 | B | TDY80UL | 0.1 | −3.0 | 43.2 | 37.1 | 0.006 | 99.97 |
| Polarizing plate 9 | TDY80UL | A | Protective film 1 | −0.05 | −0.35 | 42.8 | 36.6 | 0.004 | 99.98 |
| Polarizing plate 10 | TDY80UL | B | Protective film 1 | −0.05 | −3.0 | 43.2 | 37.1 | 0.006 | 99.98 |
| Polarizing plate 11 | Film 8 | A | Protective film 1 | −0.05 | −0.35 | 42.8 | 36.6 | 0.004 | 99.98 |
| Polarizing plate 12 | Film 8 | B | Protective film 1 | 0.1 | −3.0 | 43.2 | 37.1 | 0.006 | 99.97 |

Example 6

Preparation of VA Cell

A VA cell having the configuration shown in the sixth example in JP-A-11-258605 was prepared. As a liquid crystal material there was used MLC-6608 (produced by Merck Ltd.). An of the liquid crystal material MLC-6608 of VA cell at a temperature of 40° C. during the lighting of the backlight was 0.072. Therefore, four VA cells were prepared. In some detail, a VA cell 1 having a cell gap of 3.6 μm was prepared to make Δnd of 260 nm. A VA cell 2 having a cell gap of 3.9 μm was prepared to make Δnd of 280 nm. A VA cell 3 having a cell gap of 4.2 μm was prepared to make Δnd of 300 nm. A VA cell 4 having a cell gap of 4.5 μm was prepared to make Δnd of 320 mm.

(Mounting on VA Cell)

The polarizing plates 1 to 12 prepared in Example 4 were each stuck to the both sides of the VA cell prepared above according to the combination set forth in Tables 3 to 11 to prepare liquid crystal displays LCD 1 to 71. During this procedure, arrangement was made such that the absorption axis of the polarizing plate on the viewing side was disposed horizontally to the panel, the absorption axis of the polarizing plate on the backlight side was disposed vertically to the panel and the adhesive side was disposed on the liquid crystal cell side. For the liquid crystal displays 1 to 63, as the cold cathode ray tube of backlight there was used one having a color temperature of 8,500° K. For the liquid crystal displays LCD 64 to 71, as the cold cathode ray tube of backlight there was used one having a color temperature of 12,500° K.

Using a Type EZ-Contrast 160D measuring instrument (produced by ELDIM), these liquid crystal displays off which the protective film had been peeled were each then measured for brightness and chromaticity at the black state and at the white state in dark room. From the measurements were then calculated color shift at the white state and contrast ratio. In order to make black state, a voltage of 1.4 V was applied across the common electrode and the pixel electrode. In order to make a white state, a voltage of 4.0 V was applied across the common electrode and the pixel electrode. The results are set forth in Tables 3 to 11. The color shift at the white state and viewing angle will be described hereinafter.

[Black Color Shift in the Polar Angle Direction]

The chromaticity changes $\Delta x\theta$, $\Delta y\theta$ developed when the viewing direction is tilted from the direction normal to the liquid crystal cell to the direction along the central line of the transmission axis of the pair of polarizing plates (azimuthal angle: 45°) at the white state preferably satisfy the following numeral expressions (XXIII) and (XXIV) between polar angles of 0° and 80°.

$$0 \leq \Delta x\theta \leq 0.1 \quad \text{(XXIII)}$$

$$0 \leq \Delta y\theta \leq 0.1 \quad \text{(XXIV)}$$

wherein $\Delta x\theta$ represents $(x\theta - x\theta 0)$ and $\Delta y\theta$ represents $(y\theta - y\theta 0)$; $x\theta 0$ and $y\theta 0$ each represent the chromaticity measured in the direction normal to the liquid crystal cell at the white state; and $x\theta$ and $y\theta$ each represent the chromaticity measured when the viewing direction is tilted at a polar angle of θ from the direction normal to the liquid crystal cell to the direction along the central line of the transmission axis of the pair of polarizing plates.

[Black Color Shift in the Azimuthal Angle Direction]

The chromaticity changes $\Delta x\phi$, $\Delta y\phi$ developed when the viewing direction is tilted an angle of 60° from the direction normal to the liquid crystal cell to the direction of the absorption axis of the polarizing plate on the viewing side and rotated at an angle of 360° from the aforementioned direction with the normal line as center preferably satisfy the following numeral expressions (XXV) and (XXVI) between azimuthal angles of 0° and 360°.

$$-0.02 \leq \Delta x\phi \leq 0.1 \quad \text{(XXV)}$$

$$-0.02 \leq \Delta y\phi \leq 0.1 \quad \text{(XXVI)}$$

wherein $\Delta x\theta$ represents $(x\phi - x\phi 0)$ and $\Delta y\theta$ represents $(y\phi - y\phi 0)$; $x\phi 0$ and $y\phi 0$ each represent the chromaticity measured in the viewing direction tilted at an angle of 60° from the line normal to the liquid crystal cell at the white state to the direction of absorption axis of the polarizing plate on the viewing side; and xφ and yφ each represent the chromaticity measured in the viewing direction tilted at an angle of 60° from the direction normal to the liquid crystal cell to the direction of absorption axis of the polarizing plate on the viewing side and rotated at an azimuthal angle φ with the direction of the normal line as center.

[Viewing Angle]

The greater the contrast ratio at an azimuthal angle of 45° and a polar angle of 60° (CR@φ=45/(θ=60) is, the greater is the viewing angle.

[Observation of Black Display Under Illumination]

The liquid crystal display was visually observed at an azimuthal angle of 45° and a polar angle of 60° for screen brightness and display color at the white state in such an atmosphere that the illuminance of the surface of the liquid crystal display is 150 (lx) under daylight fluorescent lamp. The results are set forth in Tables 3 to 11.

The liquid crystal display comprising the polarizer A, which exhibits neutral hue, was visually observed to give a black state that looks neutral and has a high contrast ratio (low black brightness).

The liquid crystal display comprising the polarizer B, which exhibits blue hue, gave a black state that looks bluish and has a visually lower contrast ratio (higher black brightness) than the liquid crystal display comprising the polarizer A, which exhibits neutral hue, under fluorescent lamp, even if the contrast ratio is originally the same as that of the liquid crystal display comprising the polarizer A.

When the cold cathode ray tube which provides the backlight with a color temperature of 8,500° K was used, the black state looked neutral and showed a high contrast ratio (low black brightness). When the cold cathode ray tube which provides the backlight with a color temperature of 12,500° K was used, the black state looked bluish as compared with the case where the cold cathode ray tube which provides the backlight with a color temperature of 8,500° K was used. Even when the contrast ratio of the two cases are originally the same, the black state with the cold cathode ray tube which provides the backlight with a color temperature of 8,500° K was visually observed to give a lower contrast ratio (higher black brightness) than the other.

TABLE 3

| Liquid crystal display | Polarizing plate on viewing side | Backlight side Polarizing plate | Cell side | ReA(590)/ RthA(590) | Black color shift Δxθ | Δyθ | Δxφ | Δxφ | CR@φ = 45/ θ = 60 | Visual evaluation in daylight | Remarks |
|---|---|---|---|---|---|---|---|---|---|---|---|
| LCD1 | Polarizing plate 9 | Polarizing plate 1 | Film 1 | 55 nm/ 200 nm | 0~0.08 | 0~0.08 | 0~0.07 | 0~0.07 | 33 | Blackish, dark | Inventive |
| LCD2 | Polarizing plate 9 | Polarizing plate 2 | Film 2 | 60 nm/ 180 nm | 0~0.08 | 0~0.08 | 0~0.07 | 0~0.07 | 53 | Blackish, dark | Inventive |
| LCD3 | Polarizing plate 9 | Polarizing plate 3 | Film 3 | 50 nm/ 190 nm | 0~0.10 | 0~0.10 | 0~0.10 | 0~0.10 | 32 | Blackish, dark | Inventive |
| LCD4 | Polarizing plate 9 | Polarizing plate 4 | Film 4 | 62 nm/ 190 nm | 0~0.04 | 0~0.04 | 0~0.03 | 0~0.03 | 51 | Blackish, dark | Inventive |
| LCD5 | Polarizing plate 9 | Polarizing plate 5 | Film 5 | 50 nm/ 200 nm | 0~0.10 | 0~0.10 | 0~0.10 | 0~0.10 | 31 | Blackish, dark | Inventive |
| LCD6 | Polarizing plate 9 | Polarizing plate 6 | Film 6 | 70 nm/ 220 nm | 0~0.02 | 0~0.02 | −0.02~0.02 | −0.20~0.02 | 30 | Blackish, dark | Inventive |
| LCD7 | Polarizing plate 9 | Polarizing plate 7 | Film 7 | 40 nm/ 190 nm | 0~0.15 | 0~0.15 | 0~0.14 | 0~0.14 | 23 | Dark-reddish, bright | Comparative |
| LCD8 | Polarizing plate 10 | Polarizing plate 8 | Film 1 | 55 nm/ 200 nm | 0~0.08 | 0~0.08 | 0~0.07 | 0~0.07 | 33 | Dark-bluish, slightly bright | Inventive |

<Conditions common to LCD1-8>
Protective film on cell side of polarizing plate on viewing side: TDY80UL, ReB(590)/Rth(590) = 3 nm/45 nm
VA cell: VA cell 1 (Δnd = 260 nm), backlight color temperature (8,500° K)
Preferred range of ReA(590) and RthA(590) of liquid crystal display comprising TDY80UL as protective film on cell side of polarizing plate on viewing side: ReA(590) = 48 nm~77 nm/RthA(590) = 159 nm~209 nm

TABLE 4

| Liquid crystal display | Polarizing plate on viewing side | Backlight side Polarizing plate | Cell side | ReA(590)/ RthA(590) | Black color shift Δxθ | Δyθ | Δxφ | Δxφ | CR@φ = 45/ θ = 60 | Visual evaluation in daylight | Remarks |
|---|---|---|---|---|---|---|---|---|---|---|---|
| LCD9 | Polarizing plate 9 | Polarizing plate 1 | Film 1 | 55 nm/ 200 nm | 0~0.08 | 0~0.08 | 0~0.07 | 0~0.07 | 50 | Blackish, dark | Inventive |
| LCD10 | Polarizing plate 9 | Polarizing plate 2 | Film 2 | 60 nm/ 180 nm | 0~0.08 | 0~0.08 | 0~0.07 | 0~0.07 | 41 | Blackish, dark | Inventive |

TABLE 4-continued

| Liquid crystal display | Polarizing plate on viewing side | Backlight side | | | Black color shift | | | | CR@φ = 45/ Θ = 60 | Visual evaluation in daylight | Remarks |
|---|---|---|---|---|---|---|---|---|---|---|---|
| | | Polarizing plate | Cell side | ReA(590)/ RthA(590) | ΔxΘ | ΔyΘ | Δxφ | Δxφ | | | |
| LCD11 | Polarizing plate 9 | Polarizing plate 3 | Film 3 | 50 nm/ 190 nm | 0~0.10 | 0~0.10 | 0~0.10 | 0~0.10 | 38 | Blackish, dark | Inventive |
| LCD12 | Polarizing plate 9 | Polarizing plate 4 | Film 4 | 62 nm/ 190 nm | 0~0.04 | 0~0.04 | 0~0.03 | 0~0.03 | 60 | Blackish, dark | Inventive |
| LCD13 | Polarizing plate 9 | Polarizing plate 5 | Film 5 | 50 nm/ 200 nm | 0~0.10 | 0~0.10 | 0~0.10 | 0~0.10 | 40 | Blackish, dark | Inventive |
| LCD14 | Polarizing plate 9 | Polarizing plate 6 | Film 6 | 70 nm/ 220 nm | 0~0.02 | 0~0.02 | −0.20~0.02 | −0.02~0.02 | 35 | Blackish, dark | Inventive |
| LCD15 | Polarizing plate 9 | Polarizing plate 7 | Film 7 | 40 nm/ 190 nm | 0~0.15 | 0~0.15 | 0~0.14 | 0~0.14 | 26 | Dark-reddish, bright | Comparative |
| LCD16 | Polarizing plate 10 | Polarizing plate 8 | Film 1 | 55 nm/ 200 nm | 0~0.08 | 0~0.08 | 0~0.07 | 0~0.07 | 50 | Dark-bluish, slightly bright | Inventive |

<Conditions common to LCD9-16>
Protective film on cell side of polarizing plate on viewing side: TDY80UL, ReB(590)/RthB(590) = 3 nm/45 nm
VA cell: VA cell 2 (Δnd = 280 nm), backlight color temperature (8,500° K)
Preferred range of ReA(590) and RthA(590) of liquid crystal display comprising TDY80UL as protective film on cell side of polarizing plate on viewing side: ReA(590) = 46 nm~72 nm/RthA(590) = 174 nm~228 nm

TABLE 5

| Liquid crystal display | Polarizing plate on viewing side | Backlight side | | | Black color shift | |
|---|---|---|---|---|---|---|
| | | Polarizing plate | Cell side | ReA(590)/ RthA(590) | ΔxΘ | ΔyΘ |
| LCD17 | Polarizing plate 9 | Polarizing plate 1 | Film 1 | 55 nm/200 nm | 0~0.08 | 0~0.08 |
| LCD18 | Polarizing plate 9 | Polarizing plate 2 | Film 2 | 60 nm/180 nm | 0~0.08 | 0~0.08 |
| LCD19 | Polarizing plate 9 | Polarizing plate 3 | Film 3 | 50 nm/190 nm | 0~0.10 | 0~0.10 |
| LCD20 | Polarizing plate 9 | Polarizing plate 4 | Film 4 | 62 nm/190 nm | 0~0.04 | 0~0.04 |
| LCD21 | Polarizing plate 9 | Polarizing plate 5 | Film 5 | 50 nm/200 nm | 0~0.10 | 0~0.10 |
| LCD22 | Polarizing plate 9 | Polarizing plate 6 | Film 6 | 70 nm/220 nm | −0.02~0.02 | −0.02~0.02 |
| LCD23 | Polarizing plate 9 | Polarizing plate 7 | Film 7 | 40 nm/190 nm | 0~0.15 | 0~0.15 |
| LCD24 | Polarizing plate 10 | Polarizing plate 8 | Film 1 | 55 nm/200 nm | 0~0.08 | 0~0.08 |

| Liquid crystal display | Black color shift | | CR@φ = 45/ Θ = 60 | Visual evaluation in daylight | Remarks |
|---|---|---|---|---|---|
| | Δxφ | Δxφ | | | |
| LCD17 | 0~0.07 | 0~0.07 | 44 | Blackish, dark | Inventive |
| LCD18 | 0~0.07 | 0~0.07 | 26 | Blackish, bright | Comparative |
| LCD19 | 0~0.09 | 0~0.09 | 31 | Blackish, dark | Inventive |
| LCD20 | 0~0.03 | 0~0.03 | 34 | Blackish, dark | Inventive |
| LCD21 | 0~0.09 | 0~0.09 | 38 | Blackish, dark | Inventive |
| LCD22 | −0.03~0.02 | −0.03~0.02 | 47 | Dark-bluish, dark | Comparative |
| LCD23 | 0~0.14 | 0~0.14 | 24 | Dark-reddish, bright | Comparative |
| LCD24 | 0~0.07 | 0~0.07 | 44 | Dark-bluish, slightly bright | Inventive |

<Conditions common to LCD17-24>
Protective film on cell side of polarizing plate on viewing side: TDY80UL, ReB(590)/RthB(590) = 3 nm/45 nm
VA cell: VA cell 3 (Δnd = 300 nm), backlight color temperature (8,500° K)
Preferred range of ReA(590) and RthA(590) of liquid crystal display comprising TDY80UL as protective film on cell side of polarizing plate on viewing side: ReA(590) = 43 nm~68 nm/RthA(590) = 189 nm~247 nm

TABLE 6

| Liquid crystal display | Polarizing plate on viewing side | Backlight side Polarizing plate | Backlight side Cell side | ReA(590)/ RthA(590) | Black color shift ΔxΘ | Black color shift ΔyΘ |
|---|---|---|---|---|---|---|
| LCD25 | Polarizing plate 9 | Polarizing plate 1 | Film 1 | 55 nm/200 nm | 0~0.09 | 0~0.09 |
| LCD26 | Polarizing plate 9 | Polarizing plate 2 | Film 2 | 60 nm/180 nm | 0~0.09 | 0~0.09 |
| LCD27 | Polarizing plate 9 | Polarizing plate 3 | Film 3 | 50 nm/190 nm | 0~0.14 | 0~0.14 |
| LCD28 | Polarizing plate 9 | Polarizing plate 4 | Film 4 | 62 nm/190 nm | 0~0.05 | 0~0.05 |
| LCD29 | Polarizing plate 9 | Polarizing plate 5 | Film 5 | 50 nm/200 nm | 0~0.13 | 0~0.13 |
| LCD30 | Polarizing plate 9 | Polarizing plate 6 | Film 6 | 70 nm/220 nm | −0.01~0.03 | −0.01~0.03 |
| LCD31 | Polarizing plate 9 | Polarizing plate 7 | Film 7 | 40 nm/190 nm | 0~0.16 | 0~0.16 |
| LCD32 | Polarizing plate 10 | Polarizing plate 8 | Film 1 | 55 nm/200 nm | 0~0.09 | 0~0.09 |

| Liquid crystal display | Black color shift Δxφ | Black color shift Δxφ | CR@φ = 45/ Θ = 60 | Visual evaluation in daylight | Remarks |
|---|---|---|---|---|---|
| LCD25 | 0~0.08 | 0~0.08 | 28 | Blackish, bright | Comparative |
| LCD26 | 0~0.08 | 0~0.08 | 17 | Blackish, bright | Comparative |
| LCD27 | 0~0.13 | 0~0.13 | 21 | Dark-reddish, bright | Comparative |
| LCD28 | 0~0.04 | 0~0.04 | 22 | Blackish, bright | Comparative |
| LCD29 | 0~0.12 | 0~0.12 | 27 | Dark-reddish, bright | Comparative |
| LCD30 | −0.02~0.03 | −0.02~0.03 | 38 | Dark-bluish, dark | Comparative |
| LCD31 | 0~0.15 | 0~0.15 | 19 | Dark-reddish, bright | Comparative |
| LCD32 | 0~0.08 | 0~0.08 | 28 | Dark-bluish, dark | Comparative |

<Conditions common to LCD25-32>
Protective film on cell side of polarizing plate on viewing side: TDY80UL, ReB(590)/RthB(590) = 3 nm/45 nm
VA cell: VA cell 4 (Δnd = 320 nm), backlight color temperature (8,500° K)
Preferred range of ReA(590) and RthA(590) of liquid crystal display comprising TDY80UL as protective film on cell side of polarizing plate on viewing side: ReA(590) = 42 nm~64 nm/RthA(590) = 204 nm~267 nm

TABLE 7

| Liquid crystal display | Polarizing plate on viewing side | Backlight side Polarizing plate | Backlight side Cell side | ReA(590)/ RthA(590) | Black color shift ΔxΘ | Black color shift ΔyΘ |
|---|---|---|---|---|---|---|
| LCD33 | Polarizing plate 11 | Polarizing plate 1 | Film 1 | 55 nm/200 nm | 0~0.09 | 0~0.09 |
| LCD33 | Polarizing plate 11 | Polarizing plate 2 | Film 2 | 60 nm/180 nm | 0~0.09 | 0~0.09 |
| LCD34 | Polarizing plate 11 | Polarizing plate 3 | Film 3 | 50 nm/190 nm | 0~0.14 | 0~0.14 |
| LCD35 | Polarizing plate 11 | Polarizing plate 4 | Film 4 | 62 nm/190 nm | 0~0.05 | 0~0.05 |
| LCD36 | Polarizing plate 11 | Polarizing plate 5 | Film 5 | 50 nm/200 nm | 0~0.13 | 0~0.13 |
| LCD37 | Polarizing plate 11 | Polarizing plate 6 | Film 6 | 70 nm/220 nm | −0.01~0.03 | −0.01~0.03 |
| LCD38 | Polarizing plate 11 | Polarizing plate 7 | Film 7 | 40 nm/190 nm | 0~0.16 | 0~0.16 |
| LCD39 | Polarizing plate 12 | Polarizing plate 8 | Film 1 | 55 nm/200 nm | 0~0.09 | 0~0.09 |

TABLE 7-continued

| Liquid crystal display | Black color shift Δxφ | Δxφ | CR@φ = 45/ Θ = 60 | Visual evaluation in daylight | Remarks |
|---|---|---|---|---|---|
| LCD33 | 0~0.08 | 0~0.08 | 14 | Blackish, bright | Comparative |
| LCD33 | 0~0.08 | 0~0.08 | 24 | Blackish, bright | Comparative |
| LCD34 | 0~0.13 | 0~0.13 | 16 | Dark-reddish, bright | Comparative |
| LCD35 | 0~0.04 | 0~0.04 | 21 | Blackish, bright | Comparative |
| LCD36 | 0~0.12 | 0~0.12 | 13 | Dark-reddish, bright | Comparative |
| LCD37 | −0.02~0.03 | −0.02~0.03 | 10 | Dark-bluish, bright | Comparative |
| LCD38 | 0~0.15 | 0~0.15 | 11 | Dark-reddish, bright | Comparative |
| LCD39 | 0~0.08 | 0~0.08 | 14 | Dark-bluish, dark | Comparative |

<Conditions common to LCD33-39>
Protective film on cell side of polarizing plate on viewing side: Film 8, ReB(590)/RthB(590) = 8 nm/80 nm
VA cell: VA cell 1 (Δnd = 260 nm), backlight color temperature (8,500° K)
Preferred range of ReA(590) and RthA(590) of liquid crystal display comprising film 8 as protective film on cell side of polarizing plate on viewing side: ReA(590) = 54 nm~89 nm/RthA(590) = 133 nm~175 nm

TABLE 8

| Liquid crystal display | Polarizing plate on viewing side | Backlight side Polarizing plate | Cell side | ReA(590)/ RthA(590) | Black color shift ΔxΘ | ΔyΘ |
|---|---|---|---|---|---|---|
| LCD40 | Polarizing plate 11 | Polarizing plate 1 | Film 1 | 55 nm/200 nm | 0~0.08 | 0~0.08 |
| LCD41 | Polarizing plate 11 | Polarizing plate 2 | Film 2 | 60 nm/180 nm | 0~0.08 | 0~0.08 |
| LCD42 | Polarizing plate 11 | Polarizing plate 3 | Film 3 | 50 nm/190 nm | 0~0.10 | 0~0.10 |
| LCD43 | Polarizing plate 11 | Polarizing plate 4 | Film 4 | 62 nm/190 nm | 0~0.04 | 0~0.04 |
| LCD44 | Polarizing plate 11 | Polarizing plate 5 | Film 5 | 50 nm/200 nm | 0~0.12 | 0~0.12 |
| LCD45 | Polarizing plate 11 | Polarizing plate 6 | Film 6 | 70 nm/220 nm | −0.02~0.02 | −0.02~0.02 |
| LCD46 | Polarizing plate 11 | Polarizing plate 7 | Film 7 | 40 nm/190 nm | 0~0.15 | 0~0.15 |
| LCD47 | Polarizing plate 12 | Polarizing plate 8 | Film 1 | 55 nm/200 nm | 0~0.08 | 0~0.08 |

| Liquid crystal display | Black color shift Δxφ | Δxφ | CR@φ = 45/ Θ = 60 | Visual evaluation in daylight | Remarks |
|---|---|---|---|---|---|
| LCD40 | 0~0.07 | 0~0.07 | 23 | Blackish, bright | Comparative |
| LCD41 | 0~0.07 | 0~0.07 | 39 | Blackish, dark | Inventive |
| LCD42 | 0~0.10 | 0~0.10 | 30 | Blackish, dark | Inventive |
| LCD43 | 0~0.03 | 0~0.03 | 33 | Blackish, dark | Inventive |
| LCD44 | 0~0.11 | 0~0.11 | 21 | Dark-reddish, bright | Comparative |
| LCD45 | −0.03~0.02 | −0.03~0.02 | 17 | Dark-bluish, bright | Comparative |
| LCD46 | 0~0.14 | 0~0.14 | 18 | Dark-reddish, bright | Comparative |
| LCD47 | 0~0.07 | 0~0.07 | 23 | Dark-bluish, bright | Comparative |

<Conditions common to LCD40-47>
Protective film on cell side of polarizing plate on viewing side: Film 8, ReB(590)/RthB(590) = 8 nm/80 nm
VA cell: VA cell 2 (Δnd = 280 nm), backlight color temperature (8,500° K)
Preferred range of ReA(590) and RthA(590) of liquid crystal display comprising film 8 as protective film on cell side of polarizing plate on viewing side: ReA(590) = 50 nm~82 nm/RthA(590) = 148 nm~194 nm

TABLE 9

| Liquid crystal display | Polarizing plate on viewing side | Backlight side | | | Black color shift | | Black color shift | | CR@φ = 45/ Θ = 60 | Visual evaluation in daylight | Remarks |
|---|---|---|---|---|---|---|---|---|---|---|---|
| | | Polarizing plate | Cell side | ReA(590)/RthA(590) | ΔxΘ | ΔyΘ | Δxφ | Δxφ | | | |
| LCD48 | Polarizing plate 11 | Polarizing plate 1 | Film 1 | 55 nm/200 nm | 0~0.08 | 0~0.08 | 0~0.07 | 0~0.07 | 37 | Blackish, dark | Inventive |
| LCD49 | Polarizing plate 11 | Polarizing plate 2 | Film 2 | 60 nm/180 nm | 0~0.08 | 0~0.08 | 0~0.07 | 0~0.07 | 53 | Blackish, dark | Inventive |
| LCD50 | Polarizing plate 11 | Polarizing plate 3 | Film 3 | 50 nm/190 nm | 0~0.10 | 0~0.10 | 0~0.09 | 0~0.09 | 35 | Blackish, dark | Inventive |
| LCD51 | Polarizing plate 11 | Polarizing plate 4 | Film 4 | 62 nm/190 nm | 0~0.04 | 0~0.04 | 0~0.03 | 0~0.03 | 60 | Blackish, dark | Inventive |
| LCD52 | Polarizing plate 11 | Polarizing plate 5 | Film 5 | 50 nm/200 nm | 0~0.10 | 0~0.10 | 0~0.09 | 0~0.09 | 31 | Blackish, dark | Inventive |
| LCD53 | Polarizing plate 11 | Polarizing plate 6 | Film 6 | 70 nm/220 nm | −0.02~0.02 | −0.02~0.02 | −0.03~0.02 | −0.03~0.02 | 26 | Dark-bluish, bright | Comparative |
| LCD54 | Polarizing plate 11 | Polarizing plate 7 | Film 7 | 40 nm/190 nm | 0~0.15 | 0~0.15 | 0~0.14 | 0~0.14 | 24 | Dark-reddish, bright | Comparative |
| LCD55 | Polarizing plate 12 | Polarizing plate 8 | Film 1 | 55 nm/200 nm | 0~0.08 | 0~0.08 | 0~0.07 | 0~0.07 | 37 | Dark-bluish, slightly bright | Inventive |

<Conditions common to LCD48-55>
Protective film on cell side of polarizing plate on viewing side: Film 8, ReB(590)/RthB(590) = 8 nm/80 nm
VA cell: VA cell 3 (Δnd = 300 nm), backlight color temperature (8,500° K)
Preferred range of ReA(590) and RthA(590) of liquid crystal display comprising film 8 as protective film on cell side of polarizing plate on viewing side: ReA(590) = 47 nm~76 nm/RthA(590) = 163 nm~213 nm

TABLE 10

| Liquid crystal display | Polarizing plate on viewing side | Backlight side | | | Black color shift | | | | CR@φ = 45/ Θ = 60 | Visual evaluation in daylight | Remarks |
|---|---|---|---|---|---|---|---|---|---|---|---|
| | | Polarizing plate | Cell side | ReA(590)/RthA(590) | ΔxΘ | ΔyΘ | Δxφ | Δxφ | | | |
| LCD56 | Polarizing plate 11 | Polarizing plate 1 | Film 1 | 55 nm/200 nm | 0~0.08 | 0~0.08 | 0~0.07 | 0~0.07 | 53 | Blackish, dark | Inventive |
| LCD57 | Polarizing plate 11 | Polarizing plate 2 | Film 2 | 60 nm/180 nm | 0~0.08 | 0~0.08 | 0~0.07 | 0~0.07 | 37 | Blackish, dark | Inventive |
| LCD58 | Polarizing plate 11 | Polarizing plate 3 | Film 3 | 50 nm/190 nm | 0~0.10 | 0~0.10 | 0~0.09 | 0~0.09 | 37 | Blackish, dark | Inventive |
| LCD59 | Polarizing plate 11 | Polarizing plate 4 | Film 4 | 62 nm/190 nm | 0~0.04 | 0~0.04 | 0~0.03 | 0~0.03 | 51 | Blackish, dark | Inventive |
| LCD60 | Polarizing plate 11 | Polarizing plate 5 | Film 5 | 50 nm/200 nm | 0~0.10 | 0~0.10 | 0~0.09 | 0~0.09 | 41 | Blackish, dark | Inventive |
| LCD61 | Polarizing plate 11 | Polarizing plate 6 | Film 6 | 70 nm/220 nm | 0~0.02 | 0~0.02 | −0.20~0.02 | −0.02~0.02 | 39 | Blackish, dark | Inventive |
| LCD62 | Polarizing plate 11 | Polarizing plate 7 | Film 7 | 40 nm/190 nm | 0~0.15 | 0~0.15 | 0~0.14 | 0~0.14 | 26 | Dark-reddish, bright | Comparative |
| LCD63 | Polarizing plate 12 | Polarizing plate 8 | Film 1 | 55 nm/200 nm | 0~0.08 | 0~0.08 | 0~0.07 | 0~0.07 | 53 | Dark-bluish, slightly bright | Inventive |

<Conditions common to LCD56-63>
Protective film on cell side of polarizing plate on viewing side: Film 8, ReB(590)/RthB(590) = 8 nm/80 nm
VA cell: VA cell 4 (Δnd = 320 nm), backlight color temperature (8,500° K)
Preferred range of ReA(590) and RthA(590) of liquid crystal display comprising film 8 as protective film on cell side of polarizing plate on viewing side: ReA(590) = 45 nm~71 nm/RthA(590) = 178 nm~233 nm

TABLE 11

| Liquid crystal display | Polarizing plate on viewing side | Backlight side Polarizing plate | Cell side | ReA(590)/ RthA(590) | Black color shift ΔxΘ | ΔyΘ | Δxφ | Δxφ | CR@φ = 45/ Θ = 60 | Visual evaluation in daylight | Remarks |
|---|---|---|---|---|---|---|---|---|---|---|---|
| LCD64 | Polarizing plate 9 | Polarizing plate 1 | Film 1 | 55 nm/ 200 nm | 0~0.08 | 0~0.08 | 0~0.07 | 0~0.07 | 33 | Blackish, slightly bright | Inventive |
| LCD65 | Polarizing plate 9 | Polarizing plate 2 | Film 2 | 60 nm/ 180 nm | 0~0.08 | 0~0.08 | 0~0.07 | 0~0.07 | 53 | Blackish, slightly bright | Inventive |
| LCD66 | Polarizing plate 9 | Polarizing plate 3 | Film 3 | 50 nm/ 190 nm | 0~0.10 | 0~0.10 | 0~0.10 | 0~0.10 | 32 | Dark-reddish, slightly bright | Inventive |
| LCD67 | Polarizing plate 9 | Polarizing plate 4 | Film 4 | 62 nm/ 190 nm | 0~0.04 | 0~0.04 | 0~0.03 | 0~0.03 | 51 | Blackish, slightly bright | Inventive |
| LCD68 | Polarizing plate 9 | Polarizing plate 5 | Film 5 | 50 nm/ 200 nm | 0~0.10 | 0~0.10 | 0~0.10 | 0~0.10 | 28 | Dark-reddish, slightly bright | Inventive |
| LCD69 | Polarizing plate 9 | Polarizing plate 6 | Film 6 | 70 nm/ 220 nm | 0~0.02 | 0~0.02 | −0.20~0.02 | −0.02~0.02 | 24 | Dark-bluish, slightly bright | Inventive |
| LCD70 | Polarizing plate 9 | Polarizing plate 7 | Film 7 | 40 nm/ 190 nm | 0~0.15 | 0~0.15 | 0~0.14 | 0~0.14 | 23 | Dark-reddish, slightly bright | Comparative |
| LCD71 | Polarizing plate 10 | Polarizing plate 8 | Film 1 | 55 nm/ 200 nm | 0~0.08 | 0~0.08 | 0~0.07 | 0~0.07 | 33 | Dark-bluish, slightly bright | Inventive |

<Conditions common to LCD64-71>
Protective film on cell side of polarizing plate on viewing side: TDY80UL, ReB(590)/RthB(590) = 3 nm/45 nm
VA cell: VA cell 2 (Δnd = 280 nm), backlight color temperature (12,500° K)
Preferred range of ReA(590) and RthA(590) of liquid crystal display comprising TDY80UL as protective film on cell side of polarizing plate on viewing side: ReA(590) = 46 nm~72 nm/RthA(590) = 174 nm~228 nm It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-302992 filed Oct. 18, 2005, the contents of which are incorporated herein by reference.

The invention claimed is:

1. A liquid crystal display comprising:
a liquid crystal cell;
a pair of polarizing plates disposed in cross-Nicol arrangement and sandwiching the liquid crystal cell, one of the pair of the polarizing plates having a polarizer and a protective film A disposed on a liquid crystal cell side thereof, the other of the pair of the polarizing plates having a polarizer and a protective film B disposed on a liquid crystal cell side thereof, wherein $Re_A(\lambda)$ and $Rth_A(\lambda)$ of the protective film A, $Rth_B(\lambda)$ of the protective film B and $\Delta nd(\lambda)$ of the liquid crystal cell satisfy expressions (I) and (II) at a wavelength of 400 nm to 700 nm:

$$0.74\times(\Delta nd(\lambda)-Rth_B(\lambda))\leq Rth_A(\lambda)\leq 0.97\times(\Delta nd(\lambda)-Rth_B(\lambda)) \quad (I)$$

$$0.018\times\lambda^2/(\Delta nd(\lambda)-Rth_B(\lambda))+0.032\times\lambda Re_A(\lambda)\leq 0.036\times\lambda^2/(\Delta nd(\lambda)-Rth_B(\lambda))+0.032\times\lambda \quad (II)$$

wherein Re represents an in-plane retardation; Rth represents a thickness-direction retardation; (λ) means that the measurement wavelength is λ nm; Δn is the difference $(n_e-n_o)$ between an extraordinary index $n_e$ and an ordinary index $n_o$ of a liquid crystal in the liquid crystal cell; and d represents a cell gap by nm of the liquid crystal cell.

2. The liquid crystal display according to claim 1, wherein the polarizing plates disposed in cross-Nicol arrangement have a hue a* and b* satisfying expressions (III) and (IV):

$$-1.0\leq a^*\leq 2.0 \quad (III)$$

$$-1.0\leq b^*\leq 2.0 \quad (IV).$$

3. The liquid crystal display according to claim 1, further comprising a backlight having a color temperature of 8,000 K to 10,000 K.

4. The liquid crystal display according to claim 1, wherein $Re_A(\lambda)$ and $Rth_A(\lambda)$ satisfy expressions (V) to (VIII):

$$1.0\leq Re_{A(480)}/Re_{A(550)}\leq 1.1 \quad (V)$$

$$0.9\leq Re_{A(630)}/Re_{A(550)}\leq 1.0 \quad (VI)$$

$$1.0\leq Rth_{A(480)}/Rth_{A(550)}\leq 1.1 \quad (VII)$$

$$0.9\leq Rth_{A(630)}/Rth_{A(550)}\leq 1.0 \quad (VIII).$$

5. The liquid crystal display according to claim 1, wherein $Rth_{B(590)}$ is from 0 nm to 150 nm.

6. The liquid crystal display according to claim 5, wherein $Re_{B(590)}$ of the protective film B is from 0 nm to 20 nm.

7. The liquid crystal display according to claim 1, wherein $Rth_{B(\lambda)}$ satisfies expressions (IX) to (X):

$$0 \leq Rth_{B(480)}/Rth_{B(550)} \leq 1.0 \quad \text{(IX)}$$

$$1.0 \leq Rth_{B(630)}/Rth_{B(550)} \leq 1.5 \quad \text{(X)}.$$

8. The liquid crystal display according to claim 1, wherein at least one of the protective films A and B is a cellulose acylate film substantially made of a cellulose acylate having a glucose unit of cellulose, wherein a hydroxyl group in the glucose unit of is substituted by an acyl group having two or more carbon atoms, and the cellulose acylate film satisfies expressions (XI) and (XII):

$$2.0 \leq DS2+DS3+DS6 \leq 3.0 \quad \text{(XI)}$$

$$DS6/(DS2+DS3+DS6) \geq 0.315 \quad \text{(XII)}$$

wherein DS2, DS3 and DS6 represent substitution degrees of hydroxyl groups at 2-position, 3-position and 6-position in the glucose unit by the acyl group, respectively.

9. The liquid crystal display according to claim 8, wherein the acyl group is an acetyl group.

10. The liquid crystal display according to claim 1, wherein at least one of the protective films A and B is a cellulose acylate film substantially made of a cellulose acylate which is a mixed aliphatic acid ester of cellulose, wherein a hydroxyl group of the cellulose is substituted by an acetyl group and another hydroxyl group of the cellulose is substituted by an acyl group having three or more carbon atoms, and the cellulose acylate film satisfies expressions (XIII) and (XIV):

$$2.0 \leq A+B \leq 3.0 \quad \text{(XIII)}$$

$$0 < B \quad \text{(XIV)}$$

wherein A represents a substitution degree of the hydroxyl group by the acetyl group, and B represents a substitution degree of the hydroxyl group by the acyl group.

11. The liquid crystal display according to claim 10, wherein the acyl group is a butanoyl group.

12. The liquid crystal display according to claim 10, wherein the acyl group is a propionyl group.

13. The liquid crystal display according to claim 10, wherein the cellulose acylate film has a substitution degree of the hydroxyl group at 6-position of the cellulose, the substitution degree being of 0.75 or more.

14. The liquid crystal display according to claim 1, wherein at least one of the protective films A and B comprises at least one selected from the group consisting of a plasticizer, an ultraviolet absorber, a release accelerator, a dye and a matting agent.

15. The liquid crystal display according to claim 1, wherein at least one of the protective films A and B comprises at least one retardation increasing agent of a rod-shaped compound or discotic compound.

16. The liquid crystal display according to claim 1, wherein the liquid crystal cell is of vertically-aligned mode.

* * * * *